(12) United States Patent
Yamato et al.

(10) Patent No.: US 10,035,455 B2
(45) Date of Patent: Jul. 31, 2018

(54) LIGHT-EMITTING PART FOR VEHICLE

(71) Applicant: TS TECH CO., LTD., Asaka-shi, Saitama (JP)

(72) Inventors: Noriyuki Yamato, Tochigi (JP); Shoji Kotsuka, Tochigi (JP); Yoshiaki Ito, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 318 days.

(21) Appl. No.: 14/893,369

(22) PCT Filed: May 28, 2014

(86) PCT No.: PCT/JP2014/064082
§ 371 (c)(1),
(2) Date: Nov. 23, 2015

(87) PCT Pub. No.: WO2014/192797
PCT Pub. Date: Dec. 4, 2014

(65) Prior Publication Data
US 2016/0082881 A1    Mar. 24, 2016

(30) Foreign Application Priority Data
May 29, 2013    (JP) ................................. 2013-113267

(51) Int. Cl.
*B60Q 3/54*    (2017.01)
*F21V 8/00*    (2006.01)
(Continued)

(52) U.S. Cl.
CPC ............... *B60Q 3/54* (2017.02); *B29C 45/00* (2013.01); *B32B 7/06* (2013.01); *B32B 7/12* (2013.01);
(Continued)

(58) Field of Classification Search
CPC . B60Q 3/14; B60Q 3/20; B60Q 3/225; B60Q 3/217; B60Q 3/54; B60Q 3/62; B60Q 3/64
(Continued)

(56) References Cited

U.S. PATENT DOCUMENTS 6,352,359 B1 *  3/2002  Shie ................... F21S 48/1233
                                                    362/331
7,654,721 B2 *  2/2010  Okada .................. B60Q 1/0041
                                                    349/65
(Continued)

FOREIGN PATENT DOCUMENTS

CN    1862335 A    11/2006
DE    196 54 358 A1    6/1998
(Continued)

OTHER PUBLICATIONS

Office Action issued in related application CN 201480024149.1, dated Mar. 1, 2017, with machine generated English language translation, 14 pages.
(Continued)

*Primary Examiner* — Julie Bannan
(74) *Attorney, Agent, or Firm* — Drinker Biddle & Reath LLP

(57) ABSTRACT

A light-emitting part for a vehicle having a light-emitting region is described. The light-emitting part includes an irradiation body which i) includes a dot-shaped light source and a planar plate-shaped light guide body that emits light from the dot-shaped light source, and ii) emits the light toward a front side of the light-emitting region. The light-emitting part includes a curved plate-shaped transmissive body disposed so that the light emitted from the irradiation body is transmitted through the curved plate-shaped transmissive body. The curved plate-shaped transmissive body includes portions which are separated from the planar plate-
(Continued)

shaped light guide body by different gaps. Also included is a surface brightness adjusting portion which adjusts a brightness of an outer surface of the light-emitting region in response to a size of the gap and a distance from the dot-shaped light source.

6 Claims, 54 Drawing Sheets

(51) Int. Cl.
- *B29C 45/00* (2006.01)
- *B32B 7/06* (2006.01)
- *B32B 7/12* (2006.01)
- *B32B 27/08* (2006.01)
- *B32B 27/36* (2006.01)
- *B60Q 3/64* (2017.01)
- *B60Q 3/217* (2017.01)
- *B60Q 3/78* (2017.01)

(52) U.S. Cl.
CPC ............. *B32B 27/08* (2013.01); *B32B 27/36* (2013.01); *B60Q 3/217* (2017.02); *B60Q 3/64* (2017.02); *B60Q 3/78* (2017.02); *G02B 6/0088* (2013.01); *B32B 2255/205* (2013.01); *B32B 2307/40* (2013.01); *B32B 2307/748* (2013.01); *B32B 2605/00* (2013.01); *B32B 2605/003* (2013.01); *B60Q 2500/10* (2013.01)

(58) Field of Classification Search
USPC ........................................................ 362/623
See application file for complete search history.

(56) References Cited

U.S. PATENT DOCUMENTS 8,333,493 B2 * 12/2012 Taleb-Bendiab ..... B60Q 1/0035
362/511

2006/0044825 A1 * 3/2006 Sa ...................... B60Q 1/0058
362/600
2006/0171159 A1 * 8/2006 Anderlini ............... B60Q 1/302
362/511
2007/0274097 A1 * 11/2007 Chen ..................... G02B 6/0036
362/609
2008/0089080 A1 * 4/2008 Kawaji ................. B60Q 1/2665
362/494
2011/0228553 A1 * 9/2011 Igoe .................... B60R 13/0243
362/558

FOREIGN PATENT DOCUMENTS

| DE | 10 2010 051 307 A1 | 5/2012 |
|---|---|---|
| EP | 2 786 899 A1 | 10/2014 |
| JP | 04-194903 A | 7/1992 |
| JP | 11-321478 A | 11/1999 |
| JP | 2004-090897 A | 3/2004 |
| JP | 2006-222030 A | 8/2006 |
| JP | 2008-015448 A | 1/2008 |
| JP | 2008-114730 A | 5/2008 |
| JP | 2009-101840 A | 5/2009 |
| JP | 2009-269492 A | 11/2009 |
| JP | 2010-509707 A | 3/2010 |
| JP | 2012-058480 A | 3/2012 |
| JP | 2012-182053 A | 9/2012 |
| JP | 2014-231309 A | 12/2014 |
| JP | 2014-231310 A | 12/2014 |
| JP | 2014-231311 A | 12/2014 |
| JP | 2014-231312 A | 12/2014 |
| WO | WO 2008/062695 A1 | 5/2008 |
| WO | WO 2011/086746 A1 | 7/2011 |

OTHER PUBLICATIONS

Extended European Search Report issued in related application EP 14804047.0, dated May 12, 2016, 12 pages.

* cited by examiner

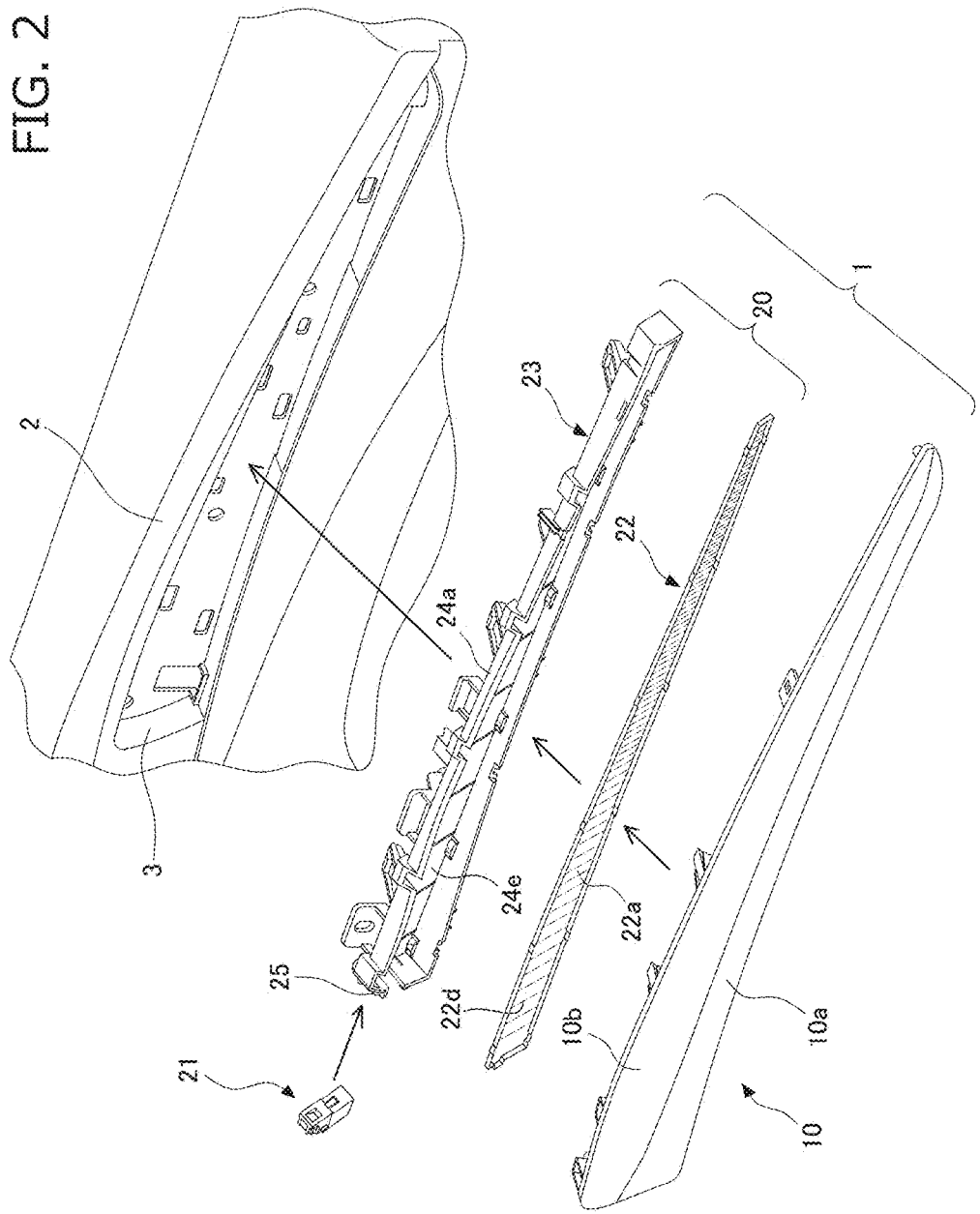

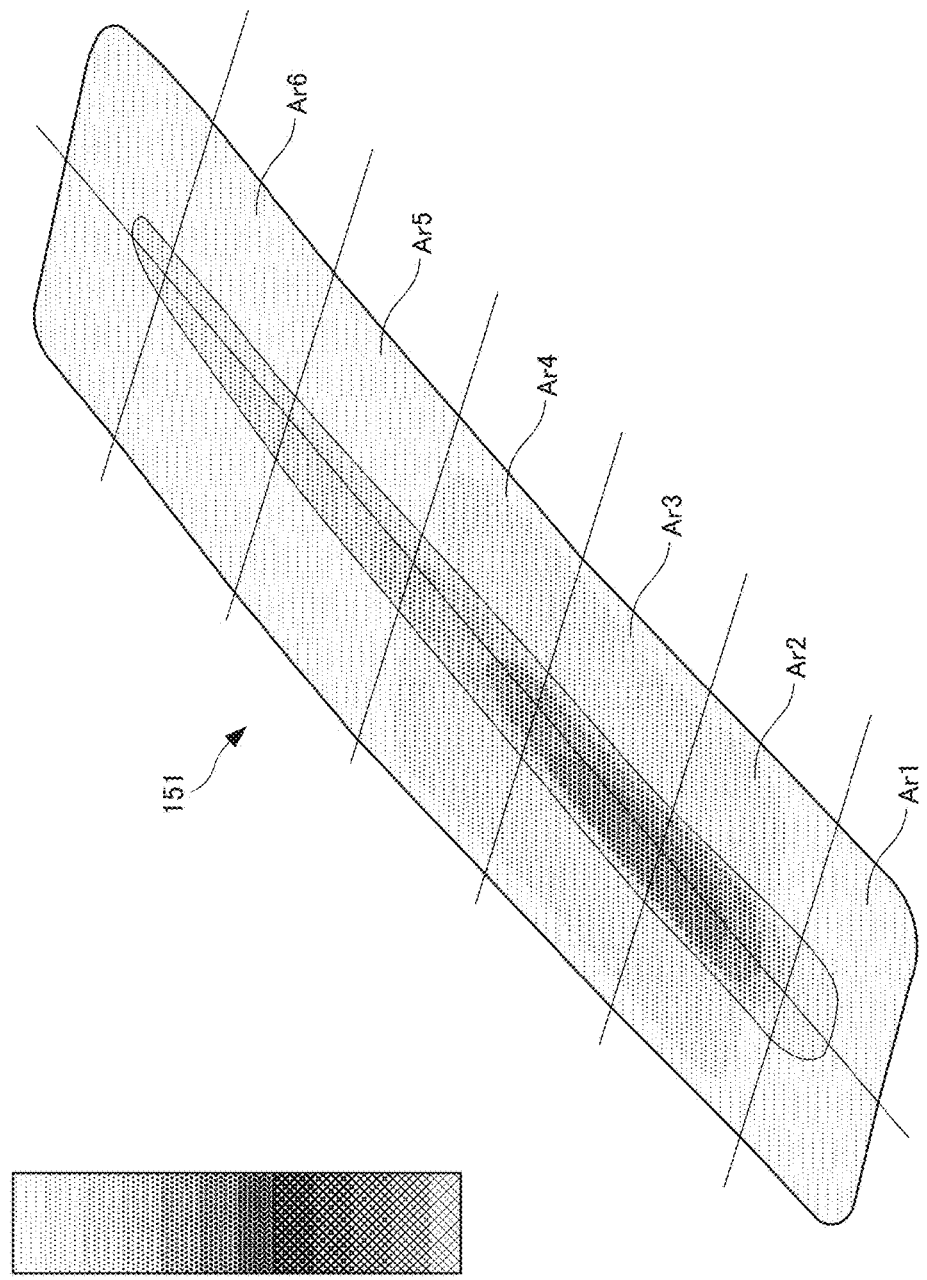

BOUNDARY LINE

BOUNDARY LINE

LIGHT-EMITTING PART FOR VEHICLE

CROSS-REFERENCE TO RELATED APPLICATIONS

This application is a National Stage Entry application of PCT Application No. PCT/JP2014/064082, filed May 28, 2014, which claims the priority benefit of Japanese Patent Application No. 2013-113267, filed on May 29, 2013, the contents being incorporated herein by reference.

BACKGROUND

Disclosed herein are various embodiments that relate to a light-emitting part for a vehicle, and particularly, to a light-emitting part for a vehicle that includes a curved plate-shaped light-emitting portion that uniformly emits light.

Hitherto, light-emitting parts for vehicles have been used. Some known light-emitting parts for a vehicle include a plurality of prism portions disposed in a planar shape on a light guiding plate in order to provide surface light-emission without using a plurality of dot-shaped light sources. Light incident from the dot-shaped light sources to the light guiding plate is reflected in a planar shape by the plurality of prism portions toward a plate-shaped transmissive body. Further, some examples of a method of uniformly emitting light from the planar plate-shaped transmissive body include a method of changing the height of the prism portion or the gap between the prism portions in response to the distance between the light source and the prism portion in consideration of the light attenuation effect, for example, as described in Japanese Patent Document No. 2006-222030 A ("the '030 Document") and Japanese Patent Document No. 2008-15448 A ("the '448 Document").

Japanese Patent Document No. 11-321478 A ("the '478 Document") discloses a light-emitting part using a decorative sheet. A decorative sheet is used to allow light from metal to be transmitted therethrough so that a metallic effect is visually obtained. Specifically, an adhesive layer, an anchor layer, a metal deposition layer exhibiting a metallic effect, an anchor layer, a colored layer, a hard coat layer, and a base film having a surface subjected to hairline pattern processing are laminated from a surface of a resin layer used as a base and formed as a lamination film serving as a transfer foil. Then, a sheet is subjected to in-mold molding to transfer a pattern to the surface of the resin layer as the base, and the base film is peeled off after the in-mold molding to finish a surface of a molded product with a metallic effect.

Further, Japanese Patent Document No. 2004-90897 A ("the '897 Document") discloses another example of a light-emitting part for vehicles. In the light-emitting part disclosed in the '897 Document, a vehicle interior panel is formed by an optically transparent panel having a design portion laminated thereon and has a desired design at a vehicle interior side surface so that a light shielding region, shielding the light from the opposite side to the vehicle interior side, and a light transmitting region, transmitting the light from the opposite side to the vehicle interior side, are alternately arranged, and a light source is disposed inside the optically transparent panel. Then, when the light source is lit at night, the light is incident from the rear surface of the optically transparent panel. Subsequently, when incident light enters the light transmitting region and is transmitted through the front surface of the optically transparent panel, the light illuminates the dark vehicle interior. Thus, the light-emitting part serves as a decorative illumination unit.

When the height or the pitch of the prism portion is changed in response to the distance from the light source in order to uniformly emit the light from the planar plate-shaped transmissive body, the uniformity of the light emitted from the light guiding plate is maintained even when the light is emitted from the transmissive body if the gap between the light guiding plate and the transmissive body is constant. However, when there is a difference in gap between the light guiding plate and the transmissive body due to the combination of the planar plate-shaped light guiding plate and the curved plate-shaped transmissive body, an attenuation degree of the light is changed due to a difference in gap therebetween. Accordingly, even when the light emitted from the light guiding plate is uniform, the uniformity of the light is not kept when the light is emitted through the transmissive body.

For this reason, in the techniques disclosed in the above-cited references, the light can be uniformly emitted from the transmissive body when the gap between the light guiding plate and the transmissive body is constant. However, when the gap between the light guiding plate and the transmissive body is not constant, the light cannot be uniformly emitted from the transmissive body.

Further, there is a tendency to increase the complexity of the shape of vehicle interior parts in order to improve the design thereof. Particularly, there are many members of vehicle interior parts that use a curve or a curved surface to achieve an improved design. Such a member having such a curve or curved surface may give a psychologically calming impression to a passenger of the vehicle. However, when the sheet is disposed on the curve and the curved surface by using the decorative sheet (the film) of the '478 Document, a problem arises in that a tension difference occurs in the case of a complex shape. Particularly, this problem noticeably occurs due to a tension difference between the flat surface portion and the curved surface portion. In this way, when the tension difference occurs, a crack may occur in the high-tension portion, that is, the curved surface portion. Thus, there is a possibility that cracks or visual imperfections may occur on the design. The light-emitting part for the vehicle is obtained by using the decorative sheet (the film) as described above so that the light is emitted from the light source to the decorative sheet (the film). However, in the decorative sheet (the film) of the '478 Document, the decorative appearance is simplified since the layers are uniformly laminated as multiple layers. For this reason, there has been a demand for a technique of improving durability while ensuring a better design of the decorative film.

Further, in the light-emitting part for the vehicle of the '897 Document, a decorative lamination structure is described in which a light shielding layer, including a transmissive portion transmitting the light transmitted through the optical transparent panel, and a light shielding portion, shielding the light, and a design layer, disposed at the vehicle interior side in relation to the light shielding layer and formed to match the surface shape of the optical transparent panel, are laminated on the vehicle interior side surface of the optical transparent panel. According to the light-emitting part with such a configuration, a design such as a metallic effect or a grain effect of the design layer is visually recognized at daytime, and the light emitted from the light source is visually recognized from the design layer through the transmissive portion at nighttime. Accordingly, the design layer is visually recognized while the light is transmitted therethrough at nighttime in a manner differently from the daytime. Here, in order to improve the transmissivity of the light emitted from the light source toward the vehicle interior side for the decorative illumination function, it is desirable to form the design layer as thin as possible. However, when the film thickness of the design layer is thin, a boundary line between the light shielding portion and the transmissive portion forming the light shielding layer is visually recognized at the vehicle interior side when the light is not emitted therefrom. Accordingly, a passenger feels uncomfortable when the vehicle interior is bright, and hence a good design is not obtained. For this reason, there has been a demand for a light-emitting part for a vehicle which improves the functionality as decorative illumination and the texture of a decorative illumination region to obtain a good design.

SUMMARY

Various embodiments discussed below have been made in view of the above-described circumstances, and an object thereof is to provide a light-emitting part for a vehicle capable of more uniformly emitting light by including a curved plate-shaped transmissive body having a different gap with respect to a light guiding plate.

Further, another object is to provide a light-emitting part for a vehicle which has an improved design and improves product value by reducing occurrences of cracks caused by a tension difference of a film in a configuration in which a decorative film is attached to a surface of a resin material as a transmissive body.

Further, still another object is to provide a light-emitting part for a vehicle which improves the functionality as decorative illumination and the texture of a light-emitting region.

The above-described problems are solved by various embodiments of a light-emitting part for a vehicle described below. In an embodiment, a light-emitting part for a vehicle includes a light-emitting region, the light-emitting part including: an irradiation body which i) includes a dot-shaped light source and a planar plate-shaped light guide body with a light-emitting surface emitting light from the light source and ii) emits the light toward the front side of the light-emitting region; and a curved plate-shaped transmissive body disposed at a front position of the irradiation body as the light-emitting region, so that light emitted from the irradiation body is transmitted through the curved plate-shaped transmissive body, wherein the curved plate-shaped transmissive body includes portions which are separated from the planar plate-shaped light guide body at different gaps while the planar plate-shaped light guide body and the curved plate-shaped transmissive body are attached to the vehicle, and wherein the light-emitting part for the vehicle further includes a surface brightness adjusting portion which adjusts a brightness of an outer surface of the light-emitting region in response to the size of the gap.

In the light-emitting part for the vehicle with the above-described configuration, the surface brightness adjusting portion adjusts the brightness of the outer surface of the light-emitting region in response to the gap between the planar plate-shaped light guide body and the curved plate-shaped transmissive body. Accordingly, even when a light amount attenuation degree is large, compared with the other portions having a small gap, in a portion having a large gap compared with the other portions, the amount of the light transmitted through the curved plate-shaped transmissive body is changed in response to the gap to obtain the uniform brightness of the entire outer surface of the light-emitting region. As a result, the light is more uniformly emitted from the light-emitting region even in the light-emitting part for the vehicle including the curved plate-shaped transmissive body separated from the planar plate-shaped light guide body at a different gap.

Further, in the light-emitting part for the vehicle, the surface brightness adjusting portion may include a reflected light adjusting portion disposed in the planar plate-shaped light guide body. Furthermore, the reflected light adjusting portion may include a plurality of reflection portions as notches that reflect at least a portion of the light incident from the light source toward the light-emitting surface and a depth of the notch forming each of the reflection portions may be changed in response to the size of the gap to adjust the brightness of the outer surface.

In the above-described configuration, since the depth of the notch forming the reflection portion is changed in response to the gap between the curved plate-shaped transmissive body and the planar plate-shaped light guide body, the reflected light amount in the reflection portion is changed in response to the gap. Accordingly, the light can be more uniformly emitted from the light-emitting region of the light-emitting part for the vehicle.

Further, in the light-emitting part for the vehicle, the surface brightness adjusting portion may include the reflected light adjusting portion disposed in the planar plate-shaped light guide body. Furthermore, the reflected light adjusting portion may include a plurality of reflection portions as notches that reflect at least a portion of the light incident from the light source toward the light-emitting surface and a number of the reflection portions per unit area may be changed in response to the size of the gap to adjust the brightness of the outer surface.

In the above-described configuration, since the number of the reflection portions per unit area is changed in response to the gap between the curved plate-shaped transmissive body and the planar plate-shaped light guide body, a reflected light amount in the reflection portion is changed in response to the gap. Accordingly, the light can be more uniformly emitted from the light-emitting region of the light-emitting part for the vehicle.

Further, in the light-emitting part for the vehicle, the surface brightness adjusting portion may include a diffused light adjusting portion which adjusts an amount of light diffused in the curved plate-shaped transmissive body, and the diffused light adjusting portion may be a concave portion or a convex portion formed in a surface opposite to the outer surface in the curved plate-shaped transmissive body.

In the above-described configuration, the diffused light amount is adjusted in response to the gap between the curved plate-shaped transmissive body and the planar plate-shaped light guide body by the concave portion or the convex portion formed on the rear surface of the curved plate-shaped transmissive body. Accordingly, the light can be more uniformly emitted from the light-emitting region of the light-emitting part for the vehicle.

Further, in the light-emitting part for the vehicle, the surface brightness adjusting portion may include a diffused light adjusting portion which adjusts the amount of the light diffused in the curved plate-shaped transmissive body, and the diffused light adjusting portion may be a light diffusing sheet attached to a surface opposite to the outer surface in the curved plate-shaped transmissive body.

In the above-described configuration, the diffused light amount is adjusted in response to the gap between the curved plate-shaped transmissive body and the planar plate-shaped light guide body by the light diffusing sheet attached to the rear surface of the curved plate-shaped transmissive body. Accordingly, the light can be more uniformly emitted from the light-emitting region of the light-emitting part for the vehicle.

Further, in the light-emitting part for the vehicle, the surface brightness adjusting portion may include the diffused light adjusting portion which adjusts the amount of the light diffused in the curved plate-shaped transmissive body from the light from the irradiation body, and the diffused light adjusting portion may be a light diffusing material included in the curved plate-shaped transmissive body.

In the above-described configuration, the diffused light amount is adjusted in response to the gap between the curved plate-shaped transmissive body and the planar plate-shaped light guide body by the light diffusing material included in the curved plate-shaped transmissive body. Accordingly, the light can be more uniformly emitted from the light-emitting region of the light-emitting part for the vehicle.

Further, in the light-emitting part for the vehicle, the surface brightness adjusting portion may include an absorbed light adjusting portion which adjusts an amount of absorbed light from the light from the irradiation body, and the absorbed light adjusting portion may be black pigment included in the curved plate-shaped transmissive body.

In the above-described configuration, the absorbed light amount is adjusted in response to the gap between the curved plate-shaped transmissive body and the planar plate-shaped light guide body by the black pigment included in the curved plate-shaped transmissive body. Accordingly, the light can be more uniformly emitted from the light-emitting region of the light-emitting part for the vehicle.

Further, the light-emitting part for the vehicle may further include a box-shaped frame of a holder which includes an opening that faces the curved plate-shaped transmissive body and holds the irradiation body so that the planar plate-shaped light guide body is disposed near the position of the opening. Furthermore, the surface brightness adjusting portion may include the absorbed light adjusting portion which adjusts the amount of the absorbed light from the light from the irradiation body, and the absorbed light adjusting portion may adjust the brightness of the outer surface by changing a degree of light and darkness of color of a portion surrounding the planar plate-shaped light guide body in the holder in response to the size of the gap.

In the above-described configuration, since the degree of light and darkness of color of the portion surrounding the planar plate-shaped light guide body in the holder is changed in response to the gap between the curved plate-shaped transmissive body and the planar plate-shaped light guide body, the absorbed light amount is changed in response to the gap. Accordingly, the light can be more uniformly emitted from the light-emitting region of the light-emitting part for the vehicle.

Further, the light-emitting part for the vehicle may further include i) a transmissive resin base which includes a curved surface portion and corresponds to the curved plate-shaped transmissive body, and ii) a decorative film which is disposed on one surface of the transmissive resin base. Further, the irradiation body may irradiate the light to the transmissive resin base, the decorative film may include at least i) a transmitted light adjusting layer having a non-transmissive portion that shields the light from the irradiation body and a transmissive portion that allows the light from the irradiation body to be transmitted therethrough, and ii) a decorative layer laminated on a vehicle interior side of the transmitted light adjusting layer, the surface brightness adjusting portion may be a shielded light adjusting portion which adjusts an amount of the shielded light in the decorative film from the light from the irradiation body, the transmitted light adjusting layer in the decorative film may correspond to the shielded light adjusting portion, and a boundary portion of the decorative film between the non-transmissive portion and the transmissive portion in the transmitted light adjusting layer may include a gradation portion subjected to a gradation process so that the color and the density are gradually reduced in a direction towards the boundary portion in the non-transmissive portion.

In the above-described configuration, the transmissive resin base forming the curved plate-shaped transmissive body is formed to have a curved surface from the viewpoint of the design. The decorative film is adjusted to have a maximal tensile expansion modulus so that the decorative film follows the curved surface portion of the transmissive resin base. In this case, when the tensile expansion modulus of the decorative film is increased, a problem arises in that the decorative layer is damaged. For this reason, when the tensile expansion modulus of the decorative film is adjusted to the maximal tensile expansion modulus so that the decorative film follows the curved surface portion of the transmissive resin base, damage can be suppressed. Thus, it is possible to provide the light-emitting part for the vehicle with a better design. Further, a gradation process is performed on the boundary portion between the non-transmissive portion and the transmissive portion of the transmitted light adjusting layer. Accordingly, since it is possible to improve a dramatization effect by performing a dim and smooth illumination in the vicinity of the boundary portion, the design is further improved. Further, it is desirable to perform the gradation process only on a portion adjacent to the boundary portion.

Further, in the light-emitting part for the vehicle, regions having different color and density may be disposed so that the color and the density gradually change in the gradation portion, and a region having a higher tensile expansion modulus may be wider than a region having a lower tensile expansion modulus in the gradation portion.

In the above-described configuration, since the region having a higher tensile expansion modulus is wider than the region having a lower tensile expansion modulus in the gradation portion, it is possible to more effectively suppress damage or a change in transmissivity of the decorative layer of the decorative film.

Further, in the light-emitting part for the vehicle, the decorative film may be stuck to follow the curved surface portion, and the gradation portion may be disposed at a position deviated from a portion of the decorative film having a maximal tensile expansion modulus.

In the above-described configuration, since the gradation portion is disposed at a position deviated from the portion of the decorative film having the maximal tensile expansion modulus, it is possible to more effectively suppress damage or a change in transmissivity of the decorative layer of the decorative film.

Further, in the light-emitting part for the vehicle, a color tone of the transmissive resin base may be similar to a color tone of the non-transmissive portion in the transmitted light adjusting layer.

In the above-described configuration, since the color tone of the curved plate-shaped transmissive body forming the light-emitting region is similar to the color tone of the non-transmissive portion in the transmitted light adjusting layer of the decorative film laminated at the front position of the curved plate-shaped transmissive body, it is possible to suppress a problem in which the boundary line, between the non-transmissive portion in the transmitted light adjusting layer and the transmissive portion adjacent to the non-transmissive portion, is visibly recognizable by the light transmitted therethrough when a passenger sees the light-emitting region from the vehicle interior side. Specifically, since the non-transmissive portion is normally colored in black by a surface treatment and the transmissive portion has transparent color, there is a case in which the boundary line between the black non-transmissive portion and the curved plate-shaped transmissive body formed by white resin and seen through the transparent transmissive portion is visibly recognized by the design layer from the vehicle interior side when the light-emitting part is not lit. This is because the film thickness of the design layer is generally thin in order to ensure the brightness of light-emitting illumination. At this time, since the color tone of the non-transmissive portion is set be similar to the color tone of the curved plate-shaped transmissive body in order to decrease a difference in color tone between the black non-transmissive portion and the white transmissive portion, the boundary line can be gradated. As a result, it is possible to increase the texture of the light-emitting region while improving the functionality as light-emitting illumination.

According to various embodiments, the light can be more uniformly emitted from the light-emitting region in the light-emitting part for the vehicle which includes the curved plate-shaped transmissive body in which the gap between the light guiding plate and the curved plate-shaped transmissive body is not constant.

Specifically, according to various embodiments, since the reflected light amount in the reflection portion formed in the planar plate-shaped light guide body is changed in response to the gap between the curved plate-shaped transmissive body and the planar plate-shaped light guide body, the light is more uniformly emitted from the light-emitting region.

Further, according to various embodiments, since the diffused light amount is changed in response to the gap between the curved plate-shaped transmissive body and the planar plate-shaped light guide body by the concave portion or the convex portion formed in the rear surface of the curved plate-shaped transmissive body, the light diffusing sheet attached to the rear surface of the curved plate-shaped transmissive body, or the light diffusing material included in the curved plate-shaped transmissive body, the light is more uniformly emitted from the light-emitting region.

Further, according to various embodiments, since the absorbed light amount is changed in response to the gap between the curved plate-shaped transmissive body and the planar plate-shaped light guide body by the black pigment included in the curved plate-shaped transmissive body, the light is more uniformly emitted from the light-emitting region. Furthermore, when the degree of light and darkness of color of the portion surrounding the planar plate-shaped light guide body in the holder is changed in response to the gap between the curved plate-shaped transmissive body and the planar plate-shaped light guide body, the absorbed light amount is also changed in response to the gap, and hence the light is more uniformly emitted from the light-emitting region.

Further, according to various embodiments, since the gradation process is performed on the boundary portion between the transmissive portion and the non-transmissive portion of the transmitted light adjusting layer of the decorative film, it is possible to suppress damage in the decorative layer of the decorative film and hence to improve the design. When the region having a higher tensile expansion modulus is wider than the region having a lower tensile expansion modulus, it is possible to more effectively suppress damage in the decorative layer of the decorative film. Furthermore, when the gradation portion is disposed at a position deviated from the portion of the decorative film having the maximal tensile expansion modulus, it is possible to more effectively suppress damage in the decorative layer of the decorative film.

Further, according to various embodiments, since the color tone of the curved plate-shaped transmissive body forming the light-emitting region is similar to the color tone of the non-transmissive portion in the transmitted light adjusting layer of the decorative film laminated at the front position of the curved plate-shaped transmissive body, it is possible to suppress a problem in which the boundary line between the non-transmissive portion and the transmissive portion is visibly recognizable when the passenger sees the light-emitting region from the vehicle interior side. At this time, when the surface concentration increases as it moves from the transmissive portion in a direction from the transmissive portion adjacent to the non-transmissive portion of the gradation portion toward the non-transmissive portion, it is possible to further gradate the boundary line between the non-transmissive portion and the transmissive portion and hence to further conceal the boundary line when viewed from the vehicle interior side.

BRIEF DESCRIPTION OF DRAWINGS

FIG. 2 is an exploded perspective view of the light-emitting part for the vehicle according to the embodiment of FIG. 1.

FIG. 26 is a diagram specifying a sample position of a decorative film according to the second embodiment during an expansion test.

DETAILED DESCRIPTION

Hereinafter, various embodiments are described with reference to the drawings. Further, in the description below, the front to back direction of the vehicle indicates the front to back direction of the traveling vehicle, the inside of the vehicle (hereinafter, simply referred to as the inside) indicates the vehicle interior side (the interior of the vehicle), and the outside of the vehicle (hereinafter, simply referred to as the outside) indicates the vehicle exterior side. Furthermore, in the description below, the upside (the downside)

indicates the upside (the downside) in a state where the light-emitting part for the vehicle is attached to the vehicle body.

Figure 1:
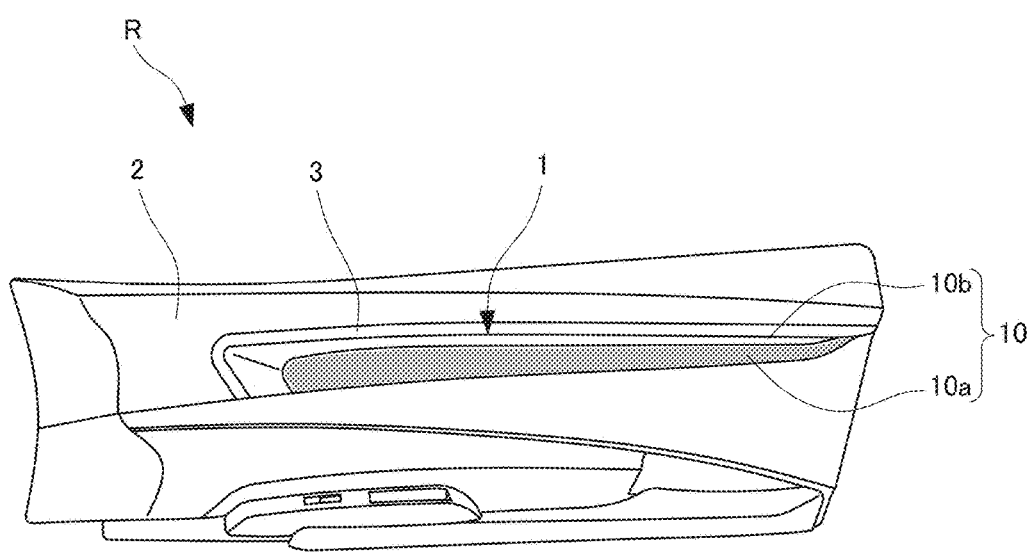
FIG. 1 is a diagram illustrating a first application example of a light-emitting part for a vehicle used in a vehicle door lining according to an embodiment.

Hereinafter, a light-emitting ornament 1 which is an interior part of a vehicle door lining R and serves as the light-emitting part for the vehicle is described as an example of the light-emitting part for the vehicle according to this embodiment as shown in FIG. 1.

The light-emitting ornament 1 is used to illuminate the vehicle door lining R while being lit when the vehicle interior is dark at nighttime or the like or being lit when a door is opened to notify a door opened state to a driver of another vehicle approaching from the rear or a person.

As shown in FIG. 2, the light-emitting ornament 1 according to this embodiment is a module which is obtained by the combination of a light source unit 20 as an irradiation body and an ornament 10 as a transmissive body and is attached to an accommodation casing 3 disposed in a door lining body 2. Each of a holder 23 and a light guide body 22 of the light source unit 20 and the ornament 10 is formed in a substantially plate-like shape which is elongated in the front to back direction of the vehicle and is tapered toward one side in the longitudinal direction.

The light source unit 20 includes a lamp 21 which serves as a dot-shaped light source and a light guide body 22 which has a light-emitting surface 22a emitting light from the lamp 21, and the lamp 21 and the light guide body 22 are implemented as a unit while being held by the holder 23. The light source unit 20 is disposed at a position interposed between the door lining body 2 and the ornament 10 to be described later.

More specifically, the light source unit 20 is assembled to a rear surface (which is an outer surface and is a surface that faces the door lining body 2) of a light-emitting region 10a of the ornament 10, which is described below. Further, in this embodiment, a fixing method such as snap fitting is used when the light source unit 20 is assembled to the light-emitting region 10a.

The lamp 21 according to this embodiment is very suitable as, for example, an LED lamp which is a vehicle illumination light source. The lamp 21 is attached to a lamp holding portion 25 at one end of the light guide body 22 (described below) of the holder 23 in the longitudinal direction to face one end (the front end) of the light guide body 22 in the longitudinal direction. In this way, when the lamp 21 is attached to a position adjacent to the end of the light guide body 22 in the longitudinal direction, the light traveling direction matches the light guiding direction of the light guide body 22, and hence a satisfactory light guiding effect can be obtained.

The holder 23 is a box-shaped frame having an opening, and is used to hold the unit of the lamp 21 and the light guide body 22, that is, the light source unit 20 therein. The holder 23 includes a frame wall 24a and a bottom wall 24e as shown in FIG. 2. The frame wall 24a is uprightly formed on the surface (the surface that faces the vehicle interior side) of the bottom wall 24e to follow an outer shape of the light guiding plate as the light guide body 22. In addition, the holder 23 is attached to the door lining body 2 by fitting a claw portion (described below) disposed in the rear surface thereof to a fitting hole (described below) formed in the bottom wall of the accommodation casing 3.

Figure 3A:
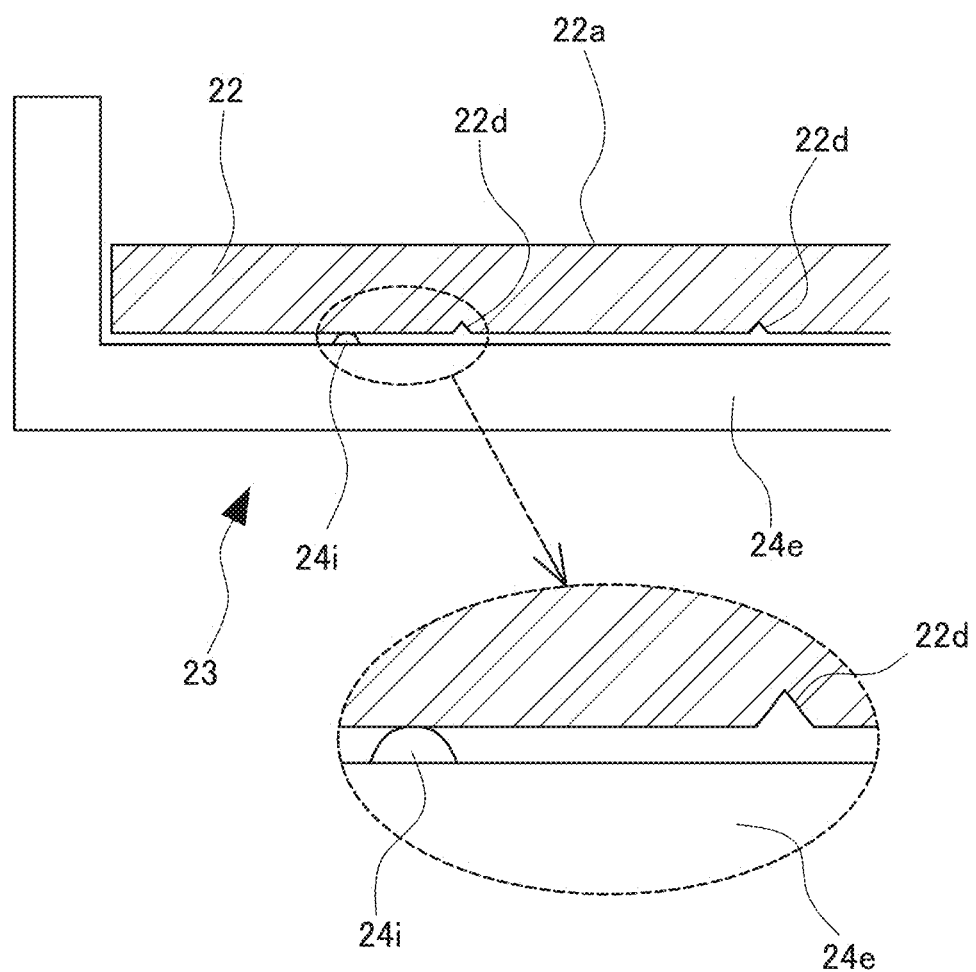
FIG. 3A is a bottom view of a holder and a light guide body according to the embodiment of FIG. 1.
Figure 5A:
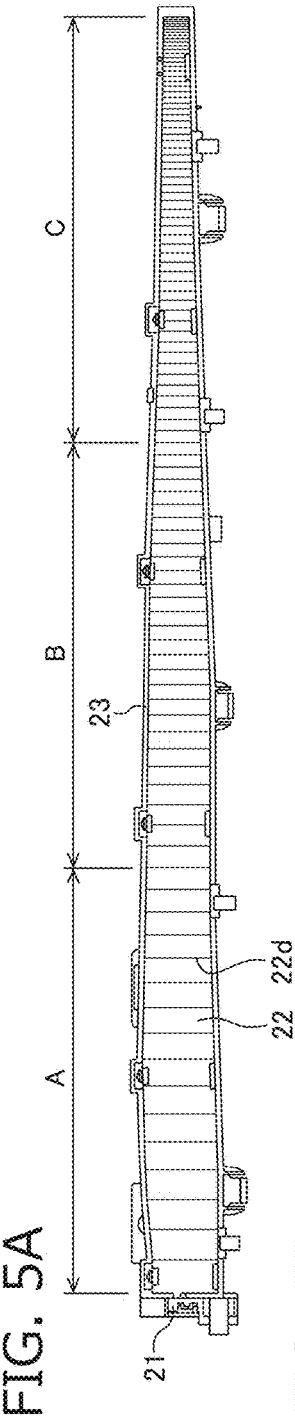
FIG. 5A is a diagram illustrating the light guide body fixed to the holder in a state where a prism portion is formed in the light guide body to have a different pitch and FIG. 5B is a schematic diagram illustrating a state where a reflected light amount becomes different in response to the height and the pitch of the prism portion.

The light guide body 22 is an elongated light guiding plate which is formed of synthetic resin such as polycarbonate as shown in FIGS. 2 and 5A. As shown in FIG. 3A, the light guide body 22 is held in the holder 23 while the rear surface thereof contacts a contact rib 24i disposed in the bottom wall 24e of the holder 23. In a state where the light-emitting ornament 1 is disposed at the vehicle interior side, the longitudinal direction of the light guide body 22 follows the front to back direction of the vehicle. Further, one end of the light guide body 22 in the longitudinal direction is an end (a front end) located at the front side in the front to back direction of the vehicle, and the other end of the light guide body 22 in the longitudinal direction is an end (a rear end) located at the rear side.

Further, the elongated light guiding plate as the light guide body 22 is held while being fitted to the holder 23 as a frame to be fitted to the outer shape. A surface of the light guide body 22 near the holder 23 has a plurality of notches (hereinafter, referred to as prism portions 22d) having a V-shaped cross-section as shown in FIG. 3A. In this embodiment, 92 notches are formed. Here, the depth of the notch corresponds to the height d of the prism portion 22d. Although the prism portion 22d is described in detail below, the prism portion serves as a reflection portion. As shown in FIGS. 2 and 5A, the prism portion 22d is formed to extend in the width direction while being notched in the thickness direction of the light guide body 22. Here, a plurality of the prism portions is lined up in the longitudinal direction of the light guide body 22. Accordingly, light which travels from one end of the light guide body 22 in the longitudinal direction toward the other end in the longitudinal direction is appropriately reflected at the middle position, and hence the intensity of the light emitted from the entire light-emitting surface 22a of the light guide body 22 can be made more uniform.

The ornament 10 is a plate-shaped member that includes an uneven surface exposed to the vehicle interior side, and is fixed to the door lining body 2 by both fixing methods of screwing or snap fitting while the light source unit 20 is fixed thereinto. The ornament 10 includes a light-emitting region 10a as a region formed of a transmissive material and a non-light-emitting region 10b as a region formed of a non-transmissive material. That is, the ornament 10 defines the outer shape of the light-emitting ornament 1 and exhibits the decorative function of the light-emitting ornament 1 while being located at the vehicle interior side. In addition, the ornament 10 at the light-emitting region 10a is also referred to as the transmissive body.

Here, since the light-emitting region 10a of the ornament 10 according to this embodiment includes a light diffusing material, the light passing through the ornament 10 is diffused. Thus, since the light incident to the ornament 10 is transmitted through the light-emitting region 10a while being diffused therein, the light is emitted from the entire light-emitting region 10a. Further, since the optical properties of the ornament 10 formed of synthetic resin change due to the light diffusing material, the transmissivity may change. For this reason, it is desirable to perform an embossing process on a surface of the ornament 10 that faces the light guide body 22 instead of on the light diffusing material in that the optical property does not change.

According to the light-emitting ornament 1 with the above-described configuration, when the lamp 21 is lit, the light incident from the lamp 21 is reflected by the prism portion 22d of the light guide body 22 so that the light is emitted from the light guide body 22 in a surface shape. Since the light-emitting region 10a in the ornament 10 diffuses the light emitted from the light guide body 22 while the light is transmitted through the ornament, the light is emitted in a surface shape at a predetermined brightness.

Next, a state where the light guide body 22 is assembled to the holder 23 is described. The light guide body 22 is assembled to be located near the opening in the inner space of the holder 23. In addition, the light guide body 22 is assembled to the holder 23 by snap fitting. Specifically, an engagement claw portion 24d disposed in the holder 23 engages with the light guide body 22. Further, the lamp 21 and the light guide body 22 are adjacent to each other inside the holder 23.

Figure 3B:
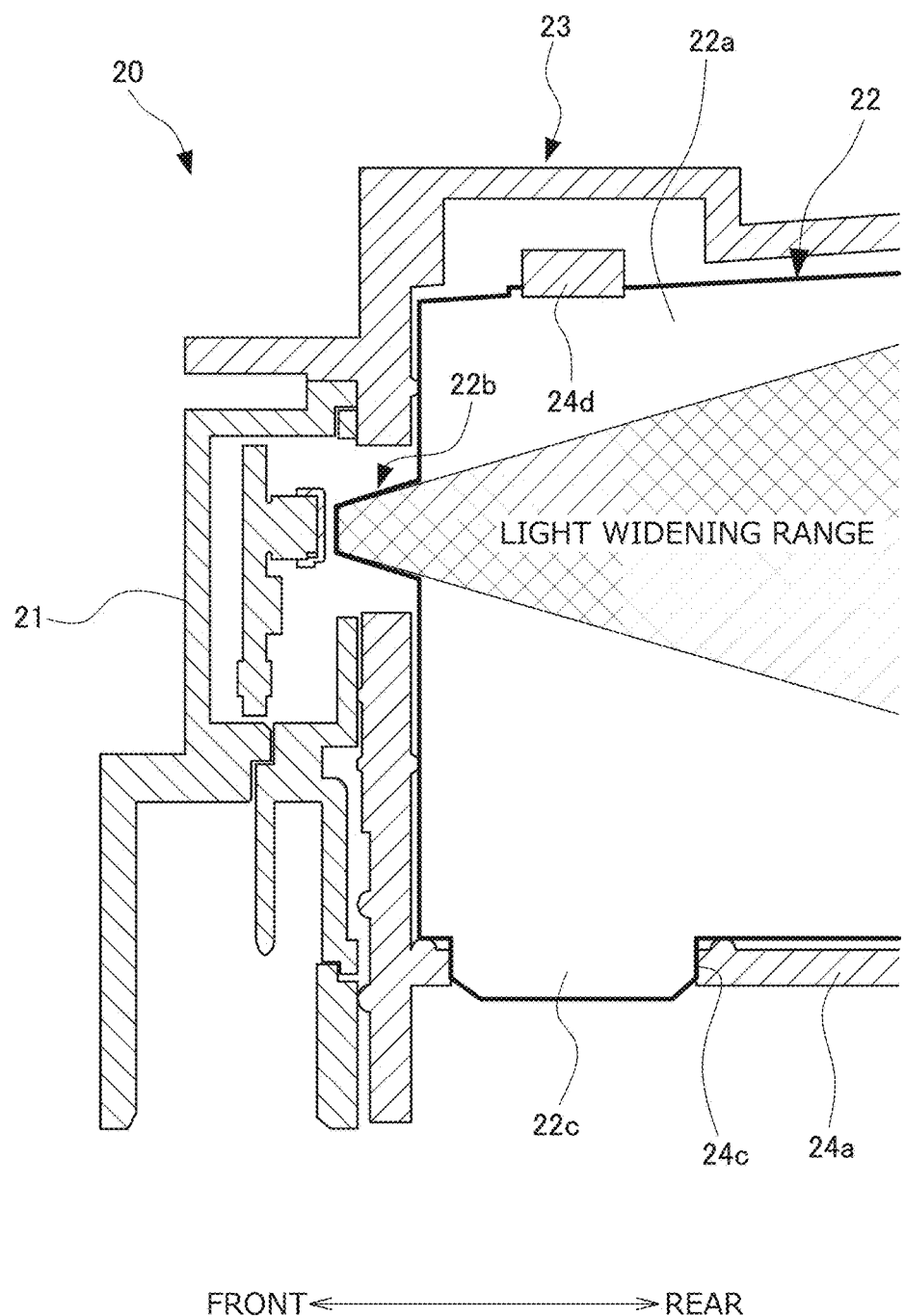
FIG. 3B is a cross-sectional view of an irradiation body in a state where the periphery of a light source is enlarged.

Further, a protrusion portion 22b which protrudes toward the lamp 21 is disposed at one end of the light guide body 22 in the longitudinal direction adjacent to the lamp 21 as shown in FIG. 3B. The protrusion portion 22b positions the light guide body 22 closer to the lamp 21 at a position in which the protrusion portion faces the lamp 21, and hence the light transmitted from the lamp 21 can be efficiently guided to the light guide body 22. As a result, even when only one lamp 21 is used, the light can be appropriately emitted from the light-emitting surface 22a of the light guide body 22.

In addition, there is a need to stably keep the clearance between the protrusion portion 22b and the lamp 21 in order to efficiently guide the light from the lamp 21 to the light guide body 22. For this reason, a positioning hole 24c of the light guide body 22 is disposed at the end near the lamp 21 in the frame wall 24a of the holder 23. As shown in FIG. 3B, a convex portion 22c to be fitted to the positioning hole 24c is disposed at the lower end of one end of the light guide body 22 in the longitudinal direction adjacent to the lamp 21. The convex portion 22c protrudes from the lower end of the light guide body 22 in a direction orthogonal to the protruding direction of the protrusion portion 22b, that is, the downward direction in the embodiment of FIG. 3B. Then, when the light guide body 22 is positioned to the holder 23 by the engagement between the positioning hole 24c and the convex portion 22c, the clearance between the light guide body 22 and the lamp 21 is stably kept.

In addition, the light emitted from the lamp 21 is diffused radially as shown in FIG. 3B and does not reach the convex portion 22c as shown in the same drawing. That is, the positioning convex portion 22c is disposed at the end of the light guide body 22 adjacent to the lamp 21, but the light guide body 22 can be positioned without significant influence on the emission of the light.

Further, as shown in FIG. 3A, the contact rib 24i is disposed between the rear surface of the light guide body 22 and the bottom wall 24e of the holder 23 in order to suppress rattling of the light guide body 22 when assembled to the holder 23. Since the contact rib 24i contacts the rear surface of the light guide body 22, the rattling of the light guide body 22 is suppressed. In addition, as shown in FIG. 3A, a region contacting the contact rib 24i in the rear surface of the light guide body 22 becomes a region that avoids the prism portion 22d disposed in the rear surface of the light guide body 22. This is because the effect of the prism portion 22d is not easily exhibited in that the light is not appropriately reflected at the prism portion 22d when the contact rib 24i enters the prism portion 22d formed as the notch. Further, since sinking occurs in the bottom wall 24e of the holder 23 when the protrusion amount of the contact rib 24i is excessively large, it is desirable that the protrusion amount be set to ⅓ or less and desirably ¹⁄₁₀ or less of the thickness of the bottom wall 24e. Further, it is desirable that the number of the contact ribs 24i and the pitch between the ribs be set to suitable or optimal values within a range specified by an optical simulation so that any bad influences on the emission of the light from the light guide body 22 (e.g., visual imperfections) do not occur within the range.

Characteristic of Light-Emitting Part for Vehicle According to an Embodiment

The ornament 10 of the light-emitting ornament 1 according to this embodiment is formed as a curved plate-shaped member and is curved in a substantially arch-like shape in the side view. For this reason, in a state where the light-emitting ornament 1 is attached to the vehicle (that is, the use state), a gap between the rear surface of the ornament 10 and the light-emitting surface 22a of the light guide body 22 is different depending on a position. That is, the ornament 10 has portions which are separated from the light guide body 22 by different gaps in the use state of the light-emitting ornament 1.

The light-emitting ornament 1 according to this embodiment includes a surface brightness adjusting portion which adjusts the brightness of the outer surface of the light-emitting region 10a of the ornament 10 based on the size of the gap between the ornament 10 and the light guide body 22. The surface brightness adjusting portion adjusts the amount of the light transmitted through the ornament 10 based on the gap. Accordingly, it is possible to suppress unevenness in brightness of the light-emitting region 10a caused by the different gaps. That is, in this embodiment, it is possible to obtain more uniform brightness in the entire outer surface of the light-emitting region 10a in the configuration with the curved plate-shaped ornament 10 separated from the planar plate-shaped light guide body 22 by a different gap.

Here, four cases may be exemplified as a method of adjusting the brightness of the outer surface of the light-emitting region 10a:

(1) A first case may be exemplified which adjusts the amount of the light reflected by the prism portion 22d of the light guide body 22 from the light transmitted from the lamp 21.

(2) A second case may be exemplified which adjusts the amount of the light diffused in the ornament 10.

(3) A third case may be exemplified which adjusts the amount of the absorbed light from the light transmitted from the light source unit 20.

(4) A fourth case may be exemplified which adjusts the amount of the shielded light from the light transmitted from the light source unit 20.

Hereinafter, the cases are separately described.

(1) Case of Adjusting Reflected Light Amount

The first case is a case in which a reflected light adjusting portion as one kind of surface brightness adjusting portions is disposed in the light guide body 22. As the reflected light adjusting portion, the prism portions 22d formed as the notches disposed in the rear surface of the light guide body 22 may be exemplified. Hereinafter, a case of using the prism portion 22d as the reflected light adjusting portion is described.

Figure 4:
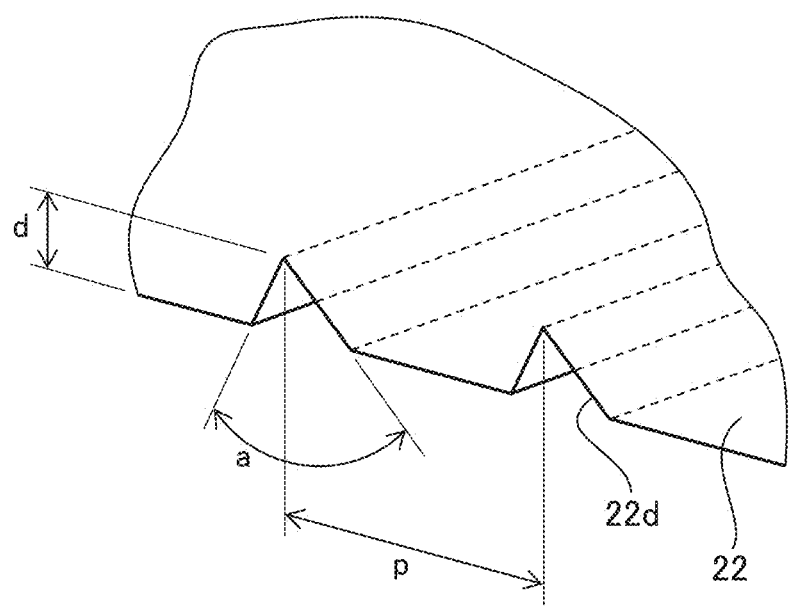
FIG. 4 is an enlarged perspective view of a prism portion of the light guide body.

First, the angle a, the height d, and the pitch p of the prism portion 22d shown in FIG. 4 is described. The angle a of the vertex angle having a V-shaped cross-section of each of the prism portions 22d is equal to or larger than 90° and is equal to or smaller than 120°, in various embodiments. The reason why the prism portion 22d is formed at such an angle a is because the V-shaped groove of the prism portion 22d is stuck to (e.g., formed in) a mold so that the releasability is degraded when the angle a is too narrow. When the angle a is formed as a wide angle, the light fully reflected by the prism portion 22d has a wide angle with respect to the critical angle of the light-emitting surface 22a of the light guide body 22 so that the amount of the light emitted from the light guide body 22 becomes small.

The light reflection amount increases as the height d of the prism portion 22d increases, and the light reflection amount decreases as the height d decreases. According to this embodiment, the height d of the prism portion 22d is set to be equal to or larger than 0.075 millimeters (mm) and equal to or smaller than 0.3 mm. The height d is set within such a range due to the following reasons. If the height d exceeds 0.3 mm, the contact amount between the prism portion 22d and the mold during molding increases, and hence the releasability is degraded. If the height d is smaller than 0.075 mm when sinking occurs while the prism portion 22d is molded, a desired height d is not easily obtained, and hence the molding transferability is degraded.

Figure 5B:
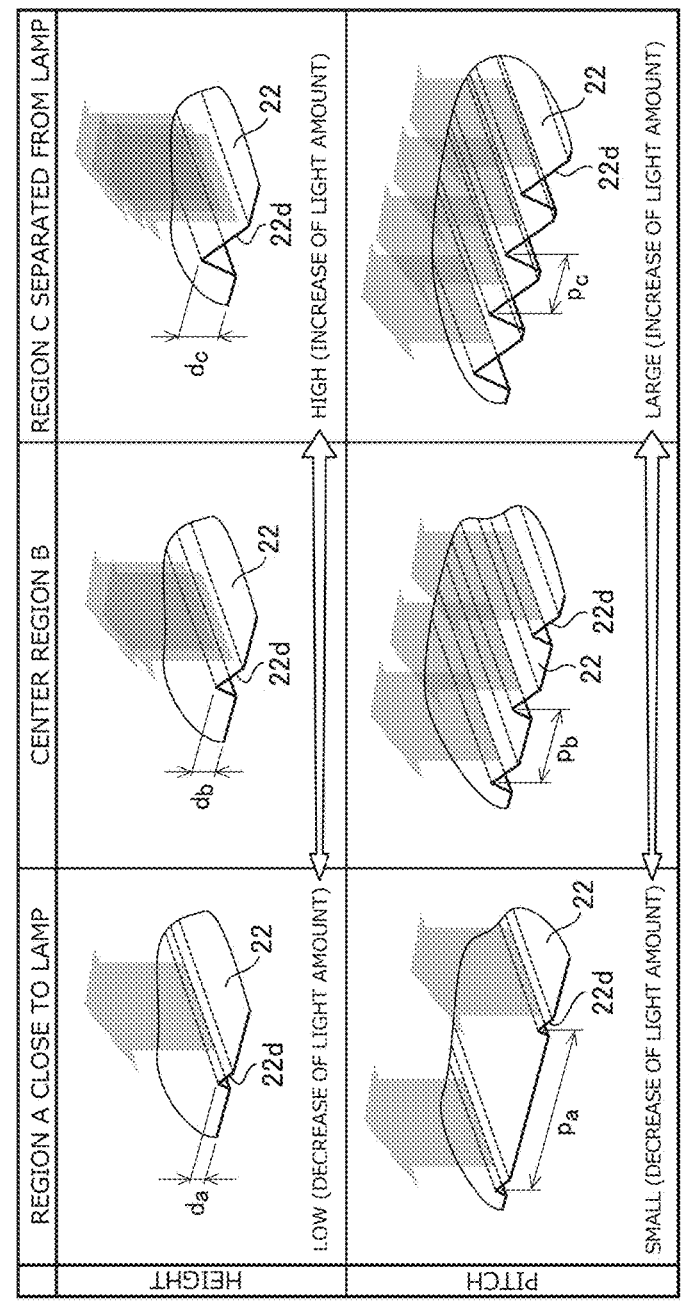

Particularly, as shown in FIG. 5, the height d of the prism portion 22d is formed to increase as it moves away from the lamp 21 in consideration of the attenuation of the light in response to the distance from the lamp 21. Specifically, the prism portion 22d of this embodiment is formed so that the height da of the prism portion 22d in the region A closest to the lamp 21 in the light guide body 22 is 0.075 mm, the height db of the prism portion 22d in the center region B of the light guide body 22 is 0.15 mm, and the height dc of the prism portion 22d in the region C separated from the lamp 21 in the light guide body 22 is 0.27 mm.

Relation Between Distance from Lamp 21 and Height d of Prism Portion 22d

The reason why the height d of the prism portion 22d is set in this way in response to the distance from the lamp 21 is described below. For example, when the heights d of the prism portions 22d in the region A, the region B, and the region C are the same, the incident light is reflected toward the ornament 10 by the prism portion 22d in the region A, and hence the amount of the light reaching the prism portion 22d in the region B decreases. Further, the amount of the light reaching the prism portion 22d in the region C is small in that the region C is more separated from the lamp 21 as compared to the region A and the region B. Accordingly, since the light which is reflected by the prism portion 22d and is emitted from the light guide body 22 does not have sufficient uniformity, there is a need to increase the height of the prism portion 22d in the region separated from the lamp 21.

Specifically, the height db of the prism portion 22d in the region B is set to be higher than the height da of the prism portion 22d in the region A. Since the prism portions 22d are formed in this way, the area contacting the light transmitted from the lamp 21 to the prism portion 22d in the region B becomes larger than the area of the prism portion 22d in the region A by the difference between the height da and the height db. In this way, the reflected light amount can be made substantially the same in the region A and the region B.

Similarly, the height dc of the prism portion 22d in the region C is set to be higher than the height db of the prism portion 22d in the region B. Since the prism portions 22d are formed in this way, the area contacting the light transmitted from the lamp 21 to the prism portion 22d in the region C becomes larger than the area of the prism portion 22d in the region B by the difference between the height db and the height dc. In this way, the amount of the light emitted from the region A, the region B, and the region C of the light guide body 22 can be made substantially the same.

In order to obtain substantially the same reflected light amount by the prism portion 22d in a manner other than the above-described method of obtaining substantially the same reflected light amount by the prism portion 22d by adjusting the height d of the prism portion 22d in response to the distance from the lamp 21, the reflected light amount can be made substantially the same by changing the pitch p of the prism portion 22d.

As for the pitch p of the prism portion 22d, the number of the prism portions per unit area increases when the pitch is small, and the number of the prism portions per unit area decreases when the pitch is large. The pitch p is set to be equal to or larger than 1.68 mm and equal to or smaller than 13.21 mm. As shown in FIG. 5, the pitch is generally set to be decreased at locations further away from the lamp 21. Specifically, the prism portion 22d of this embodiment is formed so that the pitch pa of the prism portion 22d near the region A is 13.2 mm, the pitch pb of the prism portion 22d near the region B is 4.2 mm, and the pitch pc of the prism portion 22d near the region C is 1.7 mm.

Relation Between Distance from Lamp 21 and Pitch p of Prism Portion 22d

The reason why the pitch p of the prism portion 22d is set in this way in response to the distance from the lamp 21 is described below. As described above, when the adjacent prism portions 22d in the region A, the region B, and the region C have the same height d and the same pitch p, the light which is reflected by the prism portion 22d and is emitted from the light guide body 22 does not have sufficient uniformity.

In order to obtain the substantially uniform light emitted from the light guide body 22, the pitch pb of the adjacent prism portions 22d in the region B is set to be smaller than the pitch pa of the adjacent prism portions 22d in the region A and the number of the prism portions 22d per unit area in the region B is set to be larger than that of the region A. With this configuration, the reflected light amount in the region A and in the region B can be made substantially the same.

Similarly, the pitch pc of the adjacent prism portions 22d in the region C is set to be smaller than the pitch pb of the adjacent prism portions 22d in the region B so that the number of the prism portions 22d per unit area in the region C is set to be larger than that of the region B. With this configuration, the reflected light amount in the region A and in the region B can be made substantially the same. In this way, the amount of the light emitted from the region A, the region B, and the region C of the light guide body 22 can be made substantially uniform.

As described above, in the parameters involved with the light reflection amount including the height d of the prism portion 22d and the pitch p of the adjacent prism portions 22d, any one parameter may be adjusted or both parameters may be adjusted in response to the length or the thickness of the light guide body 22.

Further, the parameters of the region are adjusted in each of the region A, the region B, and the region C. However, the divided region may be further divided or the parameters may be gradually adjusted without dividing each region.

In the description above, an example has been described in which the light is more uniformly emitted from the light guide body 22 by changing the height d of the prism portion 22d and the pitch p of the adjacent prism portions 22d in response to the distance from the lamp 21.

When the light-emitting region 10a of the ornament 10 and the light-emitting surface 22a of the light guide body 22 are disposed in parallel, the light is more uniformly emitted from the light guide body 22, and hence the light is more uniformly emitted from the light-emitting region 10a.

Figure 6A:
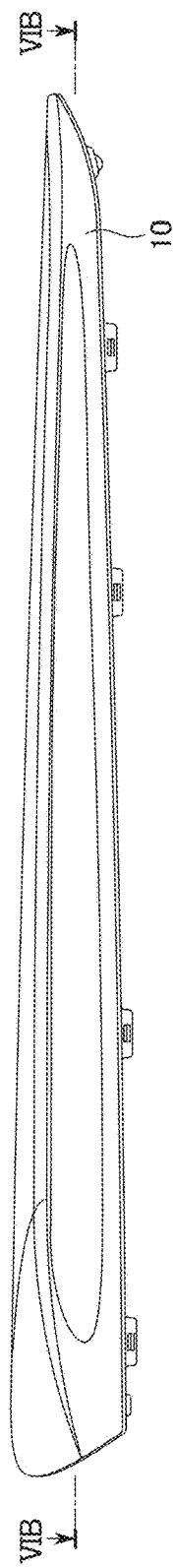
FIG. 6A is a diagram illustrating a side view of a light-emitting ornament and FIG. 6B is a cross-sectional view illustrating a gap between the ornament and the light guide body when taken along the line VIB-VIB of FIG. 6A.
Figure 6B:
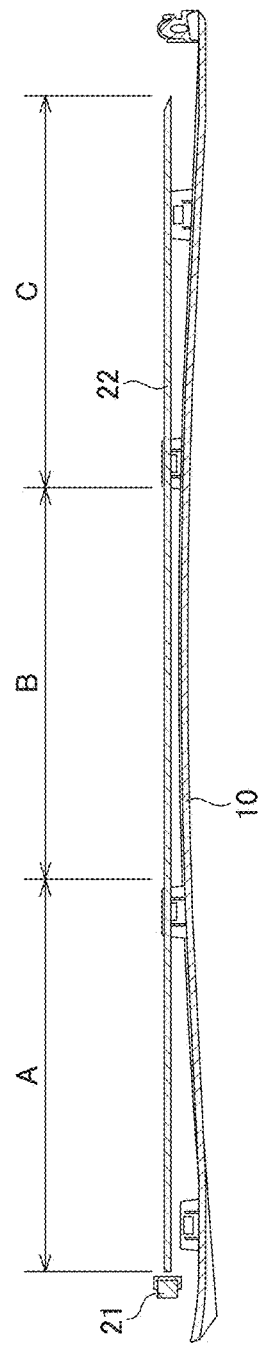

However, when the ornament 10 is curved inward and the light-emitting region 10a of the ornament 10 is not disposed in parallel to the light guide body 22 as shown in FIG. 6B as a cross-sectional view taken along the line VIB-VIB of FIG. 6A, it is not possible to keep the uniformity of the light emitted from the light-emitting region 10a.

Next, a case is described in which the light is more uniformly emitted from the ornament 10 in consideration of the distance between the ornament 10 and the light guide body 22.

In this embodiment, in a state where the light-emitting ornament 1 including the ornament 10 and the light source unit is attached to the door lining body 2, the region A closest to the lamp 21 and the region C separated from the lamp in the light guide body 22 are more separated from the ornament 10 as compared to the center region B as shown in FIG. 6B. In other words, the region B of the light guide body 22 is closest to the ornament 10 as compared to the region A and the region C.

For this reason, the amount of the light emitted from a portion of the ornament 10 that faces the regions A and C of the light guide body 22 decreases in that the distributed light amount decreases due to a large gap from the light guide body 22. Of course, the amount of the light emitted from a portion of the ornament 10 that faces the region B of the light guide body 22 increases in that the gap from the light guide body 22 is small. In consideration of this relation, the height d and the pitch p of the prism portion 22d for each of the region A, the region B, and the region C are adjusted.

Figure 7:
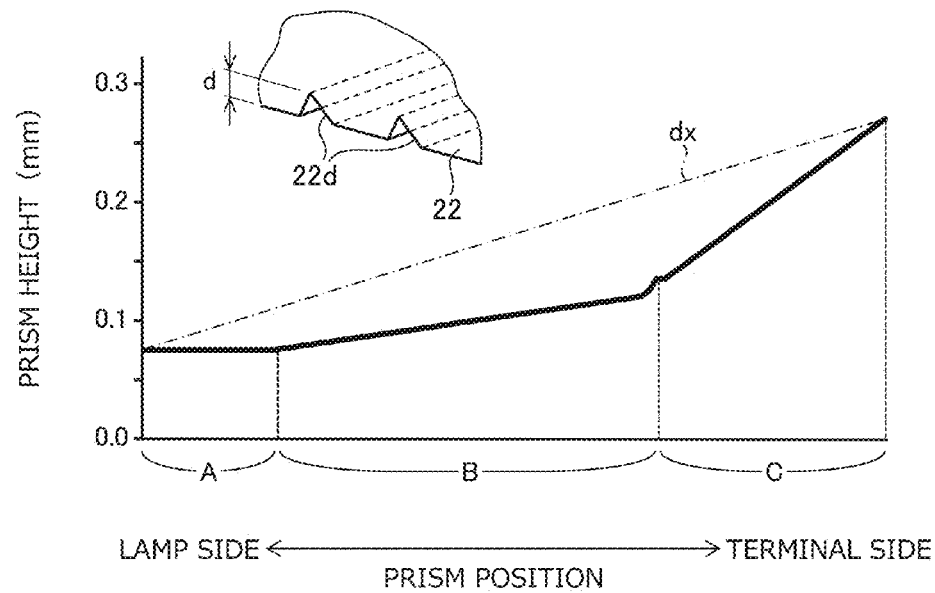
FIG. 7 is a diagram illustrating a relation between the height of the prism portion and the position from the lamp.
Figure 8:
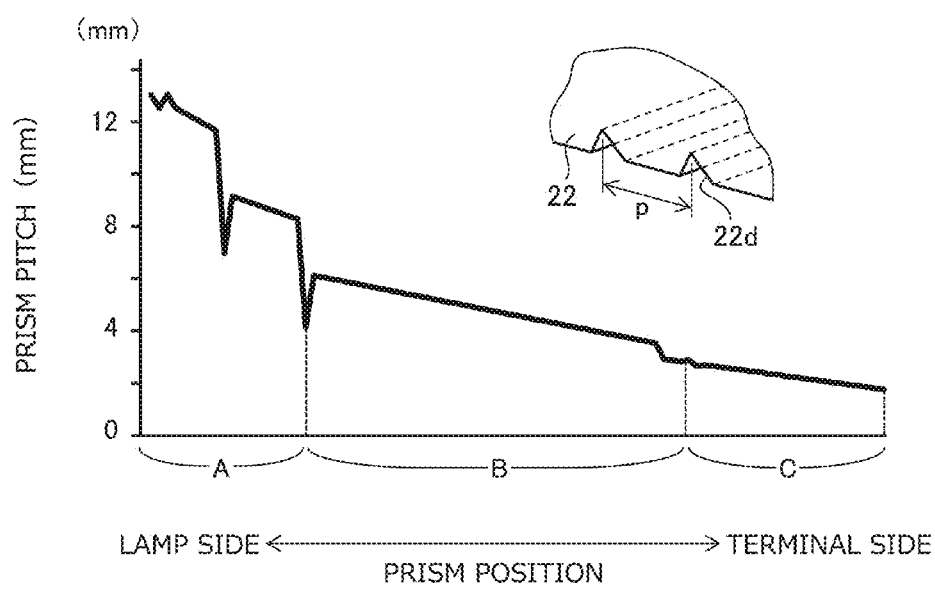
FIG. 8 is a diagram illustrating a relation between the pitch of the prism portion and the position from the lamp.

Relation of Gap Between Ornament 10 and Light Guide Body 22 with Respect to Height d of Prism Portion 22d FIG. 7 is a diagram illustrating a relation between the distance from the lamp 21 and the height d of the prism portion 22d. A linear comparison line dx, shown in FIG. 7 as a dashed line and one-dot chain line, indicates a line corresponding to a linear change of the height d of the prism portion 22d only in response to the distance from the lamp 21 without considering the gap between the prism portion 22d and the ornament 10, and also indicates a line to be compared with the height d of the prism portion 22d according to this embodiment. Further, FIG. 8 is a diagram illustrating a relation between the distance from the lamp 21 and the pitch p of the adjacent prism portions 22d.

As shown in FIG. 7, the height db of the prism portion 22d in the region B having a small gap with respect to the ornament 10 is lower than the height of the prism portion 22d indicated by the linear comparison line dx. Since the prism portion 22d in the region B is formed in this way, the amount of the light which is reflected by the prism portion 22d in the region B and is emitted from the light guide body 22 is suppressed. In this way, the amount of the light emitted from the light guide body 22 in the region B is suppressed. However, since the ornament 10 is disposed near the light guide body 22 compared with the region A and the region C, the amount of the light emitted from the ornament 10 becomes more uniform.

In addition, the height da of the prism portion 22d in the region A is formed uniformly at about 0.075 mm as the same height as the height db of the prism portion 22d at the boundary with the region B. In this way, since the height da of the prism portion 22d in the region A is formed uniformly, the amount of the light reaching the prism portion 22d in the vicinity of the lamp 21 increases, and the amount of the light reaching the prism portion 22d at the boundary of the region B decreases. Thus, it is not possible to keep the uniformity of the amount of the light which is reflected by the prism portion 22d in the region A to be emitted. Here, the uniformity of the emitted light amount is kept by the adjustment of the pitch p of the adjacent prism portions 22d in the region A as described below.

Adjustment of Pitch of Prism Portion 22d in Response to Height da of Prism Portion 22d Formed in Response to Gap Between Ornament 10 and Light Guide Body 22

As shown in FIG. 8, the pitch pa between the adjacent prism portions 22d in the region A is set to be large in the vicinity of the lamp 21 and is set to be small at the boundary of the region B. Since the prism portions 22d in the region A are formed in this way, the reflected amount of the light reaching the prism portion 22d decreases in the vicinity of the lamp 21 and increases at the boundary of the region B. Accordingly, the amount of the light emitted from the prism portion 22d can be made substantially uniform, and hence the amount (the surface brightness) of the light emitted from the ornament 10 through the light guide body 22 can be made more uniform.

In addition, the amount of the light emitted from the ornament 10 is made uniform in the regions A, B, and C by suppressing the reflected light amount in the region B by setting the height db of the prism portion 22d in the region B, as the region in which the ornament 10 is close to the light guide body 22, to be lower than the height of the prism portion 22d according to the linear comparison line dx.

For example, the reflected light amount may be suppressed by adjusting the pitch P between the adjacent prism portions 22d in the region B as the region in which the ornament 10 is close to the light guide body 22. Specifically, the reflected light amount may be suppressed by increasing the pitch pb in the region B. On the contrary, the reflected light amount may be increased in the regions in which the ornament 10 is separate from the light guide body 22, in the regions A and C, by decreasing the pitches pa and pc. Further, the light may be more uniformly emitted from the ornament 10 by adjusting an increased/decreased light amount caused by a difference in the gap between the ornament 10 and the light guide body 22 in a manner such that both the height d of the prism portion 22d and the pitch p of the adjacent prism portions 22d are adjusted.

Further, in the above-described embodiment, a case has been described in which one lamp 21 is disposed in one light guide body 22 to face one end of the light guide body 22. However, for example, two or more lamps 21 may be disposed to face both ends of the light guide body 22. That is, the number of the lamps is not limited to one lamp. Even in such a case, the height d and the pitch p of the prism portion 22d may be set based on the light amount at each position of the light guide body 22 calculated by the combination of the light emitted from the lamps 21 and the gap between the light guide body 22 and the ornament 10.

MODIFIED EXAMPLE 1

The ornament 10 according to the above-described embodiment having a shape in which the regions A and C at the ends in the light traveling direction from the lamp 21 are separated from the light guide body 22 and the center region B is close to the light guide body 22 has been described, but the invention is not limited thereto.

Figure 9:
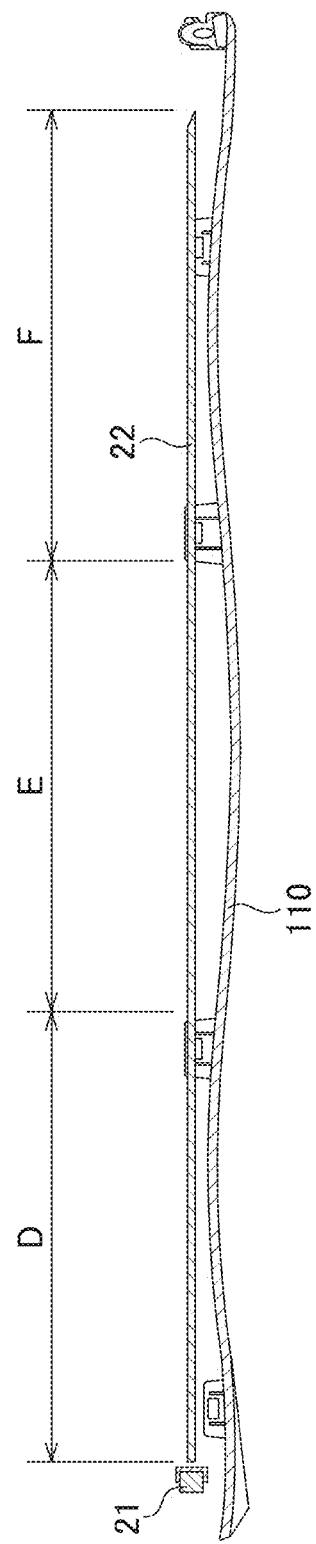
FIG. 9 is a diagram illustrating a gap between an ornament and a light guide body according to a modified example.

For example, an ornament 110 shown in FIG. 9 may be configured so that the regions D and F at the ends in the light travel direction from the lamp 21 are close to the light guide body 22 and the center region E is separated from the light guide body 22. Even in such an ornament 110, the prism portion 22d may be formed to satisfy any one of high density and a high height compared with the density and the height of the prism portion 22d in the case where the light guide body 22 and the ornament 110 are disposed to be close to each other in the region E.

MODIFIED EXAMPLE 2

Figure 10A:
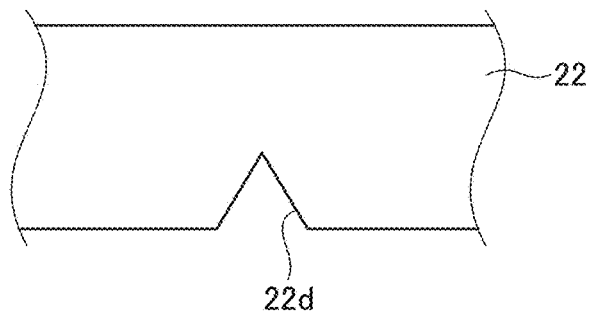
FIG. 10A is a top view illustrating the prism portion according to this embodiment formed as a groove having a V-shaped cross-section.
Figure 10B:
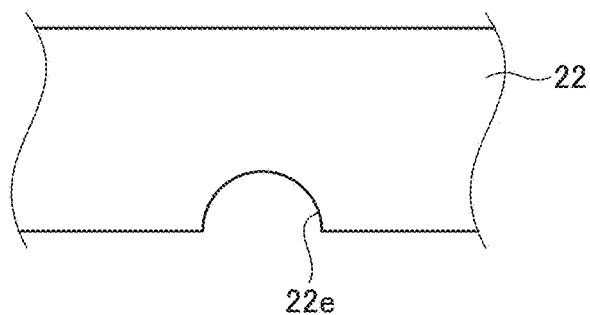
FIG. 10B is a top view illustrating a prism portion according to a first modified example formed as a groove having a U-shaped cross-section.
Figure 10C:
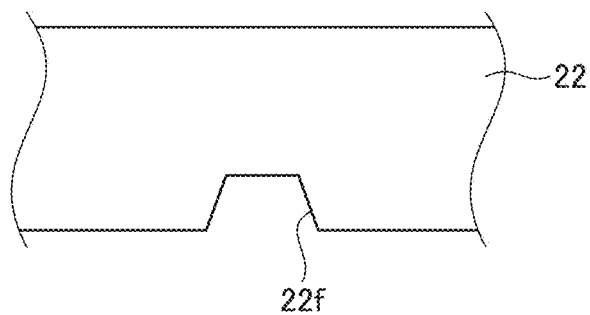
FIG. 10C is a top view illustrating a prism portion according to a second modified example formed as a groove having a trapezoidal cross-section.

It is desirable that the prism portion 22d according to the above-described embodiment have a groove shape with a V-shaped cross-section as shown in FIGS. 3A, 4, and 10A in that the reflected light amount toward the ornament 10 increases, but the invention is not limited thereto. For example, as shown in FIG. 10B, a prism portion 22e formed in a groove shape with a U-shaped cross-section and a prism portion 22f formed in a groove shape with a trapezoidal cross-section of which the bottom is short may be used as the reflection portion. In the prism portion 22e and the prism portion 22f formed in this way, the angle of the corner of the mold for forming the prism portion becomes an obtuse angle. Accordingly, it is possible to prevent the grooves forming the prism portion 22e and the prism portion 22f from being stuck to the mold, and hence to obtain satisfactory releasability compared with the prism portion 22d.

MODIFIED EXAMPLE 3

Figure 11:
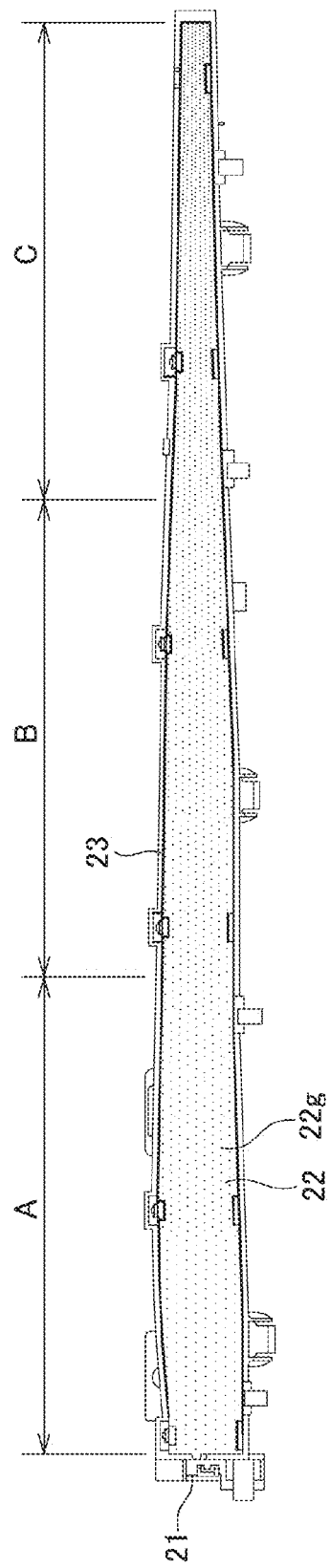
FIG. 11 is a diagram illustrating a light guide body that includes a dot-shaped reflection portion according to a third modified example.

Further, an example has been described in which the prism portions 22d, 22e, and 22f formed in a groove shape is used as the reflection portion, but the invention is not limited thereto. For example, dot-shaped concave portions 22g may be formed as shown in FIG. 11.

Similarly to the prism portions 22d, 22e, and 22f, the concave portion 22g is formed in the outer surface of the light guide body 22, in other words, the surface opposite to the ornament 10. Similarly to the prism portions 22d, 22e, and 22f, the reflected light amount in the concave portion 22g increases when the height is high or the density (the number per unit area) is high. For this reason, similarly to the prism portions 22d, 22e, and 22f, the concave portion 22g is generally formed to satisfy at least one of the high density and the high height as the concave portion is formed at a position separated from the lamp 21, in other words, the concave portion is configured differently at the region B as compared to the region A or the region C as compared to the region B.

Further, the concave portion 22g is formed to satisfy at least one of the high density and the high height when the size of the gap between the light guide body 22 and the ornament 10 is large, and is formed to satisfy at least one of the low density and the low height when the size of the gap between the light guide body 22 and the ornament 10 is small. In this way, when the amount of the light emitted from the light guide body 22 is adjusted, the uniform light can be emitted from the ornament 10.

(2) Case of Adjusting Diffused Light Amount

The second case is a case in which a diffused light adjusting portion is implemented as one kind of a surface brightness adjusting portion. As the diffused light adjusting portion, for example, a concave portion or a convex portion formed in the rear surface of the ornament 10 (a surface opposite to the outer surface of the light-emitting region 10a) is desirable. Specifically, a diffusing recess formed by embossing is desirable. Then, when the size of the diffusing recess or the number of the diffusing recesses per unit area is changed in response to the size of the gap between the light guide body 22 and the ornament 10, the amount of the light diffused in the ornament 10 is adjusted, and hence the light can be more uniformly emitted from the light-emitting region 10a of the ornament 10.

In addition, a known light diffusing sheet may be stuck to the rear surface of the ornament 10 to be used as the diffused light adjusting portion. In such a configuration, the light can be more uniformly emitted from the light-emitting region 10a when the light diffusing sheet is formed so that the diffusivity is changed in response to the size of the gap between the light guide body 22 and the ornament 10.

Furthermore, when a light diffusing material is included in the ornament 10, the light diffusing material can be used as the diffused light adjusting portion. That is, when the content of the light diffusing material is changed in response to the size of the gap between the light guide body 22 and the ornament 10, the light can be more uniformly emitted from the light-emitting region 10a.

(3) Case of Adjusting Absorbed Light Amount

The third case is a case in which an absorbed light adjusting portion is implemented as one kind of a surface brightness adjusting portion. As the absorbed light adjusting portion, for example, black pigment included in the ornament 10 can be used. That is, when the content of the black pigment in the ornament 10 is changed according to the size of the gap between the light guide body 22 and the ornament 10, the light absorption amount in the entire ornament 10 is adjusted, and hence the light can be more uniformly emitted from the light-emitting region 10a.

Similarly, the holder 23 that holds the light source unit 20 serves as the absorbed light adjusting portion. Specifically, the light absorption amount for the light emitted from the light guide body 22 changes in response to the degree of light and darkness of the color of at least one of the frame wall 24a and the bottom wall 24e surrounding the light guide body 22 in the holder 23. By using this configuration, when the degree of light and darkness of the color of at least one of the frame wall 24a and the bottom wall 24e is changed in response to the size of the gap between the light guide body 22 and the ornament 10, the light absorption amount is adjusted, and hence the light can be more uniformly emitted from the light-emitting region 10a.

In addition, a known light diffusing sheet may be stuck to the rear surface of the ornament 10 to be used as the diffused light adjusting portion. In such a configuration, when the light diffusing sheet is formed to change the diffusivity in response to the gap between the light guide body 22 and the ornament 10, the light can be more uniformly emitted from the light-emitting region 10a.

Furthermore, when a light diffusing material is included in the ornament 10, the light diffusing material can be used as the diffused light adjusting portion. That is, when the content of the light diffusing material is changed in response to the gap between the light guide body 22 and the ornament 10, the light can be more uniformly emitted from the light-emitting region 10a.

(4) Case of Adjusting Shielded Light Amount

The fourth case is a case in which a shielded light adjusting portion is implemented as one kind of a surface brightness adjusting portion. The shielded light adjusting portion is used to adjust the shielded light amount from the light from the light source unit 20. In order to more specifically describe the shielded light adjusting portion, a light-emitting part for a vehicle according to a second embodiment is described below.

Figure 12:
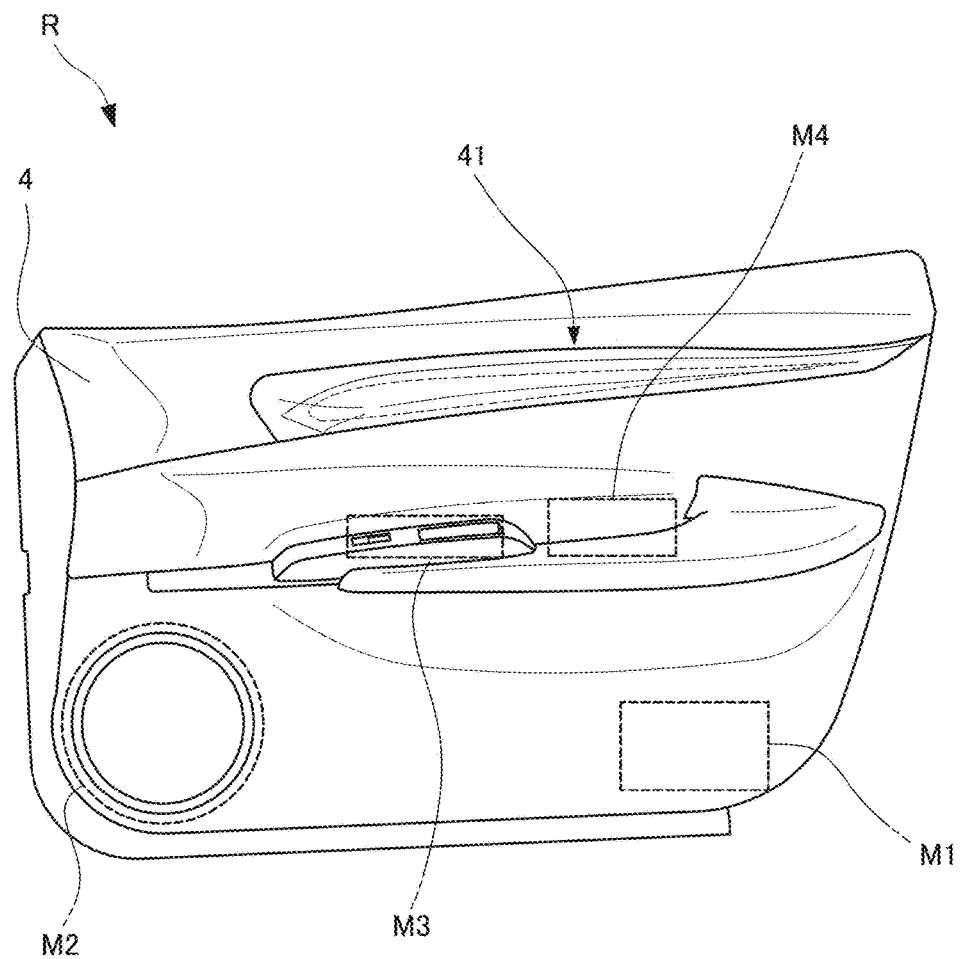
FIG. 12 is a diagram illustrating a vehicle door lining that uses a light-emitting part for a vehicle according to a second embodiment.

The light-emitting part for the vehicle according to the second embodiment is a light-emitting ornament 41 for a vehicle door lining R. In addition, as shown in FIG. 12, a pocket trim or a door armrest is implemented as a component, other than the light-emitting ornament 41, that forms the vehicle door lining R, and these components are attached to the inside of the door base. The door base is obtained by the combination of an upper base and a lower base in the up and down direction, and the light-emitting ornament 41 is attached to the inner surface of the lower base.

In addition, an accommodation space is formed between the door inner panel and the lower base in the vehicle door lining R, and such an accommodation space accommodates a side projection part or a speaker to absorb an impact generated in the event of side collision. Here, the side projection part is disposed in a range indicated by the sign M1 in FIG. 12, and the speaker is disposed in a range indicated by the sign M2 in FIG. 12. Further, a switch panel which is operated to adjust the window opening/closing state is disposed on the upper surface (a range indicated by the sign M3 in FIG. 12) of the end of the door armrest. Additionally, a cavity (a pull pocket) into which a passenger's hand is inserted to open or close the door is disposed between the lower base and the front end of the door armrest (a range indicated by the sign M4 in FIG. 12).

Figure 13:
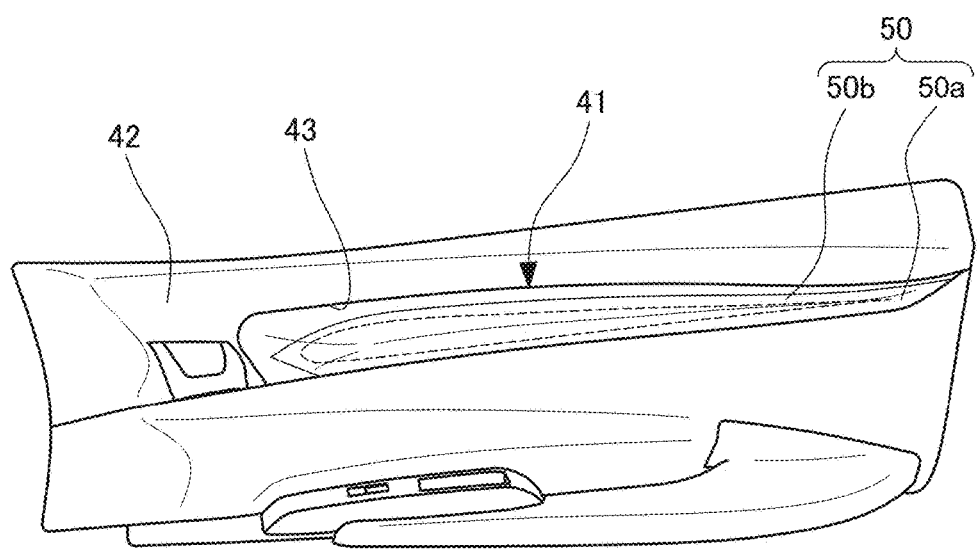
FIG. 13 is an enlarged view of the light-emitting part for the vehicle according to the second embodiment.
Figure 14:
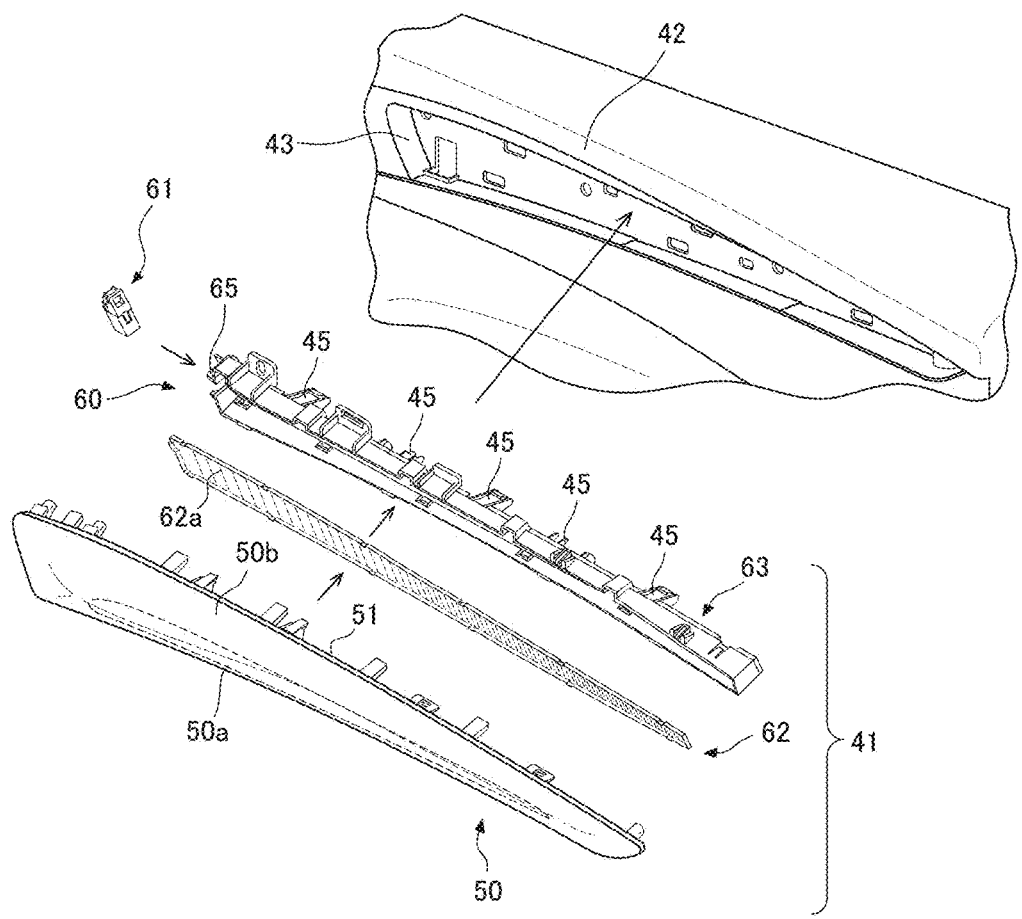
FIG. 14 is an exploded perspective view of the light-emitting part for the vehicle according to the second embodiment.
Figure 15:
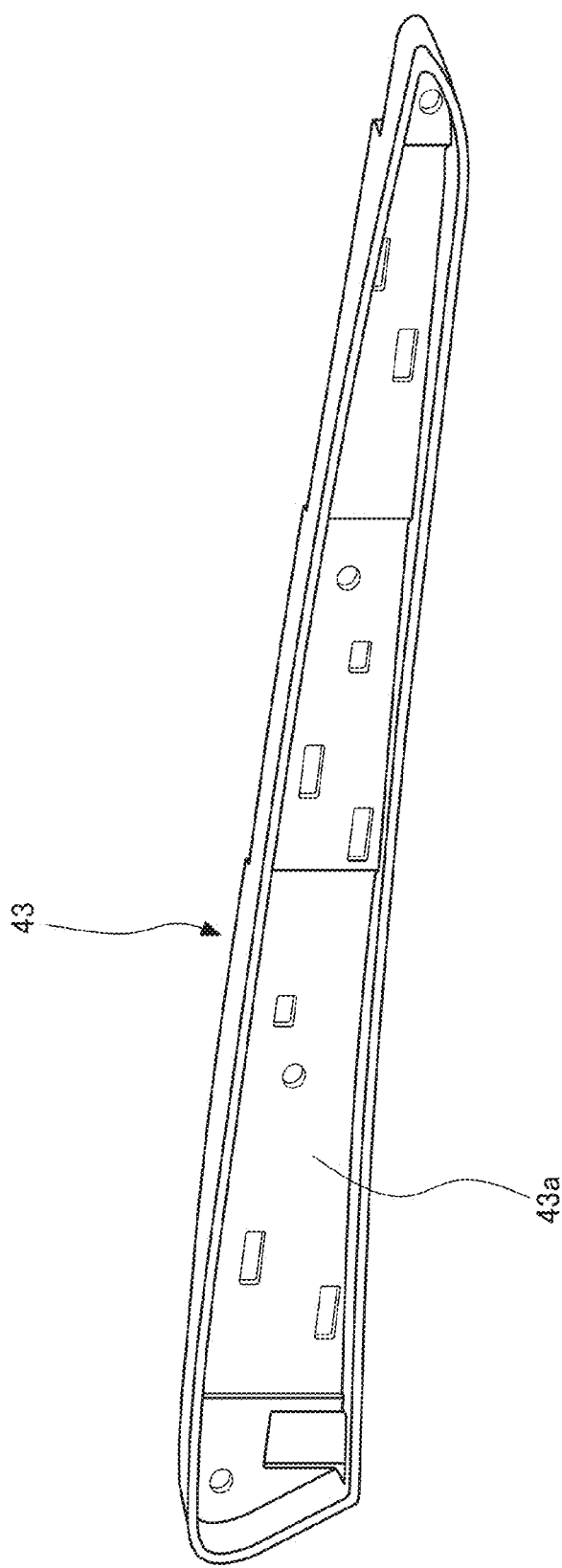
FIG. 15 is a perspective view of an accommodation casing according to the second embodiment.
Figure 16:
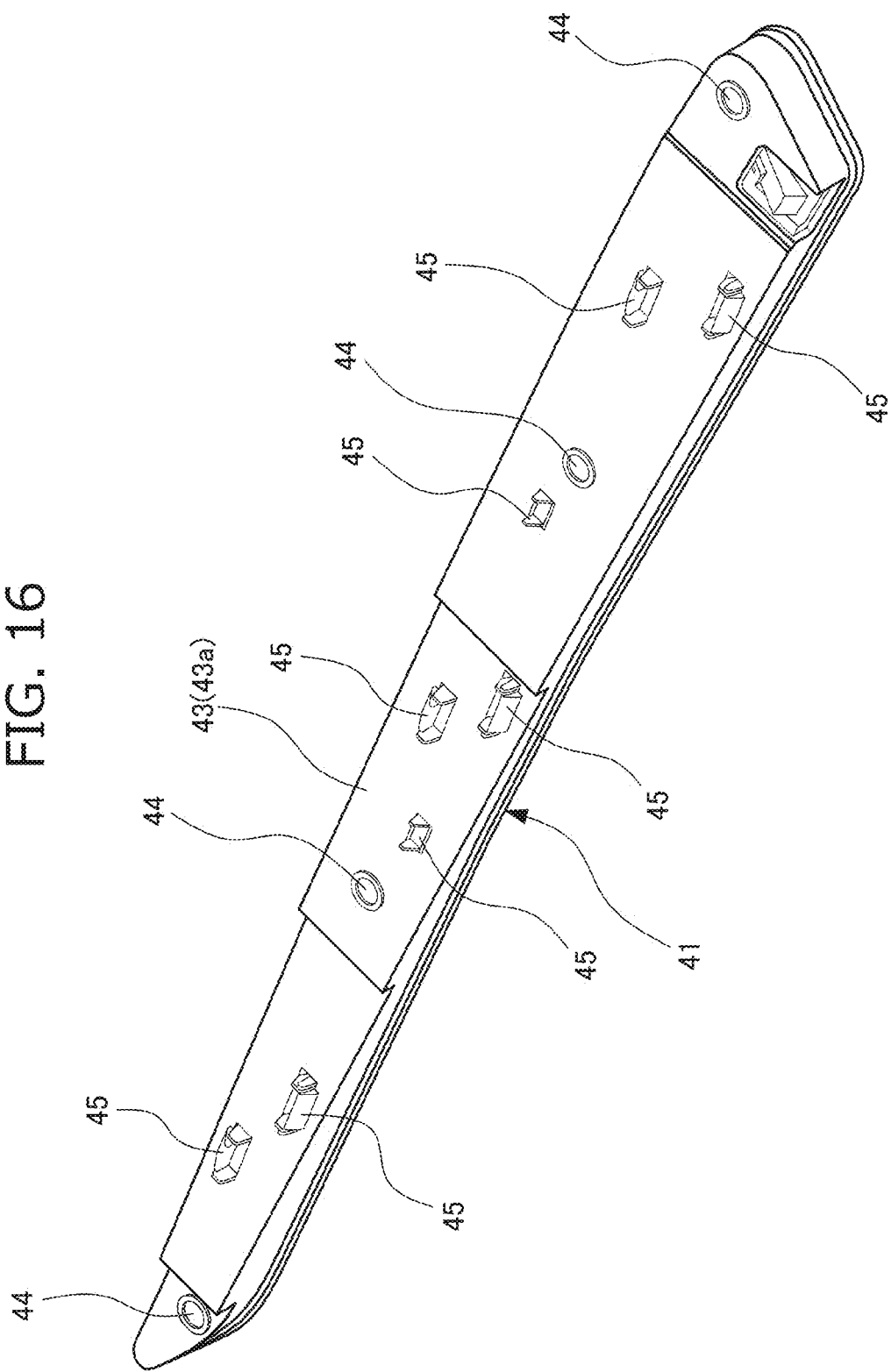
FIG. 16 is a rear perspective view of the light-emitting part for the vehicle according to the second embodiment.

The light-emitting ornament 41 according to the second embodiment also serves as a vehicle door illumination device as shown in FIG. 13, and is attached to an accommodation casing 43 disposed in a door lining body 42 as shown in FIG. 14. The accommodation casing 43 is a frame body which is formed along the outer shape of the light-emitting ornament 41 and which has a vehicle interior side that is opened as shown in FIG. 15. Then, a bottom wall 43*a* is disposed at the opposite side to the opening. Then, the light-emitting ornament 41 is attached to the door lining body 42 in a manner such that the light-emitting ornament 41 is fitted into the accommodation casing 43 from the opening. In addition, in order to fix the light-emitting ornament 41 into the accommodation casing 43 in a fitted state, a plurality of holes is formed in the bottom wall 43*a* of the accommodation casing 43 as shown in FIG. 15. Then, as shown in FIG. 16, the light-emitting ornament 41 is fixed to the accommodation casing 43 in a manner such that a screw 44 is inserted into the hole or a protruding claw 45 protruding from the rear surface of the light-emitting ornament 41 (precisely, a holder 63) is fitted into the hole.

Figure 17:
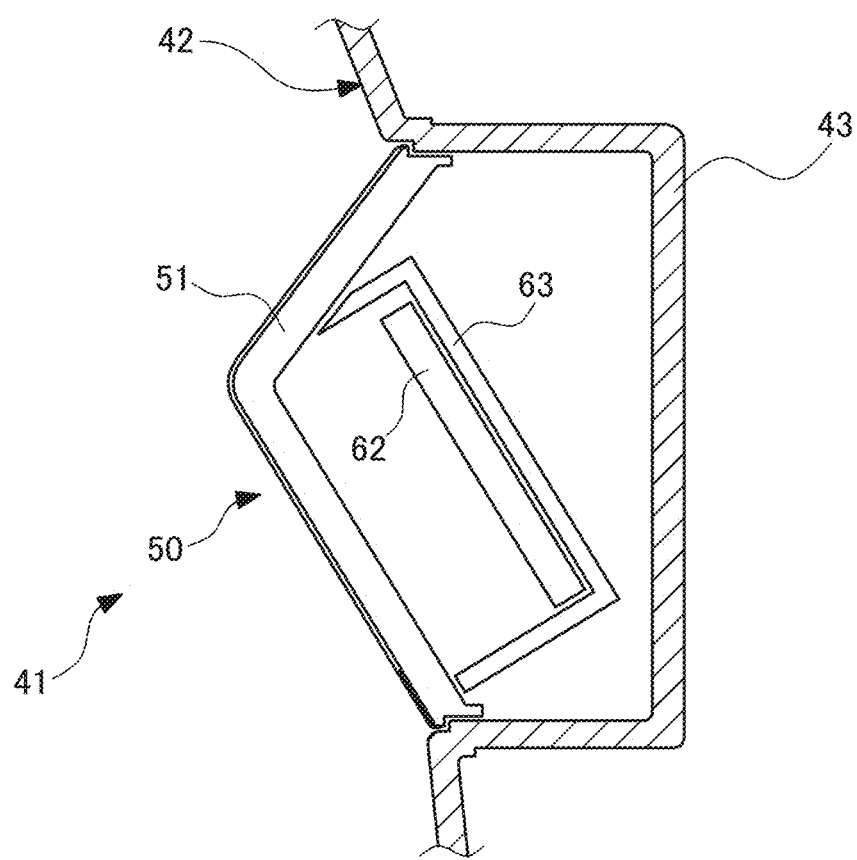
FIG. 17 is a cross-sectional view illustrating an attachment structure of the light-emitting part for the vehicle according to the second embodiment.

The configuration of the light-emitting ornament 41 according to the second embodiment is described in detail. The light-emitting ornament 41 is attached to the door lining body 42. Specifically, as shown in FIG. 17, an outer edge of an ornament unit 50 is bonded to the door lining body 42, that is, the edge of the opening formed in the accommodation casing 43.

Figure 21:
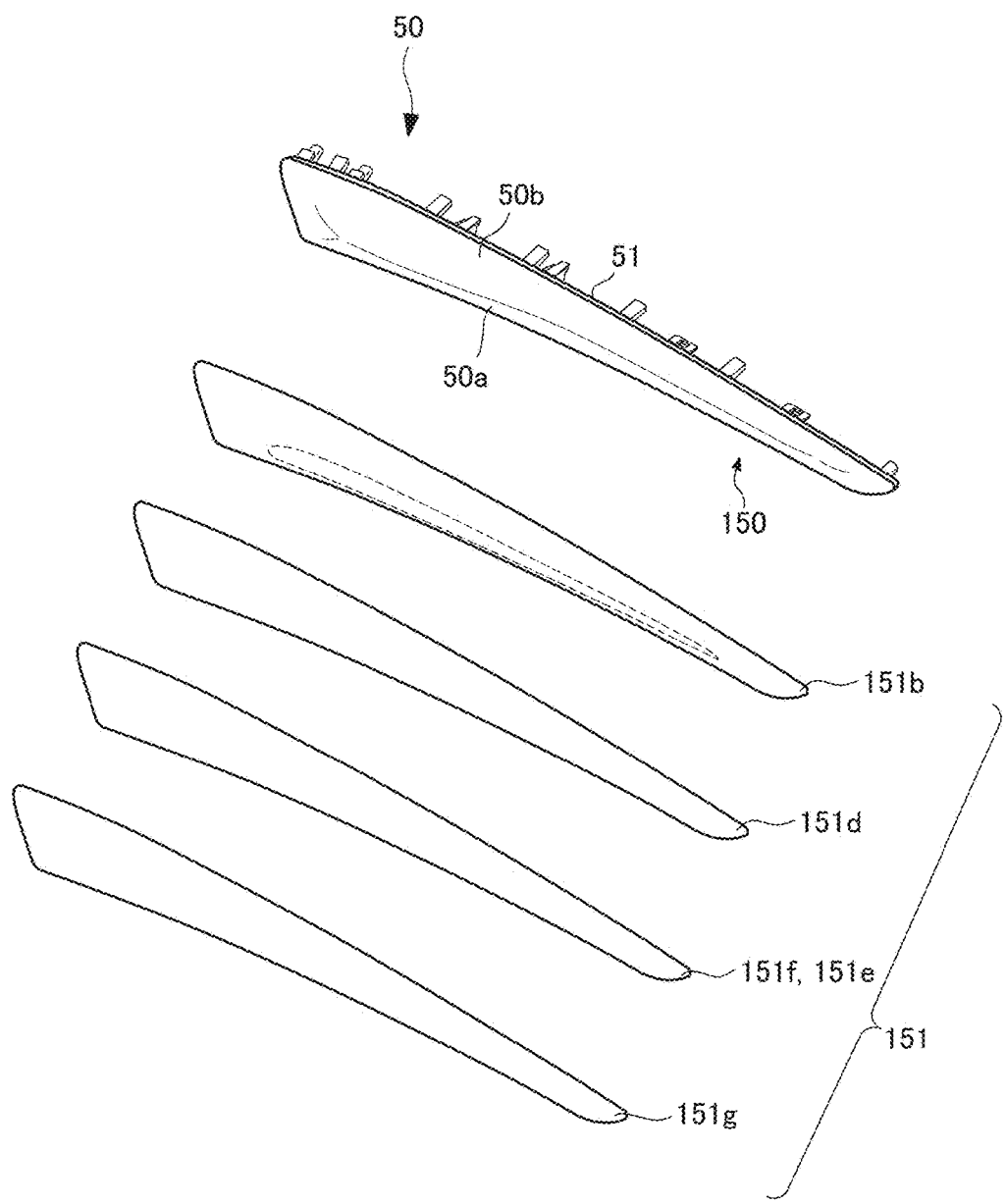
FIG. 21 is an exploded perspective view illustrating a layer configuration of a decorative film according to the second embodiment.

As shown in FIG. 14, the light-emitting ornament 41 is a module which is obtained by the combination of the ornament unit 50 and a light source unit 60 as an irradiation body. The ornament unit 50 includes an ornament base 150 (FIG. 21) which is a resin base and a decorative film 151 (FIG. 21) which is disposed on the surface (one surface) of the ornament base 150, and includes a light-emitting region 50*a* and a non-light-emitting region 50*b* as shown in FIG. 13. Each of the light-emitting region 50*a* and the non-light-emitting region 50*b* is a portion of the ornament base 150 and the decorative film 151 disposed on the ornament base 150. That is, both the light-emitting region 50*a* and the non-light-emitting region 50*b* are formed as a layer structure, and the decorative film 151 is stuck to the front surface of the ornament base 150.

More specifically, the ornament base 150 according to the second embodiment is bent in an arch-like shape and the surface thereof has a curved surface portion. Thus, the decorative film 151 is stuck thereto to follow the curved surface portion. Further, in the second embodiment, the decorative film 151 is stuck to the ornament base 150 by in-mold molding. However, as alternative methods, film insert molding, vacuum pressure molding, or water transferring can be used.

Further, the ornament unit 50 is disposed at the front side of the light source unit 60. More specifically, the ornament unit 50 is closely assembled to the holder 63 from the front side of the holder 63 as described below. In addition, snap fitting or recessed/projected fitting is suitable as a method of assembling the ornament unit 50 to the holder 63.

Figure 18:
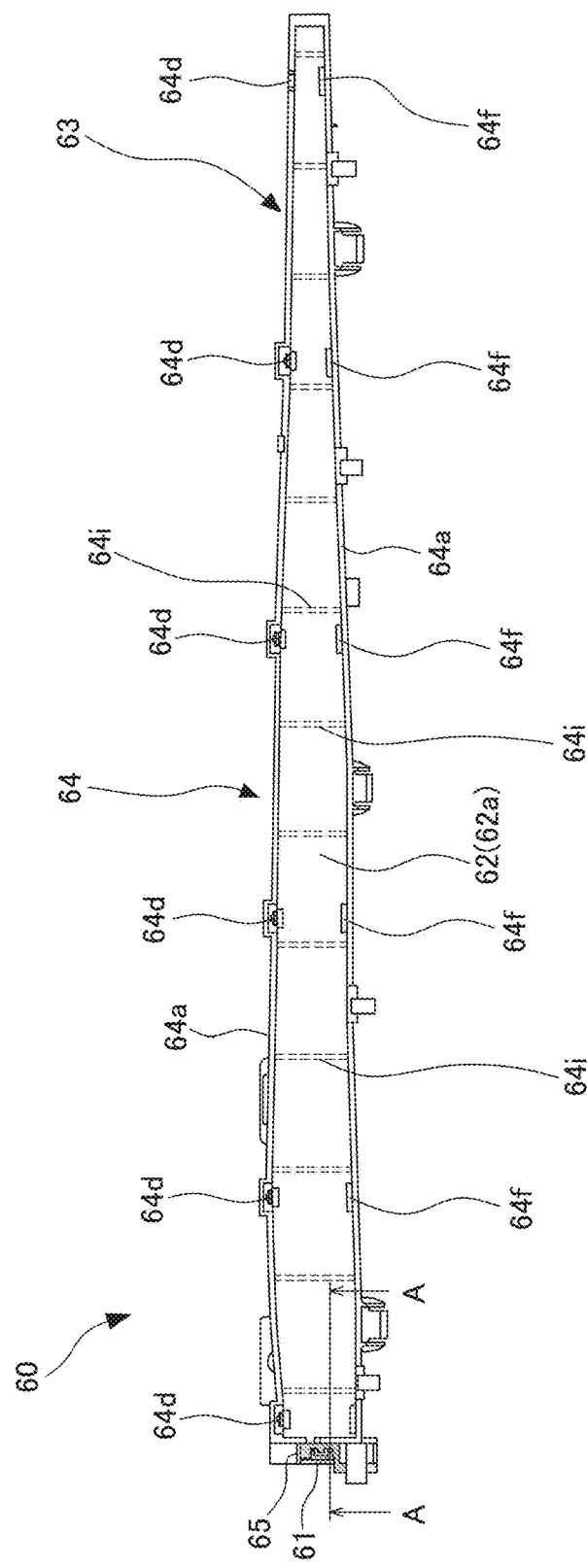
FIG. 18 is a front view of a light source unit according to the second embodiment.
Figure 19:
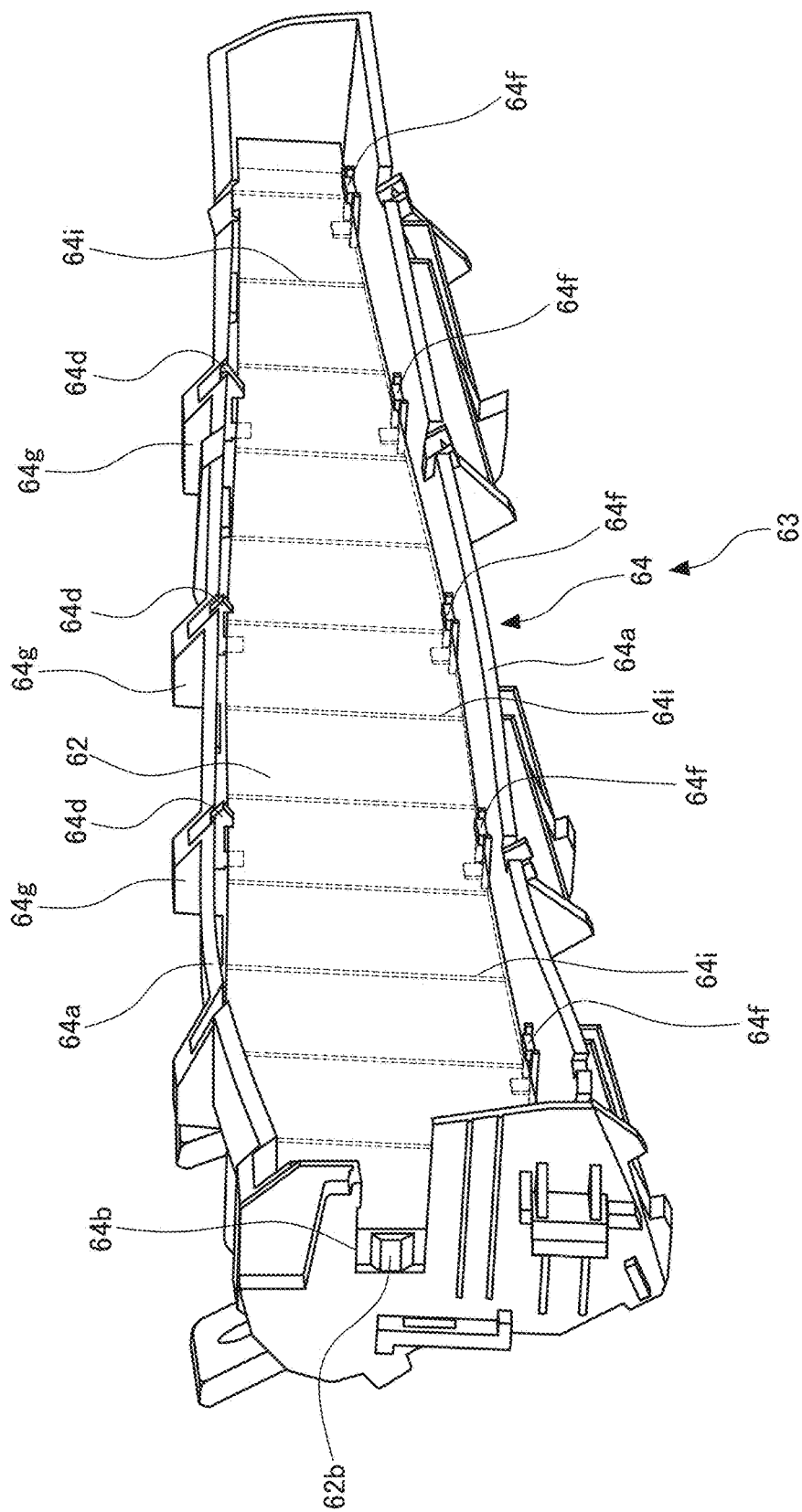
FIG. 19 is a perspective view of a holder illustrating a state where a light guide body is held by a light guide body holding portion of the holder according to the second embodiment.
Figure 20:
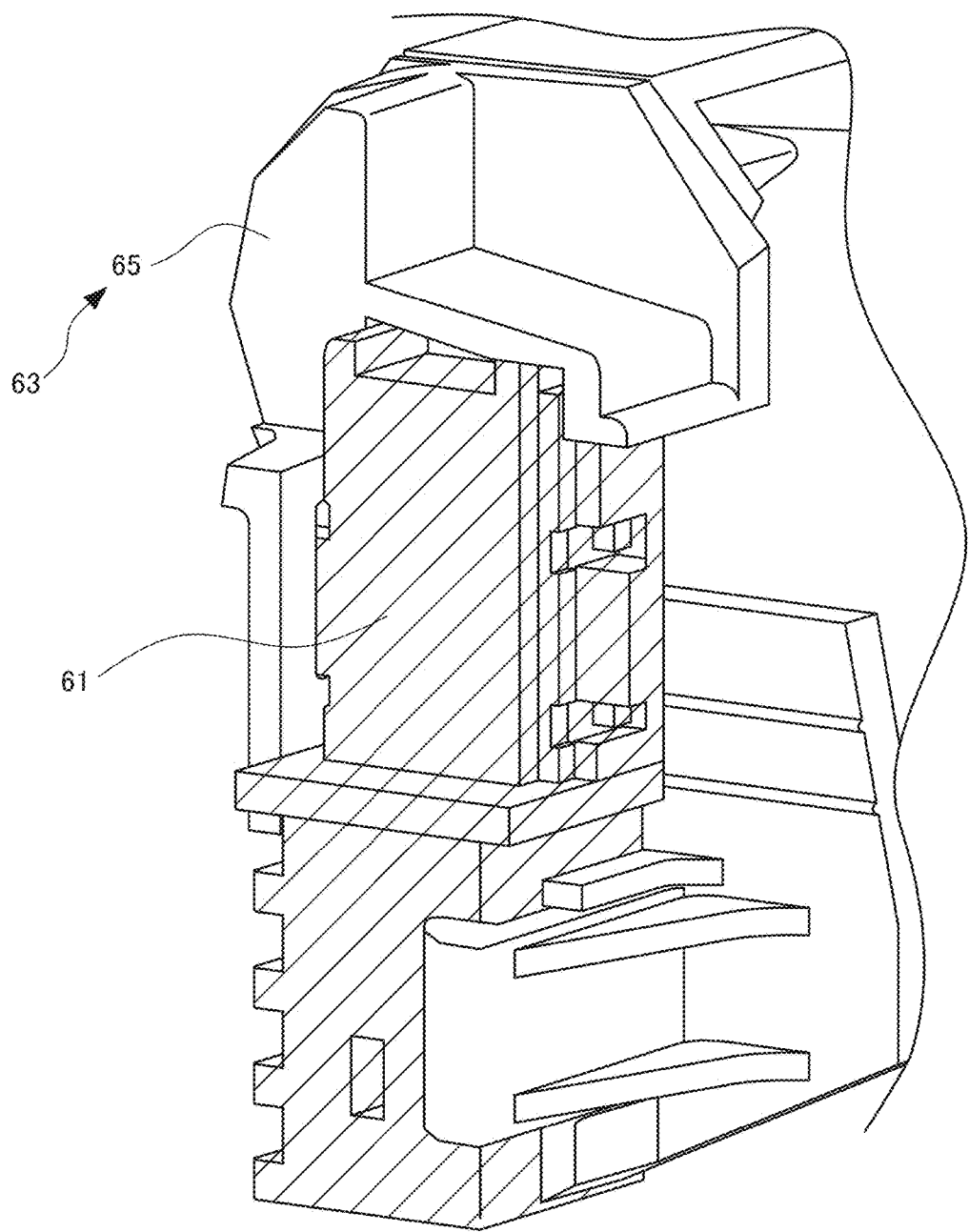
FIG. 20 is a perspective view of the holder illustrating a state where a lamp is held by a lamp holding portion of the holder according to the second embodiment.

As shown in FIG. 18, the light source unit 60 includes a lamp 61 which is a light source, a light guide body 62 which includes a light-emitting surface 62*a*, and the holder 63 which holds the lamp 61 and the light guide body 62. The light guide body 62 is formed by a light guiding plate which is elongated in a predetermined direction. Further, in the light source unit 60, the lamp 61 and the light guide body 62 are disposed at adjacent positions. More specifically, the holder 63 has an elongated casing-shaped light guide body holding portion 64 shown in FIG. 19, and a lamp holding portion 65 shown in FIG. 20 is disposed at one end of the light guide body holding portion 64 in the longitudinal direction. The light guide body 62 is assembled to the light guide body holding portion 64, and the lamp 61 is assembled to the lamp holding portion 65. As a result, the lamp 61 is disposed at a position adjacent to one end of the light guide body 62 in the longitudinal direction.

Then, when the lamp 61 is lit, the light emitted from the lamp 61 is incident to one end of the light guide body 62 in the longitudinal direction. Then, the light travels toward the other end of the light guide body 62 in the longitudinal direction while being diffused inside the light guide body 62. Accordingly, the light emitted from the light-emitting surface 62*a* of the light guide body 62 is emitted toward the front side of the light-emitting surface 62*a*.

Next, the decorative film 151 is described. The decorative film 151 is formed on the ornament base 150 by in-mold molding so that the pattern or the texture thereof is transferred by heat. In the embodiment shown in FIG. 21, the decorative film is transferred to the ornament base 150 while at least a light shielding layer 151*b*, a metal deposition layer 151*d*, a hairline pattern layer 151*f*, a tint colored layer 151*e*, and a top coat layer 151*g* are laminated with an anchor layer (not shown) appropriately interposed therebetween.

Figure 22:
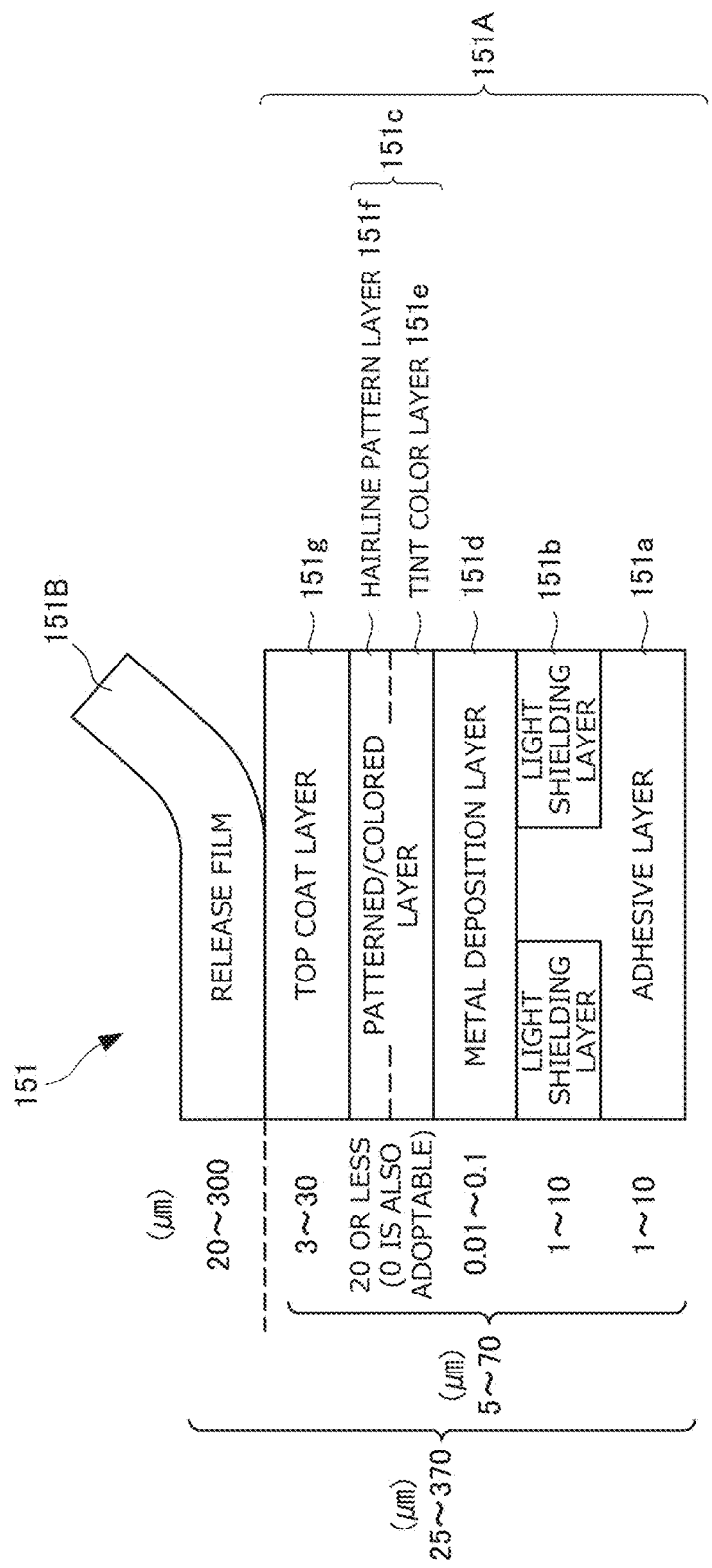
FIG. 22 is a diagram illustrating a layer configuration in a cross-section of the decorative film according to the second embodiment.

Here, the detailed configuration of the decorative film 151 before in-mold molding is described with reference to FIG. 22. As shown in FIG. 22, the decorative film 151 largely includes a transfer layer 151A and a release layer 151B. The transfer layer 151A is formed by laminating an adhesive layer 151*a*, the light shielding layer 151*b*, the metal deposition layer 151*d*, a patterned/colored layer 151*c*, and the top coat layer 151*g* in order from a position close to the ornament base 150. Further, in this embodiment, the patterned/colored layer 151*c* is formed by laminating two layers, that is, the tint colored layer 151*e* and the hairline pattern layer 151*f*. However, the patterned/colored layer 151*c* is not essentially needed, and can be omitted. Further, the release layer 151B is formed by a releasing film, and is released after the transferring of the transfer layer 151A. In addition, the light shielding layer 151*b* corresponds to the transmitted light adjusting layer, and the metal deposition layer 151*d* or the patterned/colored layer 151*c* (specifically, the tint colored layer 151*e*, the hairline pattern layer 151*f*) corresponds to the decorative layer.

In addition, in this embodiment, the thickness of the decorative film 151 is set to about 25 to 370 μm. FIG. 22 illustrates a configuration example in which the transfer layer 151A has a thickness of about 5 to 70 μm and the release layer 151B has a thickness of about 20 to 300 μm. Further, FIG. 22 is an example diagram illustrating the configuration of the lamination structure, and the layer thickness shown in the drawing does not necessarily correspond to the actual layer thickness.

In this embodiment, an aluminum film is used as the metal deposition layer 151d. Further, the thickness of the hairlines is set to 0.2 mm in the hairline pattern layer 151f. Generally, 0.2 mm is a minimum value which can be achieved with current gravure printing techniques, but the thickness of the hairline may be set to a value less than 0.2 mm if improved techniques are available. Then, standard satin silver is selected in the tint colored layer 151e in this embodiment. Accordingly, the texture of the metal deposition layer 151d can be more readily visible.

After the in-mold molding, the transfer layer 151A is transferred to the front surface of the ornament base 150, and the release layer 151B is removed. For that reason, the top coat layer 151g is disposed on the outermost surface of the finished product.

Further, the light shielding layer 151b is formed by two layers. This is because poor pin holes generated during the printing of the light shielding layer can be prevented. Additionally, a notch portion K1 is formed in the light shielding layer 151b. The notch portion K1 corresponds to the transmissive portion, and is formed in an arbitrary light-emitting shape at a light-emitting target. A portion (hereinafter, referred to as a "light shielding portion K2") other than the notch portion K1 in the light shielding layer 151b corresponds to a non-transmissive portion, and hence the light generated from the light source unit 60 is not transmitted therethrough. Thus, only the notch portion K1 allows the transmission of the light from the light source unit 60. That is, the notch portion K1 corresponds to the light-emitting region 50a. As a result, it is possible to visually recognize a light-emitting body that emits light according to the shape of the notch portion K1 in the vehicle interior.

Then, the light shielding layer 151b serves as the shielded light adjusting portion of the second embodiment, and is used to adjust the shielded light amount from the light generated from the light source unit 60. Specifically, the light shielding layer 151b according to this embodiment is formed so that the light shielding degree is changed in response to the size of the gap between the light guide body 62 and the ornament base 150. Accordingly, the light can be more uniformly emitted from the light-emitting region 50a.

Figure 23:
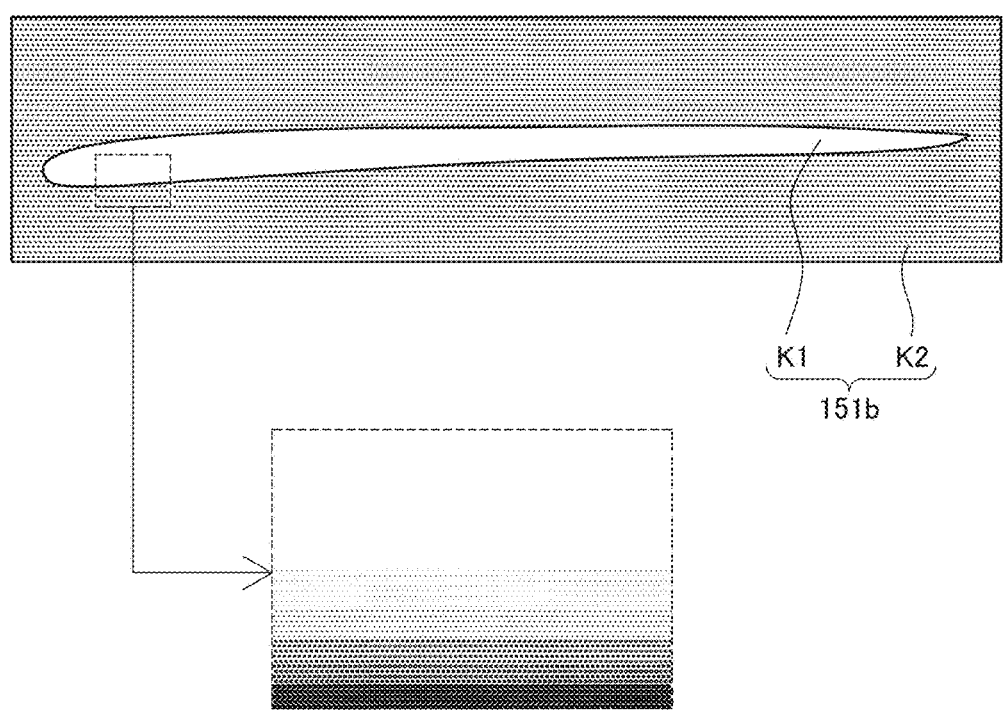
FIG. 23 is a diagram illustrating a gradation of a light shielding layer according to the second embodiment.

Further, gradation printing (an example of gradation processing) is performed on a boundary portion of the decorative film between the notch portion K1 and the light shielding portion K2. That is, as shown in FIG. 23, in the second embodiment, the gradation printing is performed on a portion having a width of 5 mm from the boundary portion (the edge portion) between the notch portion K1 and the light shielding portion K2 so that the black pigment area is reduced gradually toward the notch portion K1 (that is, the color and the density of the black pigment area are reduced gradually in a direction toward the boundary portion). For this reason, it is possible to exhibit a dim and smooth illumination effect, and hence to improve the design, that is, the light-emitting design.

Further, black pigment is mixed with the ornament base 150 of the second embodiment. This is an improvement to offset a decrease in thickness of the decorative film 151. Furthermore, in the decorative film 151 molded as a product, the film thickness is different at every position in response to a diaphragm size (that is, a large/small tension value) caused by the product shape. That is, the film tension in the vicinity of the apex of the curved surface shape becomes larger than that of the substantially flat portion. For this reason, the film thickness in the vicinity of the apex of the curved surface shape is thinner than that of the substantially flat portion. Due to such a shape, there is a possibility that unevenness in brightness may be caused when the film thickness is large.

As described above, in the second embodiment, the film thickness of the decorative film 151 is set to be thin. However, when the film thickness is thin, there is a possibility that the boundary portion between the notch portion K1 and the light shielding portion K2 may be visually recognized in a transparent state. For this reason, in the second embodiment, black pigment is mixed with the ornament base 150 to reduce the color difference between the ornament base 150 and the light shielding layer 151b. Accordingly, it is possible to effectively suppress a problem in which the boundary portion between the notch portion K1 and the light shielding portion K2 is visually recognized. Such content is described in detail below.

Additionally, since there is a possibility that the adhesion property of the decorative film 151 may be degraded when the amount of the diffusing agent mixed with the ornament base 150 is large, a diffusing recess is formed in the rear surface of the ornament base 150 in the second embodiment. That is, in order to ensure the high adhesion property of the decorative film 151, the diffusing agent mixing amount is decreased and the diffusing recess is formed in the rear surface of the ornament base 150 to compensate the decrease amount. Accordingly, the adhesion property of the decorative film 151 with respect to the ornament base 150 is improved. Further, the diffusing recess may be formed by any method. For example, etching or sand blasting may be performed on the mold. Further, a known material can be used as the diffusing agent, but an acrylic diffusing agent is desirable. That is, a silicon diffusing agent can be also used. However, the acrylic diffusing agent is more desirable than the silicon diffusing agent from the viewpoint of the adhesion property.

Figure 24A:
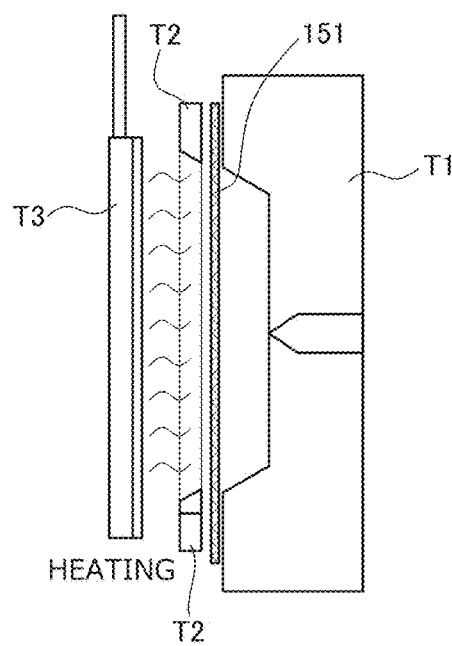
FIGS. 24A, 24B, 24C, and 24D are diagrams illustrating a method of manufacturing a vehicle light-emitting member according to the second embodiment.

Next, a method of manufacturing the light-emitting ornament 41 according to the second embodiment is schematically described with reference to FIG. 24. In order to manufacture the light-emitting ornament 41, a decorative film heating step is first performed as shown in FIG. 24A. In this step, a film setting step of fixing the decorative film 151 to a clamp T2 disposed in a first mold T1 and a heating/softening step of heating and softening the decorative film 151 by a heating element T3 are sequentially performed.

Figure 24B:
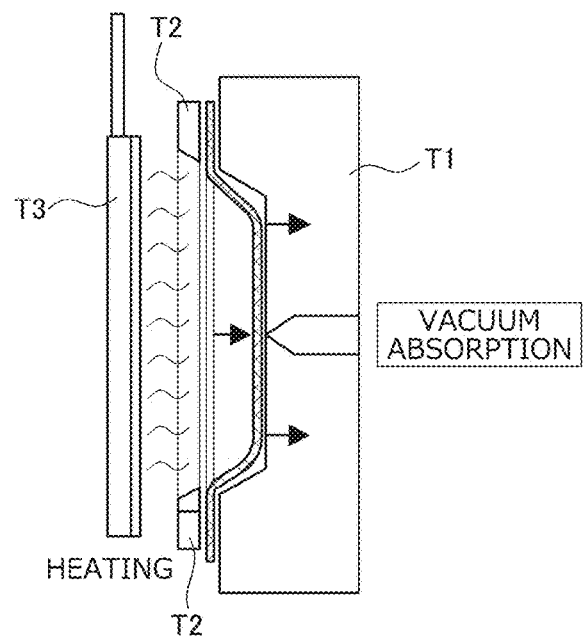
Figure 24C:
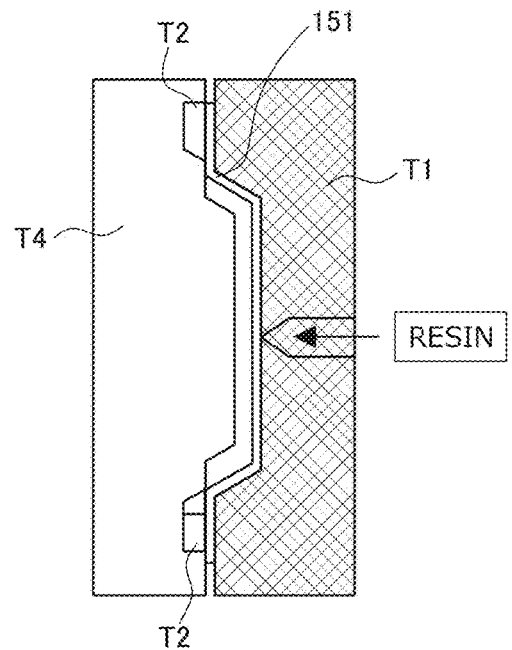

Next, as shown in FIG. 24B, a vacuum molding step is performed. In this step, the inside of the mold is maintained in a vacuum state by vacuum absorbing so that the decorative film 151 follows the inner wall shape of the first mold T1. Next, as shown in FIG. 24C, an injection molding step is performed. In this step, a second mold T4 is moved to the first mold T1 to close the mold, and softened resin is charged into the cavity so that the resin is cured therein. In this example, a so-called "hot runner" type is employed.

Figure 24D:
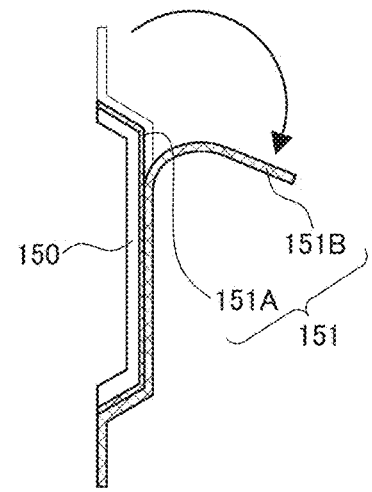

Next, as shown in FIG. 24D, a peeling step is performed to release a molded product and to peel the release layer 151B. Further, in this example, the first mold T1 is a fixed mold, and the second mold T4 is a movable mold. Further, in this example, an UV-ray irradiating step is performed with an UV-ray irradiator (not shown). In this step, an UV-ray is irradiated to the front surface of the transfer layer 151A having been transferred so that the top coat layer 151g is formed thereon.

Figure 25A:
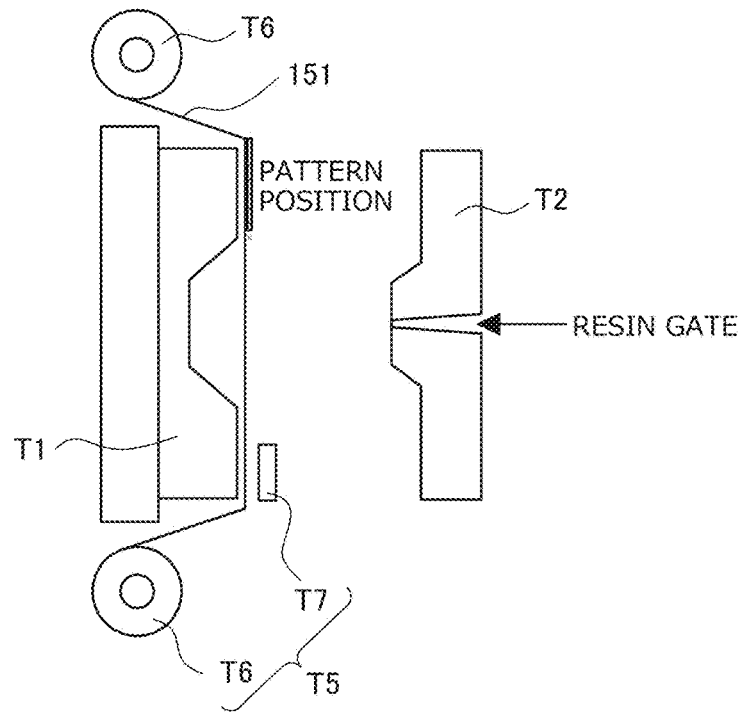
FIGS. 25A and 25B are diagrams illustrating a method of manufacturing the vehicle light-emitting member according to the second embodiment.
Figure 25B:
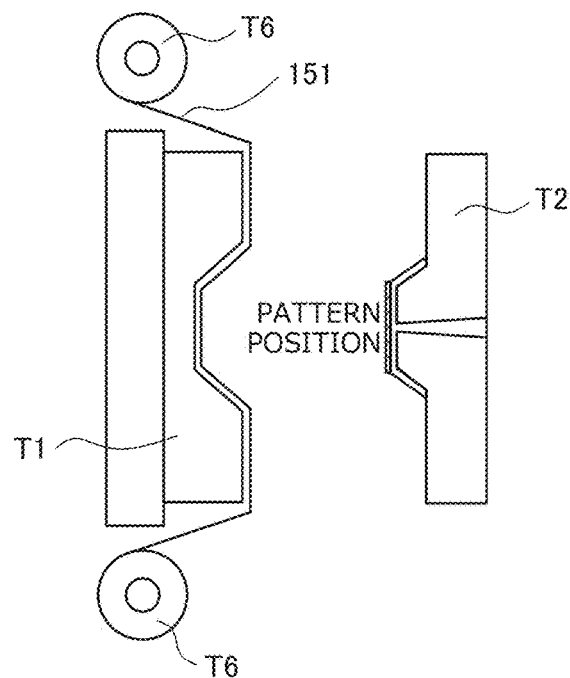

In addition, in the peeling step, a method shown in FIG. 25 can be used. In the example shown in FIG. 25, a fixed mold and a movable mold are arranged in a reverse order, differently from the example of FIG. 24. That is, the first mold T1 is a movable mold, and the second mold T4 is a fixed mold.

Further, in this example, a winding/delivering device T5 for the decorative film 151 is disposed near the first mold T1. The winding/delivering device T5 includes rollers T6 which are disposed at the upper and lower positions to clamp the first mold T1 therebetween and a detection sensor T7. The rollers T6 respectively hold the release layer 151B at both ends of the decorative film 151, and the decorative film 151 is suspended on the opening side of the first mold T1.

Then, the decorative film 151 is stopped at a predetermined position (a position in which a pattern is disposed at a correct position) detected by the detection sensor T7, and is fixed by the clamp T2 in this state. This step is the film setting step. Subsequently, the decorative film 151 is softened by adding heat thereto (here, any heating method may be used without the heating element T3), and the decorative film 151 is made to follow the inner wall shape of the first mold T1 by a vacuum adsorption.

Next, the first mold T1 is moved to the second mold T4 to close the mold, softened resin is charged into a gap, and then the charged resin is cured. Further, in this example, a so-called hot runner type is employed. This step is the injection molding step. Then, when the first mold T1 is released to be returned to an original position along with the winding/delivering device T5, the release layer 151B moves in accordance with this movement. Accordingly, the release layer is peeled from the transfer layer 151A, and hence the transfer layer 151A is transferred to the front surface of the ornament base 150. This step is the peeling step. Subsequently, a new decorative film 151 is fed between the rollers T6 and T6 for the next molding.

Similarly to the above-described example, the UV-ray irradiating step is performed by the UV-ray irradiator. In this step, an UV-ray is irradiated to the front surface of the transfer layer 151A having been transferred so that the top coat layer 151g is formed thereon. Then, when the above-described series of steps end, the light-emitting ornament 41 is obtained.

Next, a verification result for a decrease in thickness of the decorative film 151, that is, a verification result for the metal deposition layer 151d noticeably influenced by the stretching tension is described. Further, the content described below corresponds to the verification result when an aluminum film is used as the metal deposition layer 151d. A table for the comparison between the external appearance and the expansion modulus (corresponding to the "tensile expansion modulus") of the metal deposition layer 151d is shown in Table 1.

TABLE 1

Comparison Between External Appearance And Expansion Modulus Of Metal Deposition Layer (Aluminum)

| | Expansion | | | | |
|---|---|---|---|---|---|
| | 0% | 10% | 40% | 50% | 60% |
| Whitening | ○ | X | X | X | X |
| External Appearance | ○ | Existence Of Micro Crack | ← | ← | Existence Of Large Crack |

As shown in Table 1, a large crack was generated in the metal deposition layer 151d when the expansion modulus exceeded 60%, and a micro crack was generated instead of a large crack when the expansion modulus was from 10% to 60%. Further, whitening was also observed when the expansion modulus exceeds 10%. That is, since the quality in appearance is not desirable due to a micro crack generated when the expansion modulus exceeds 10%, a verification result is obtained in which the expansion modulus needs to be 10% or less and desirably 6% or less in consideration of safety.

Figure 27:
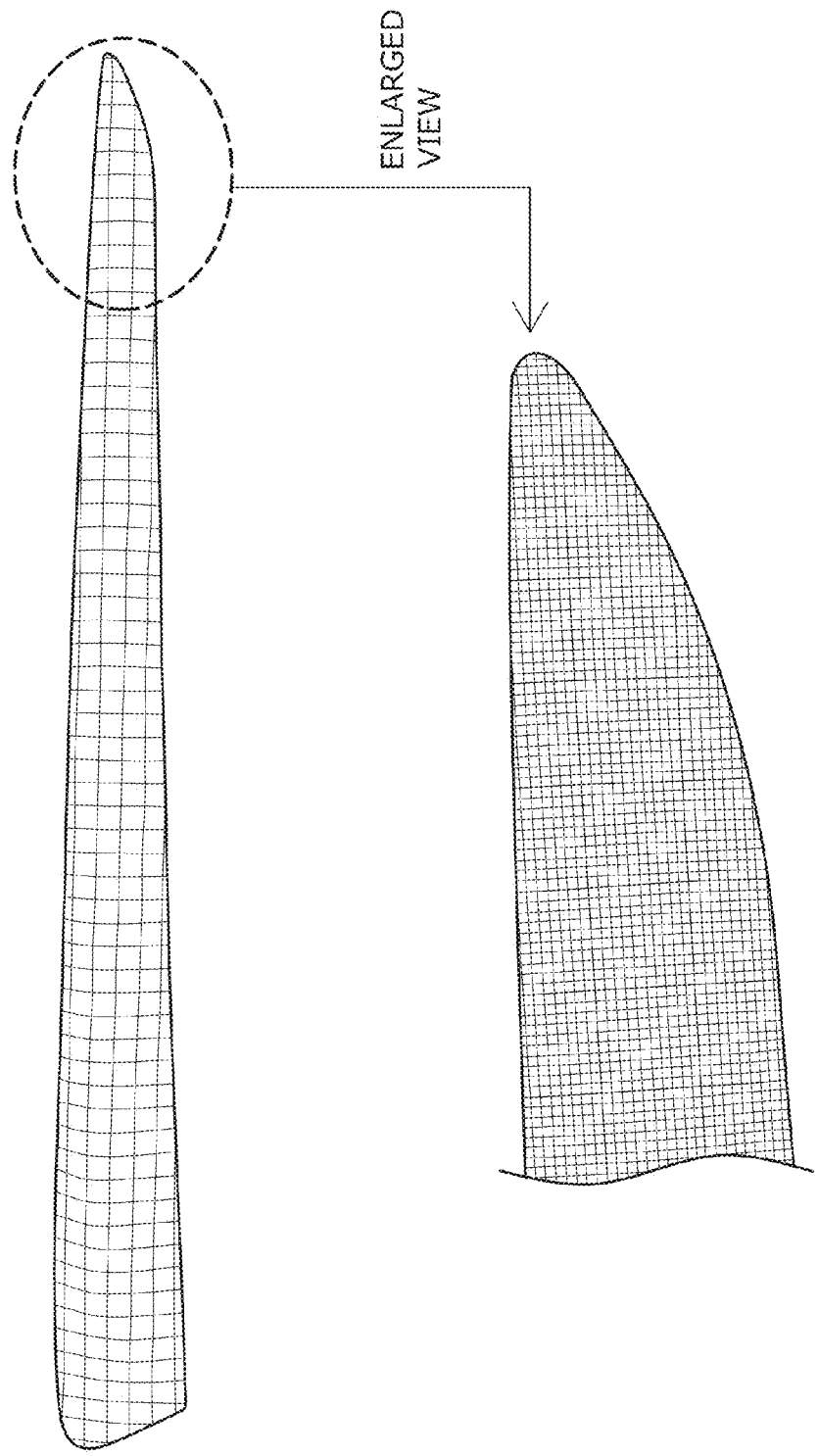
FIG. 27 is a diagram illustrating a method of evaluating an expansion test for the decorative film according to the second embodiment.

Next, an analysis result for the arrangement of the decorative film 151 is described by using the actual light-emitting ornament 41 as a sample. Such an analysis was performed by using "general resin/composite molding analysis software". Specifically, the shape of the cavity surface of the mold and the property of the decorative film 151 were input to simulate the shape of the decorative film 151 vacuumed inside a mold. Here, numerical values of a change in thickness of the decorative film 151 were determined. Additionally, the relation between the actual expansion modulus and the expansion modulus estimation result (hereinafter, simply referred to as the "CAE result") obtained by the simulation was verified. Regarding the measurement of the expansion modulus, the calculation region was divided into six regions as shown in FIG. 26, and the expansion modulus for each region was measured. A detailed example for a method of measuring the molded product is shown in FIG. 27. In such a measurement method, a square having a size of 1 mm by 1 mm was used. Then, the expansion amount % from the non-molded state was calculated by measuring the stretched area per unit square after molding. An analysis result obtained by the above-described sequence is shown in Table 2.

TABLE 2

| Measurement Point | | Ar1 | Ar2 | Ar3 | Ar4 | Ar5 | Ar6 |
|---|---|---|---|---|---|---|---|
| Expansion Modulus [%] | CAE Result | 1 | 4 | 3 | 2 | 1 | 1 |
| | Measurement Result | 2 | 6 | 4 | 3 | 3 | 0 |
| Quality In Appearance (Whitening Or Crack) | | OK | ← | ← | ← | ← | ← |
| Evaluation | | No Crack Is Generated At 6% Or Less In Total. Trend Matches CAE. No Problem Occurs Even In Quality In Appearance. | | | | | |

As shown in Table 2, in the light-emitting ornament 41 according to the second embodiment, the expansion modulus changes at 6% or less. Thus, it is verified that a crack is not generated at 6% or less. Here, a design can be performed by applying the above-described simulation result to the ornament base 150. That is, in the design of the shape of the ornament base 150, it is possible to estimate whether a deep diaphragm shape can be transferred without generating a crack in the decorative film 151. In other words, it is possible to check a position in which the expansion modulus exceeds 6% by performing this simulation and to change the design in advance. Then, it is possible to perform an actual molding step after checking whether no crack is generated as a simulation result. Further, even in the relation with the actual expansion modulus, a measurement value falls within an allowance range with a slight difference from the absolute value. Further, the measurement result matches the CAE result. As a result, it is verified that no problem occurs even in the quality in appearance.

In addition, in this embodiment, an aluminum film is used as the metal deposition layer 151d, but the invention is not limited thereto. Other films can be appropriately selected as the metal deposition layer. For example, a film of tin (Sn) or indium (In) is appropriately used. When the film of tin or indium is used, a large crack is generated instead of a micro crack at the tensile expansion modulus exceeding the limit. For this reason, it is possible to prevent an influence on the quality if the tensile expansion modulus is 50% or less when the tin film is used as the metal deposition layer 151*d* or if the tensile expansion modulus is 130% or less when the indium film is used as the metal deposition layer.

Figure 28A:
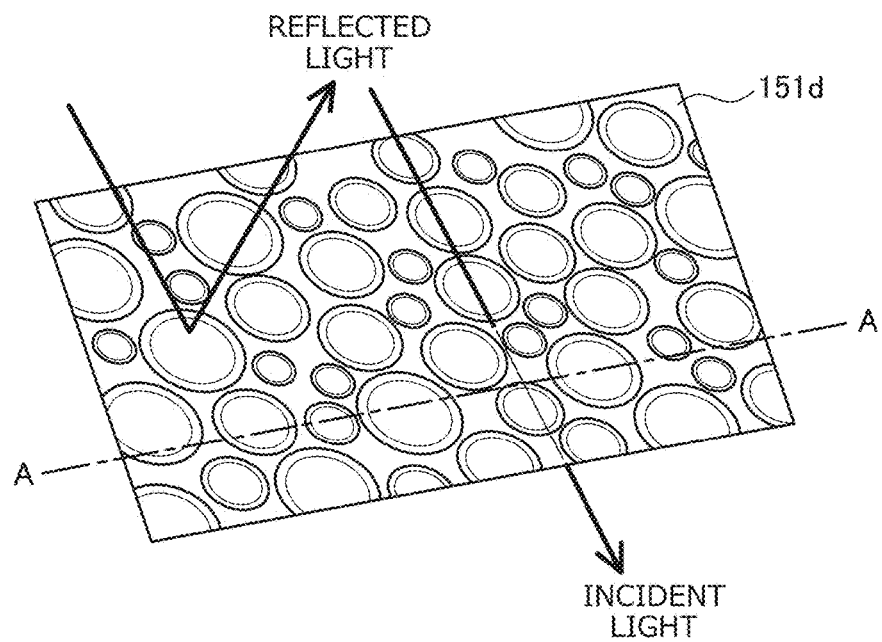
FIGS. 28A and 28B are diagrams illustrating a half mirror effect of the decorative film according to the second embodiment.
Figure 28B:
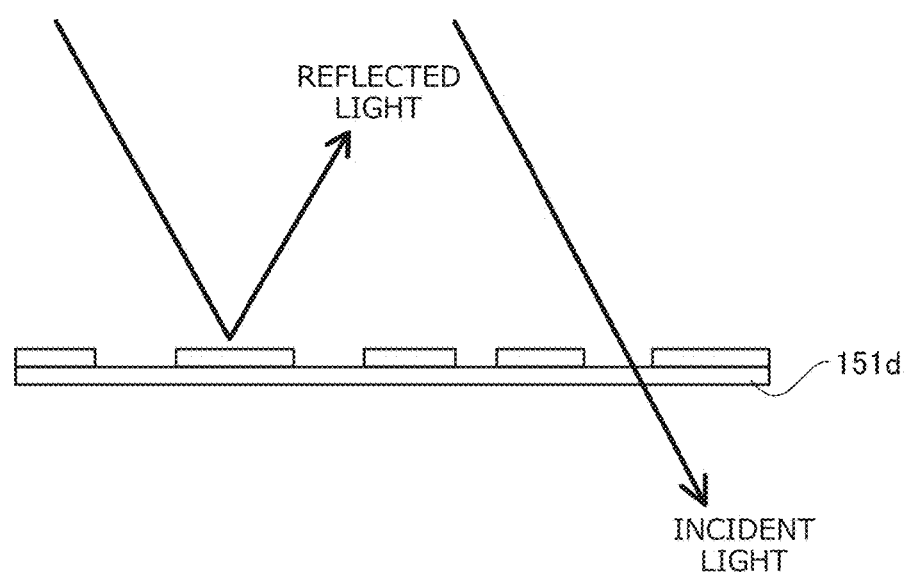

Next, the half mirror effect of the decorative film 151 is described with reference to FIG. 28. Further, FIG. 28B is a cross-sectional view taken along the line A-A of FIG. 28A. As shown in FIG. 28, the metal deposition layer 151*d* gives the half mirror effect to the decorative film 151. The half mirror effect indicates an effect given by a thin metal film having a thickness of about 0.01 to 0.1 μm. Due to the half mirror effect, the peripheral light is reflected by the metal deposition layer when the vehicle interior is bright, and hence the texture (that is, the metallic effect) of the metal deposition layer 151*d* is visually recognized. The light emitted from the light source unit 60 is transmitted through the metal deposition layer when the vehicle interior is dark, and hence the surface-emitting light is visually recognized. In this way, since it is possible to exhibit the half mirror effect by employing the metal deposition layer 151*d* in the second embodiment, it is possible to provide the light-emitting ornament 41 which has a good function and a good design.

In addition, a method other than metal deposition may be supposed as a method of obtaining the half mirror effect with metallic effect or gloss. For example, mirror coating or metallic flake coating may be exemplified. Further, polyethylene terephthalate (PET) films having different refractive indexes may be laminated as multiple layers on the front surface of the decorative film 151.

Next, a portion subjected to gradation printing, that is, a gradation portion in the decorative film 151 is described. In the second embodiment, the gradation portion is disposed at the boundary portion between the notch portion K1 and the light shielding portion K2 in the light shielding layer 151*b*. Further, in the gradation portion, the regions having different color and density are configured so that the color and the density are gradually changed. Then, in the second embodiment, the region having a higher expansion modulus in the gradation portion is wider than the region having a lower expansion modulus. Accordingly, it is possible to more effectively suppress damage or a change in transmissivity of the decorative layer of the decorative film 151.

Further, in the second embodiment, the decorative film 151 is stuck to follow the curved surface portion of the ornament base 150. At this time, the gradation portion is disposed at a position deviated from a portion of the decorative film 151 having a maximal tensile expansion modulus. Accordingly, it is possible to more effectively suppress damage or a change in transmissivity of the decorative layer of the decorative film 151.

Configuration for Improving Decorative Illumination Functionality and Texture of Light Emission Region In the second embodiment, the decorative film 151 having a comparatively thin film thickness is used. Here, there is a possibility that the light transmitted through the boundary portion between the transmissive portion (the notch portion K1) and the non-transmissive portion (the light shielding portion K2) may be visually recognized when the film thickness is small. For this reason, in the second embodiment, black pigment is mixed with the ornament base 150 so that the color difference between the ornament base 150 and the light shielding layer 151*b* substantially does not exist. Such a configuration is described in detail below. Hereinafter, a new embodiment (a third embodiment) is described. However, a light-emitting part for a vehicle of the third embodiment is different from the above-described embodiments in that the shape and the like of the components are different, but the basic configuration thereof is the same as those of the above-described embodiments. For this reason, a different point from the light-emitting part for the vehicle according to the third embodiment is mainly described.

Figure 29:
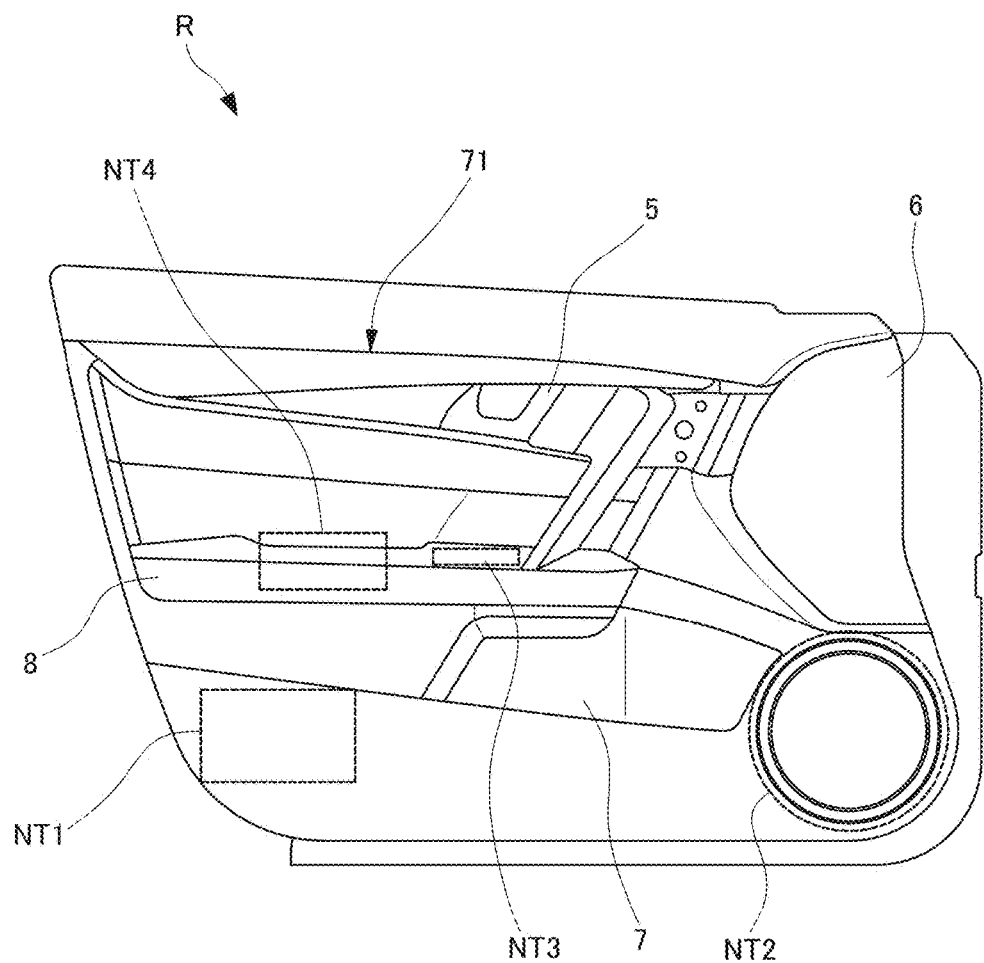
FIG. 29 is a diagram illustrating a vehicle door lining that uses a light-emitting part for a vehicle according to a third embodiment.

Similarly to the above-described embodiments, a light-emitting part for a vehicle according to a third embodiment is a light-emitting ornament 71 for a vehicle door lining R. As the components of the vehicle door lining R, as shown in FIG. 29, a pocket trim 7 or a door armrest 8 exist other than the light-emitting ornament 71, and these components are attached to the inside of a door base 6. Further, an accommodation space is formed between the door inner panel and the door base 6, and the accommodation space accommodates a speaker or a side projection part (not shown) absorbing an impact in the event of a side collision. Here, the side projection part is disposed in a range indicated by the sign NT1 in FIG. 29, and the speaker is disposed in a range indicated by the sign NT2 in FIG. 29. Further, a switch panel which is operated to adjust the window opening/closing state is disposed on the upper surface of the rear end of the door armrest 8 in a range indicated by the sign NT3 in FIG. 29. Additionally, a pull pocket into which a passenger's hand is inserted to open or close the door is disposed between the door base 6 and the front end of the door armrest 8 in a range indicated by the sign NT4 in FIG. 29.

Figure 30:
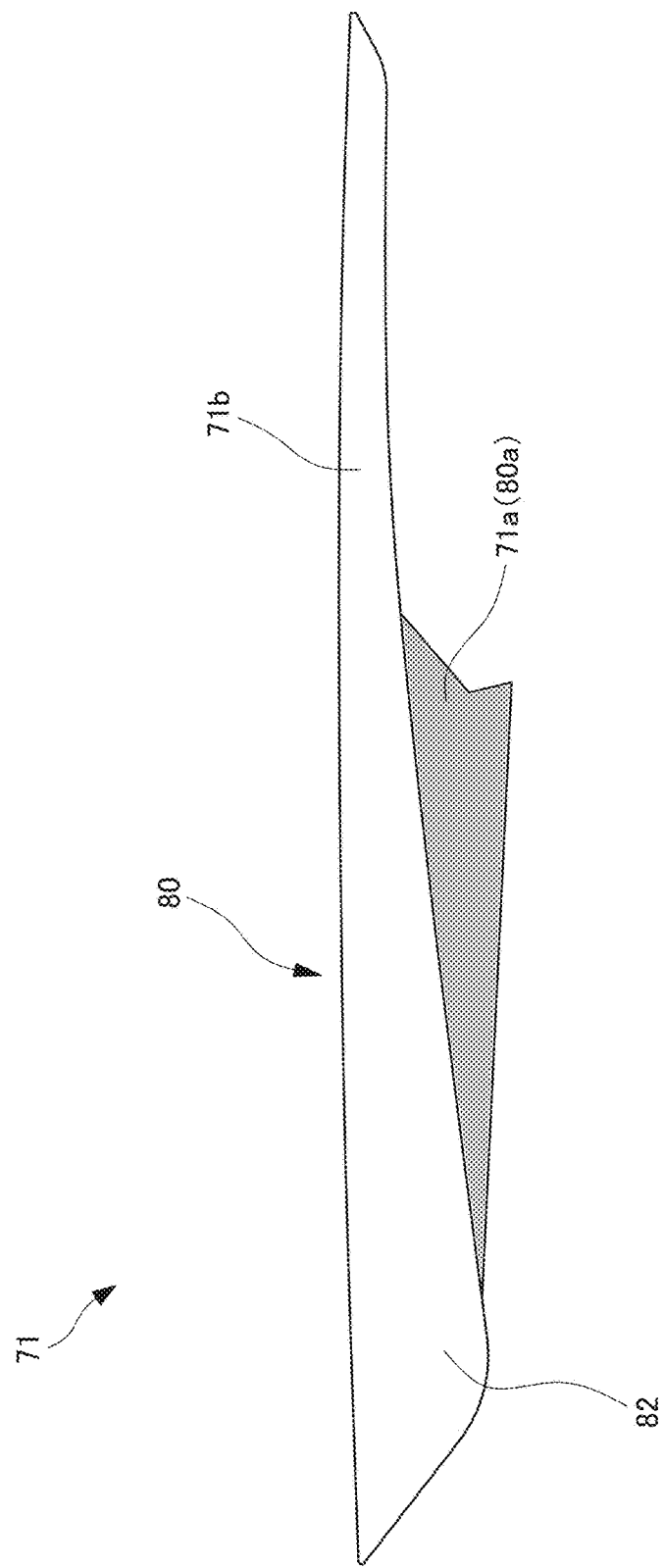
FIG. 30 is a front view of the light-emitting part for the vehicle according to the third embodiment.
Figure 31:
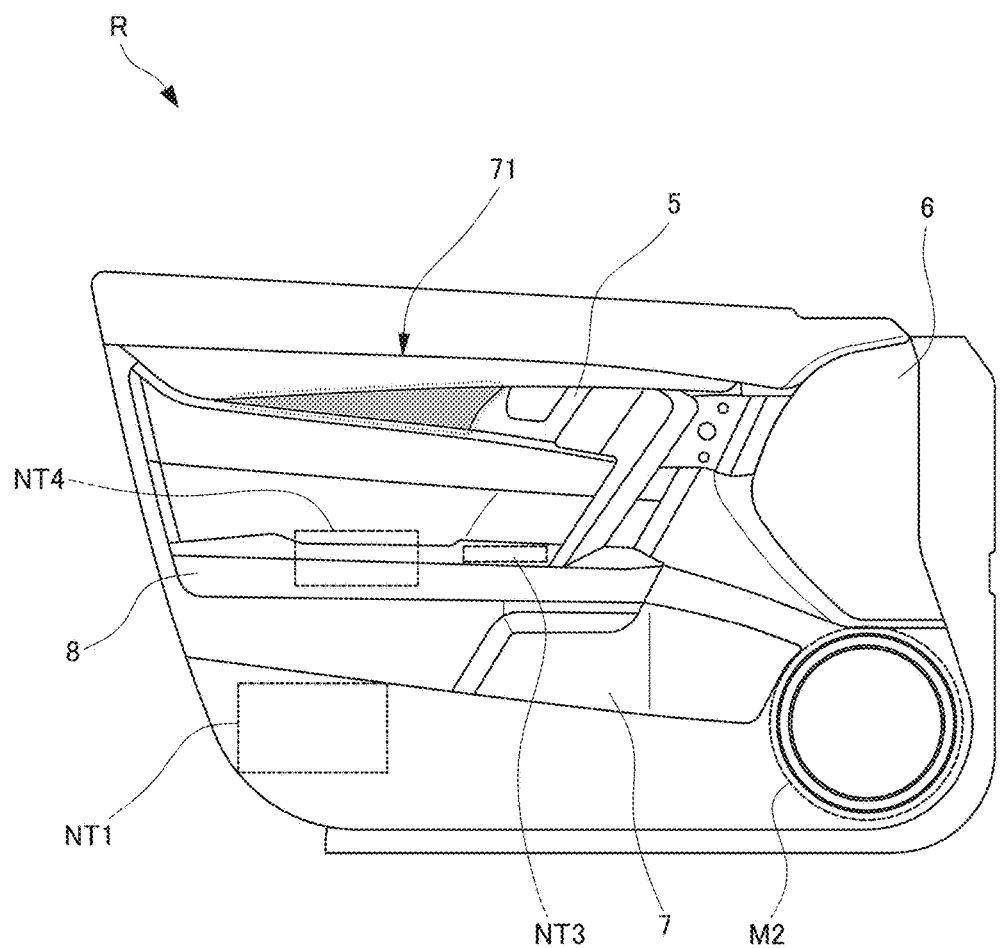
FIG. 31 is a diagram illustrating a state where the light-emitting part for the vehicle according to the third embodiment serves as a light-emitting illumination unit.

The light-emitting ornament 71 is attached to a position parallel to the pull handle 5 at the vehicle interior side of the door base 6, and is lit when the vehicle interior is dark at nighttime or the like. Further, the light-emitting ornament 71 according to the third embodiment has an outer shape which is formed in an elongated knife shape in the front to back direction of the vehicle as shown in FIG. 30, and the lower end thereof has a light-emitting region 71*a* which is widened in a substantially triangular shape from a position slightly behind the front end. Then, a light source (not shown) is disposed at the vehicle exterior side of the light-emitting region 71*a*. When the light source is lit, the light is emitted from the light-emitting region 71*a* at a predetermined brightness as shown in FIG. 30. A non-light-emitting region 71*b* is formed in a portion other than the light-emitting region 71*a* in the light-emitting ornament 1. The non-light-emitting region 71*b* is disposed adjacent to the light-emitting region 71*a* while being located above the light-emitting region 71*a*, and the light is not emitted therefrom even when the light source of the light-emitting ornament 71 is lit.

Further, the light-emitting ornament 71 serves as a decorative component that improves the design of the door when the illumination function is not needed at daytime or the like. Then, the light-emitting region 71*a* which does not emit the light in the light-emitting ornament 71 is decorated similarly to the non-light-emitting region 71*b*. That is, the decorative pattern of the vehicle interior surface side of the light-emitting region 71*a* is similar to the decorative pattern of the vehicle interior surface side of the non-light-emitting region 71*b*. Specifically, the surface is colored with a metallic effect. Here, the decorative pattern indicates a visual characteristic obtained by a decorative treatment performed on the surface by the use of a color arrangement, a shape, gloss, or texture. As described above, since the decorative pattern of the vehicle interior surface side of the light-emitting region 71*a* is similar to the decorative pattern of the vehicle interior surface side of the non-light-emitting region 71*b*, the appearance of uniformity is obtained as the decorative component, and hence the design of the door is improved. Further, in this embodiment, both vehicle interior surface sides of the light-emitting region 71a and the non-light-emitting region 71b have a metallic effect. However, for example, a grain effect or a carbon fiber effect may be used. Further, the color arrangement or the shape may be similar.

Figure 32:
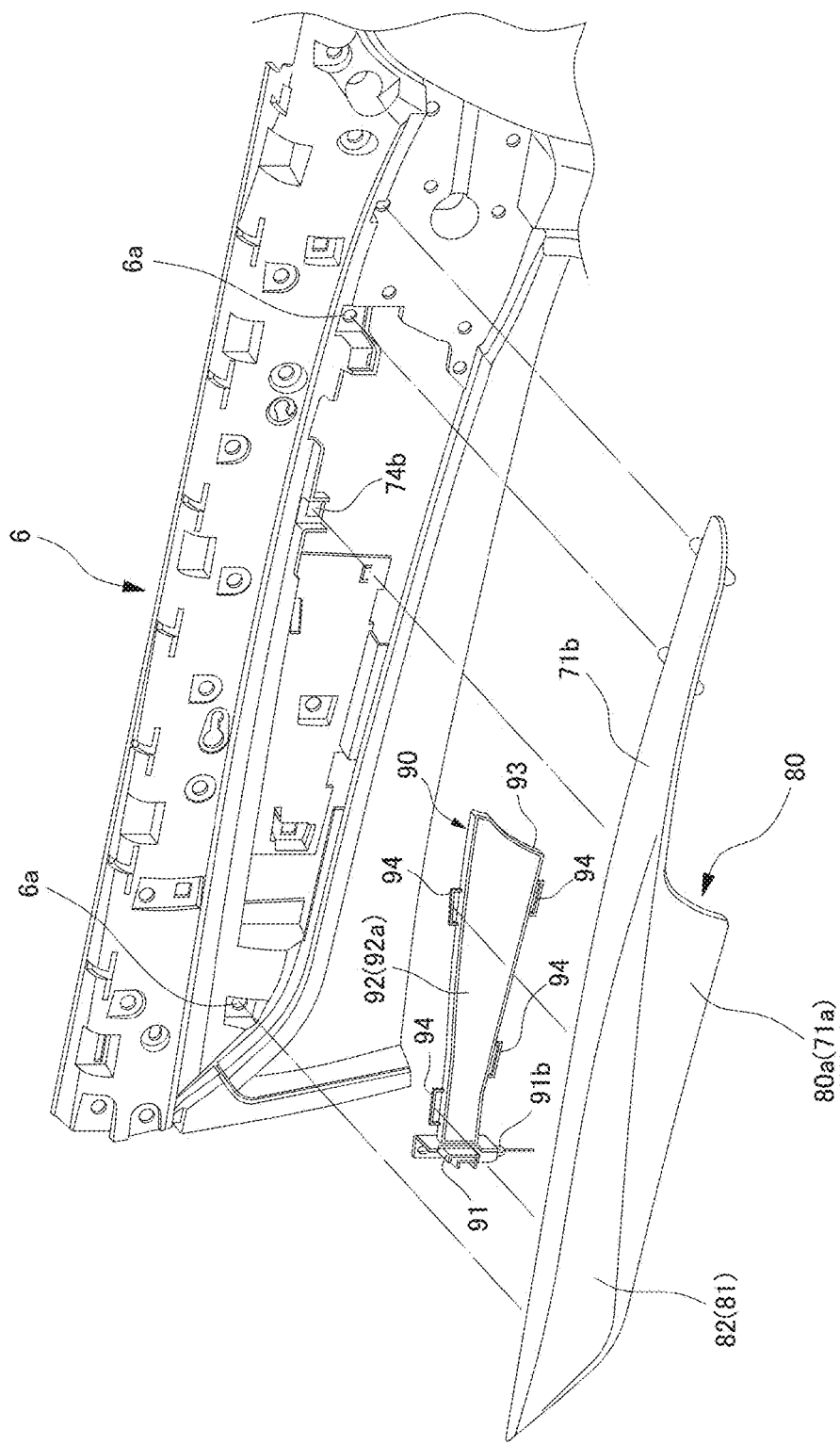
FIG. 32 is a first exploded perspective view of the light-emitting part for the vehicle according to the third embodiment.

Further, as shown in FIG. 32, the light-emitting ornament 71 includes an ornament unit 80 and a light source unit 90. The ornament unit 80 is a plate-shaped member that is exposed to the vehicle interior side, and has the same function as the ornament unit 50 according to the second embodiment. Further, a portion which does not emit the light in the ornament unit 80 is the non-light-emitting region 71b, and a light-emitting region 80a which emits the light is a part of the light-emitting region 71a and corresponds to a portion excluding the light source unit 90 in the light-emitting region 71a. Further, the ornament unit 80 is fixed to the vehicle interior surface side of the door base 6 by screwing and snap fitting.

The light source unit 90 corresponds to an irradiation body, and includes a lamp 91 which is a light source and a light guide body 92 which includes a light-emitting surface 92a emitting the light from the lamp 91. Then, the light source unit 90 is disposed at a position interposed between the door base 6 and the ornament unit 80. Specifically, the light source unit 90 is assembled to the vehicle exterior side of the light-emitting region 80a in the ornament unit 80, that is, a surface that faces the door base 6 by snap fitting. In this way, since the light source unit 90 is disposed at a position interposed between the door base 6 and the ornament unit 80, a light source unit 90 can be disposed compactly in a limited space such as an inner space inside the vehicle door.

Figure 33:
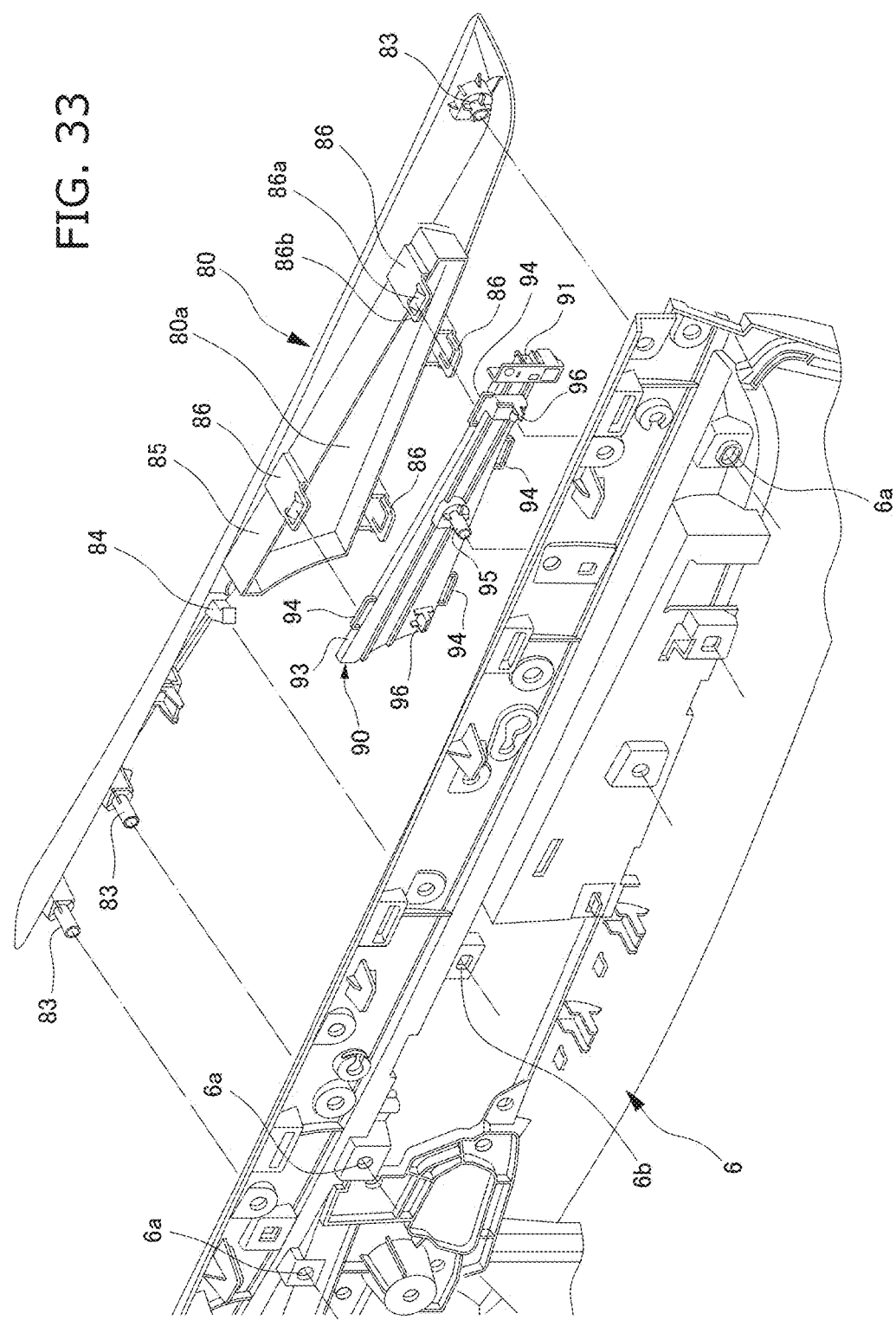
FIG. 33 is a second exploded perspective view of the light-emitting part for the vehicle according to the third embodiment.
Figure 34:
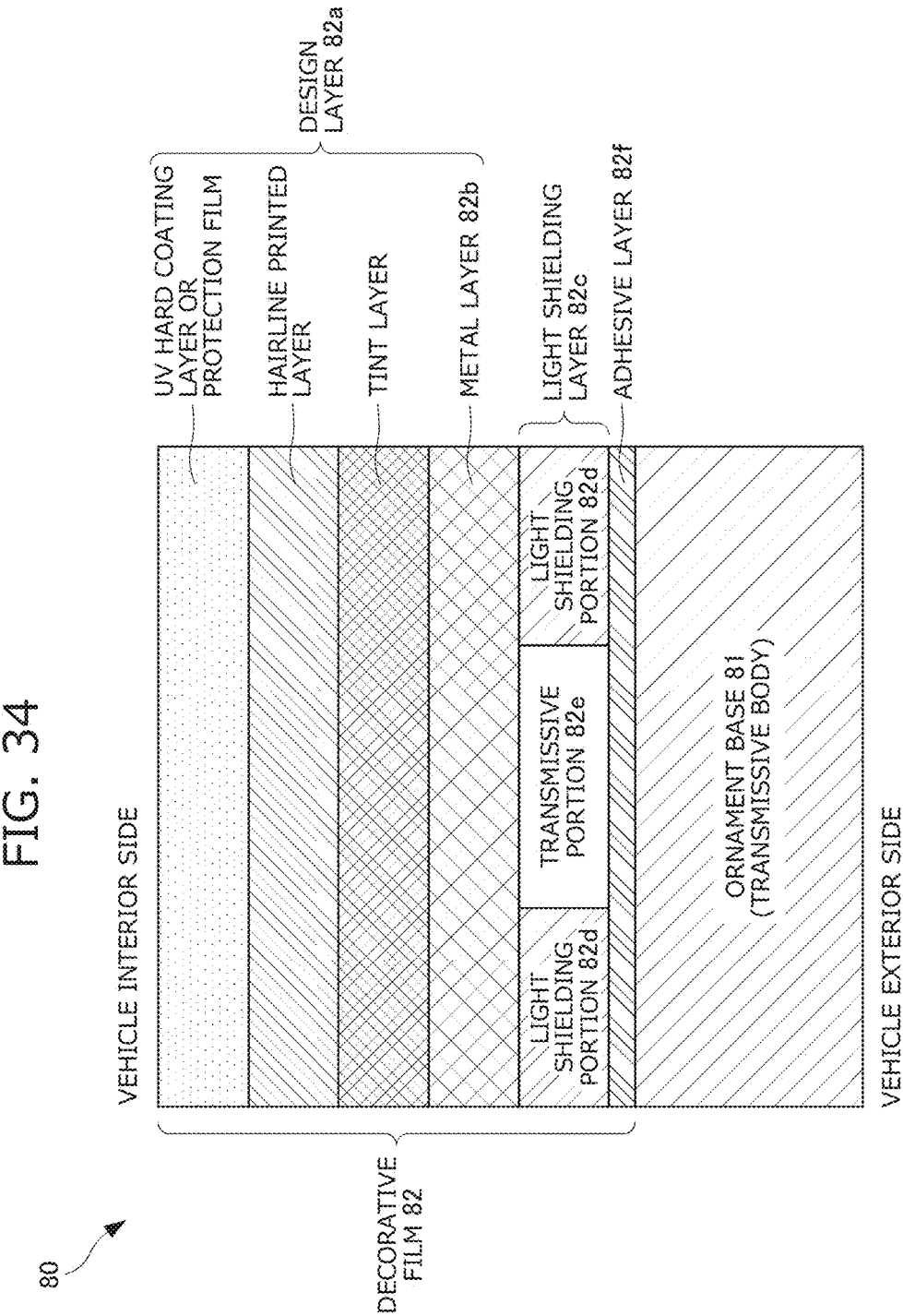
FIG. 34 is a schematic diagram illustrating a lamination structure of an ornament unit of the light-emitting part for the vehicle according to the third embodiment.

As shown in FIGS. 32 and 33, the ornament unit 80 includes the light-emitting region 80a and the non-light-emitting region 71b. Each of the light-emitting region 80a and the non-light-emitting region 71b includes an ornament base 81 which is formed by a resin material and a decorative film 82 which is stuck to the vehicle interior surface side of the ornament base 81. As shown in FIG. 34, each of the light-emitting region 80a and the non-light-emitting region 71b is formed in a lamination structure in which the decorative film 82 is stuck to the front surface of the ornament base 81. The front surface of the ornament base 81 has an adhesive layer 82f applied thereto to stick a design layer 82a and a light shielding layer 82c forming the decorative film 82 thereto.

As shown in FIG. 33, a boss 83 or an engagement protrusion 84 is disposed at the rear surface side of the ornament unit 80 in a protruding manner. The boss 83 is fitted to a boss hole 6a formed at a corresponding position in the door base 6 and is fixed thereto by screwing. The engagement protrusion 84 is fitted to a fitting hole 6b formed at a corresponding position in the door base 6 and is coupled to the door base 6 by snap fitting. Further, the boss 83 and the engagement protrusion 84 are disposed in a region deviated from the light-emitting region 80a in the ornament unit 80, and are disposed at both ends of the ornament unit 80 in the longitudinal direction. In this way, since the boss 83 or the engagement protrusion 84 is disposed in the non-light-emitting region 71b, the ornament unit 80 can be attached to the door base 6 without the interference of the light emitted from the light-emitting region 80a.

Further, as shown in FIG. 33, a rib 85 is uprightly formed in the rear surface of the ornament unit 80. The rib 85 is provided in order to ensure the rigidity of the ornament unit 80, and is formed in a continuous shape to have a substantially trapezoidal shape when the rear surface of the ornament unit 80 is viewed from the front side thereof. Further, the rib 85 surrounds the light source unit 90 when the light source unit 90 is assembled to the ornament unit 80. Accordingly, the light source unit 90 can be compactly disposed in a limited space such as an inner space inside the vehicle door.

Further, in a state where the light source unit 90 is surrounded by the rib 85, the light emitted from the light source unit 90 contacts only a portion surrounded by the rib 85 and located at the front side of the light source unit 90 in the ornament unit 80. In this way, the rib 85 is used to ensure the rigidity of the ornament unit 80 and to suppress the light emitted from the light source unit 90 from being leaked to a portion other than a portion located at the front side of the light source unit 90 in the ornament unit 80. Further, the upper portion of the rib 85 extends from a portion corresponding to the non-light-emitting region 71b in the rear surface of the ornament unit 80. Accordingly, even when sinking occurs due to the rib 85 disposed in the rear surface of the ornament unit 80, it is possible to suppress degradation in the decorative function by setting the sinking position to an unnoticeable position.

The ornament base 81 is a resin base forming a transmissive body, and is implemented as a resin molded product which is colored in gray and in which black pigment is added to a white transmissive resin material. As the resin material of the ornament base 81, acrylonitrile/butadiene/styrene (ABS) resin, polycarbonate (PC) resin, polymethyl methacrylate (PMMA) resin, or the like can be used. Any appropriate material can be used as the material of the ornament base 81 in consideration of heat resistance, chemical resistance, impact resistance, and combustion resistance. In this embodiment, PC resin is used. When the compounding amount of the PC resin material forming the ornament base 81 is set to 100, the compounding amount of the black pigment may be set to 1 or less. With the above-described configuration, the ornament base 81 is implemented as a resin molded product having gray-like color and has comparatively high light transmissivity as compared to a black color. Accordingly, the desired brightness of the light-emitting region 80a can be ensured.

As shown in FIG. 32, the ornament base 81 forming the light-emitting region 80a has a configuration in which the light source unit 90 is disposed at the vehicle exterior side, and hence the light emitted from the light source unit 90 is transmitted therethrough. The ornament base 81 includes a light diffusing material, and hence the light passing through the ornament base 81 is diffused. As a result, when the lamp 91 of the light source unit 90 is lit, the light passes through the ornament base 81 forming the light-emitting region 80a while being diffused therein, and hence the light can be emitted from the entire light-emitting region 80a. As the light diffusing material, known light diffusing agent can be used.

Figure 35:
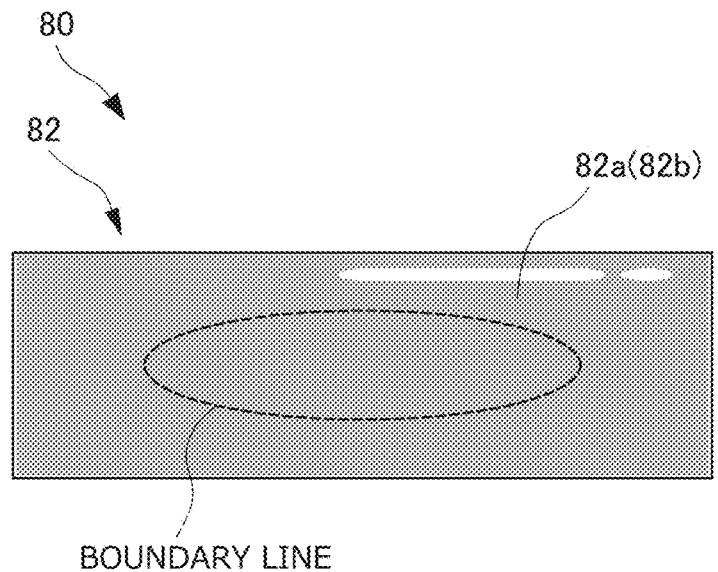
FIG. 35 is a diagram illustrating a front surface of a design layer of a decorative film forming the ornament unit.

The decorative film 82 is used to give a decorative function to the ornament unit 80, and is a transmissive film obtained by laminating the light shielding layer 82c and the design layer 82a on a colorless transparent film base formed of PMMA resin or PET resin in order according to the surface treatment. That is, the decorative film 82 is exposed to the vehicle interior side of the ornament base 81, and is formed as a decorative lamination structure through which the light transmitted through the ornament base 81 can be transmitted. As shown in FIGS. 34 and 35, the design layer 82a forming the decorative film 82 includes a metal layer 82b which is a thin metal film formed by a vacuum deposition treatment. As a result, the vehicle interior surface side of the ornament unit 80 is colored to have a metallic effect. The metal layer 82b forming the design layer 82a is formed by a thin metal film of about 10 to 100 nm, and has light reflectivity of about 90% and light transmissivity of about 10%. As a result, since the external light is reflected by the design layer 82a at daytime, the light-emitting ornament 71 is decorated as a metallic effect printed on the design layer 82a. The light emitted from the light source unit 90 is transmitted through the ornament base 81 and the decorative film 82 so that the light can be visibly seen with the metallic effect of the design layer 82a at nighttime.

The design layer 82a is now described in detail. As shown in FIG. 34, the design layer is formed by laminating the metal layer 82b, a tint layer giving metal texture, a hairline printed layer giving a texture of a metal hairline pattern, and a UV hard coating layer or a protection film forming an outer surface, in order from the ornament base 81. Further, the tint layer is formed as a silver colored layer of about 1 to 10 μm, and is formed by a tinting treatment, that is, a treatment of exhibiting a light color tone by adding dye. The hairline printed layer is formed as a hairline pattern layer of about 1 to 10 μm through hairline pattern printing. The UV hard coating layer or the protection film has a thickness of about 3 to 30 μm, and generally reduces the likelihood that the decorative film 82 is damaged or peeled off by improving the film strength thereof.

The light shielding layer 82c forming the decorative film 82 corresponds to the transmitted light adjusting layer, and is a portion that serves as i) a light shielding portion 82d which shields the light emitted from the light source unit 90 toward the vehicle interior side, and ii) a transmissive portion 82e which is disposed in a region adjacent to the light shielding portion 82d so that the light is transmitted therethrough as shown in FIG. 34. The light shielding layer 82c is formed on the surface side of the ornament base 81 by printing such as gravure printing. At this time, the light shielding layer 82c is formed by laminating at least two or more layers through printing, and is used to suppress the generation of pin holes.

Figure 36:
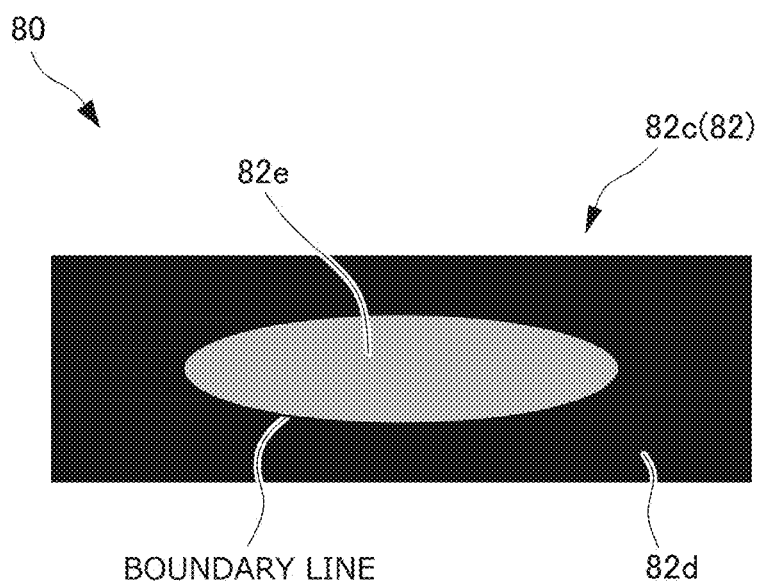
FIG. 36 is a diagram illustrating a front surface of a light shielding layer of the decorative film.

The light shielding portion 82d corresponds to a non-transmissive portion, and is a portion that forms the non-light-emitting region 71b in the light shielding layer 82c as shown in FIG. 36. The light shielding portion 82d is formed with black ink that is solid-printed on the surface side of the ornament base 81 by printing, and hence the light shielding portion is colored in a black color or similar color to black. A portion which is solid-printed by black ink as the light shielding portion 82d shields the light transmitted through the ornament base 81 in that the portion does not provide light transmissivity. As a result, the light is not emitted from the non-light-emitting region 71b while the light is emitted from the light-emitting ornament 71. The transmissive portion 82e is a portion that forms the light-emitting region 80a in the light shielding layer 82c, and is formed so that the center portion is extracted in a substantially oval shape. Further, in a configuration in which the transmissive portion 82e is formed in a transparent color, the transparent color includes "milky" translucent colors other than colorless transparent color.

With the above-described configuration, the light shielding portion 82d which is solid-coated by black ink and the transparent transmissive portion 82e which is not coated by black ink are mixed in the light shielding layer 82c. In this configuration, as shown in FIGS. 35 and 36, the boundary line between the light shielding portion 82d and the transmissive portion 82e is concealed when the ornament unit 80 covered by the decorative film 82 is viewed from the vehicle interior side in the non-emission state, and hence the texture of the light-emitting region is improved. Specifically, the light shielding portion 82d is colored in a black color or similar color to black by printing, and the ornament base 81 is colored in gray in which black pigment is added to a white resin material, so that the color tone of the light shielding portion 82d is similar to the color tone of the ornament base 11. As a result, it is possible to conceal the boundary line between the light shielding portion 82d and the ornament base 81 seen through the transparent transmissive portion 82e by the design layer 82a when viewed from the vehicle interior side as shown in FIGS. 35 and 36. Accordingly, the texture of the light-emitting region is improved.

Further, the light emitted from the ornament unit 80 needs to be dim at the boundary line between the transmissive portion 82e and the light shielding portion 82d. For this reason, a gradation may be formed by the printing concentration of the light shielding portion 82d so that the printing concentration (the surface concentration) increases as it moves away from the transmissive portion 82e. With this configuration, since the boundary line between the transmissive portion 82e and the light shielding portion 82d is concealed, the texture of the light-emitting region of the light-emitting ornament 71 can be further improved and the light-emitting illumination can be dimly performed. Accordingly, the design is improved.

Further, the light transmitted through the ornament base 81 cannot be transmitted through the light shielding portion 82d of the decorative film 82, and the light transmitted through the ornament base 81 is transmitted through only the transmissive portion 82e. As a result, the light is emitted from a region of the transmissive portion 82e in the decorative film 82 while the light is emitted from the light-emitting ornament 71. Accordingly, the light can be emitted from only a predetermined region in the light-emitting region 71a, and hence the decorative appearance obtained by the illumination effect of the light-emitting ornament 71 is improved. Furthermore, the light emitted from the light source unit 90 is transmitted through the ornament base 81 including a light diffusing material when the light is irradiated toward the ornament unit 80. As a result, the irradiation range of the light emitted from the ornament unit 80 is widened. Accordingly, it is possible to obtain a satisfactory illumination effect in which the irradiation brightness is substantially uniform in the irradiation range while illuminating a wide range about the light-emitting ornament 71 compared with a case where the light diffusing material is not included.

In addition, in the third embodiment, since the decorative film 82 is stuck to the front surface of the ornament base 81, the front surface of the ornament base 81 has the decorative layer (the design layer 82a), but the invention is not limited thereto. For example, deposition or mirror ink coating may be directly performed on the resin surface of the ornament base 11. However, it is desirable to form the design layer 82a by sticking the decorative film 82 in that the light transmissive portion 82e and the light shielding portion 82d can be freely disposed.

Further, the arrangement and the configuration of the layers (that is, the metal layer 12b, the tint layer, the hairline printed layer, and the UV hard coating layer or the protection film) of the design layer 82a of the decorative film 82 can be appropriately changed without being limited to the example shown in FIG. 34. Furthermore, the invention is not limited to a configuration in which the metal layer 82b of the decorative film 82 is formed by vacuum deposition. For example, the metal layer may be formed by a surface treatment such as printing, coating, plating, or transferring.

Furthermore, the invention is not limited to a configuration in which the light shielding layer 82c of the decorative film 82 is formed by printing such as gravure printing. For example, the light shielding layer may be formed by a surface treatment such as coating, deposition, plating, or transferring. However, when the light shielding layer 12c is formed by gradation processing, it is desirable to use a printing process that is easily used for high-precision gradation processing. In particularly, gravure printing is desirable. Thus, there is an effect that a decrease in cost can be achieved.

Further, the invention is not limited to a configuration in which the light shielding layer 82c of the decorative film 82 is formed on the front surface side of the ornament base 81, and the light shielding layer may be formed on the rear surface side of the ornament base 81. However, when the light shielding layer 82c is formed at the front surface side of the ornament base 81, it is advantageous in that the decorative film 82 obtained by integrating the light shielding layer 82c and the design layer 82a with each other can be stuck to the ornament base 81. Further, when the light shielding layer 82c is formed on the rear surface side of the ornament base 81, it may be difficult to provide a snap fitting coupling structure by using the rib 85 or the boss 83 necessary for fixing the ornament unit 80. For this reason, the above-described configuration has an advantage.

Figure 37:
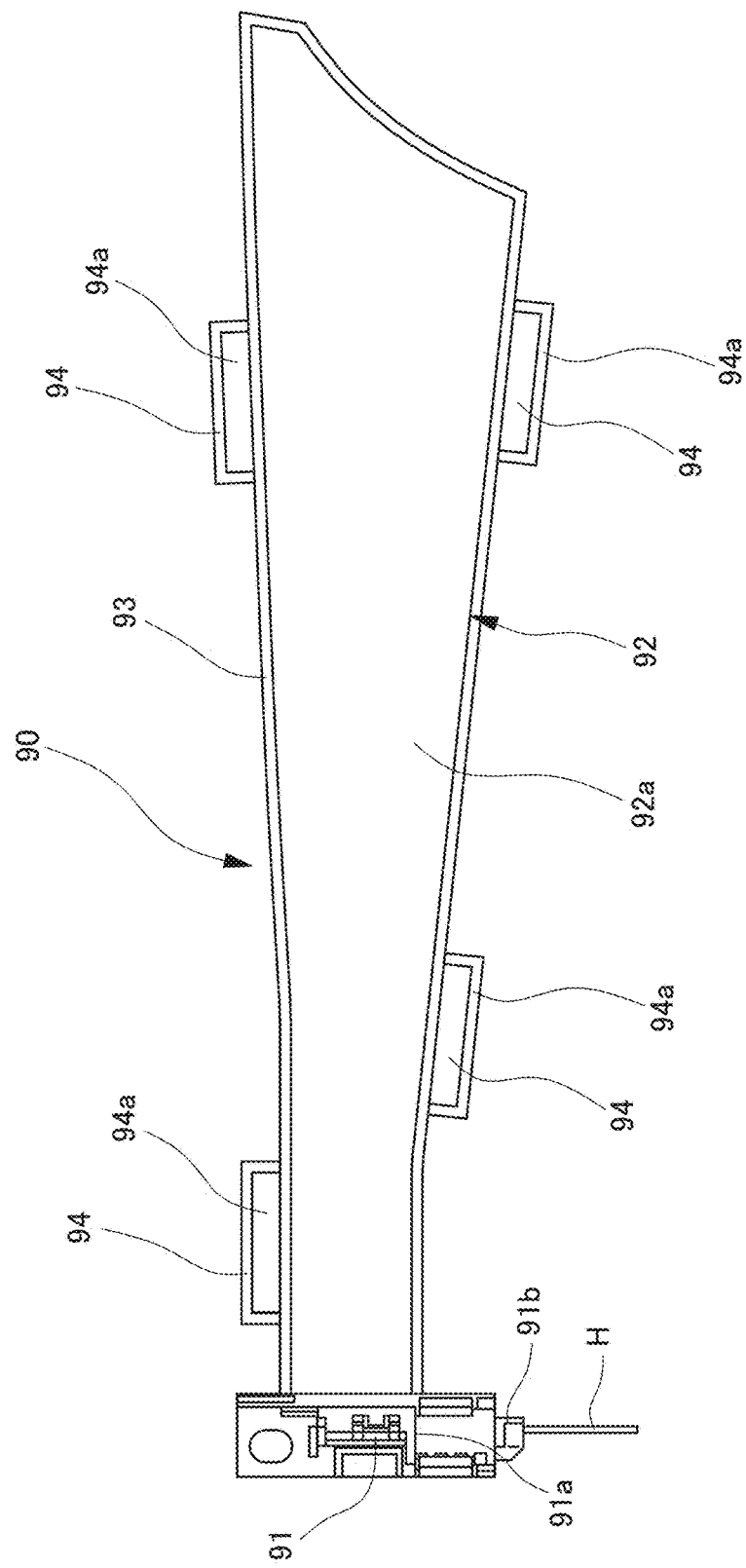
FIG. 37 is a front view of a light source unit of the light-emitting part for the vehicle according to the third embodiment.

Next, the light source unit 90 according to the third embodiment is described. The light source unit 90 forms the light-emitting region 1a of the light-emitting ornament 1 along with the ornament base 81 and the decorative film 82, and is assembled to the rear surface side of the light-emitting region 80a of the ornament unit 80 by snap fitting. Specifically, as shown in FIG. 37, an engagement hole forming portion 94 is formed in the outer edge of the holder 93 of the light source unit 90 to protrude upward or downward. The engagement hole forming portion 94 is formed in the outer shape of the door frame, and hence forms a rectangular engagement hole 94a. The engagement hole 94a which is formed by the engagement hole forming portion 94 is formed as an engagement hole for a claw portion 86 disposed in the ornament unit 80.

Figure 38:
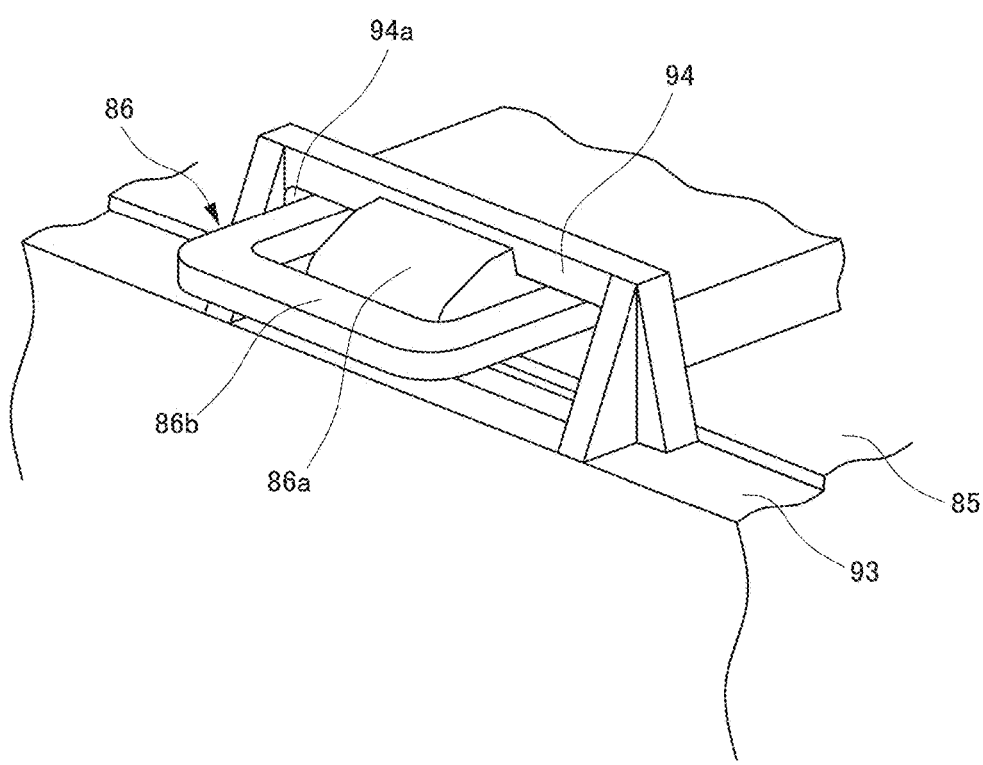
FIG. 38 is a perspective schematic view illustrating an assembly mechanism of the light source unit and the ornament unit.

As shown in FIG. 38, the claw portion 86 is a portion which protrudes outward from the outer edge of the rib 85, and is disposed at a position corresponding to the engagement hole 94a. Then, when the claw portion 86 engages with the engagement hole 94a, the light source unit 90 is assembled to the ornament unit 80. Further, as shown in FIG. 38, a substantially U-shaped groove is formed in a portion protruding from the rib 85 in the claw portion 86. A hook-shaped portion 86a of which the front end is formed in a hook shape is formed inside the groove, and a surrounding portion 86b which surrounds the hook-shaped portion 86a is formed at the outside of the groove portion. Then, if the light source unit 90 is pressed against the rear surface of the ornament unit 80 when the light source unit 90 is assembled to the ornament unit 80, the hook-shaped portion 86a contacts the engagement hole forming portion 94 of the light source unit 90. Accordingly, the front end of the hook-shaped portion 86a is introduced into the engagement hole 94a so that the hook-shaped portion 86a engages with the engagement hole 94a.

Figure 39:
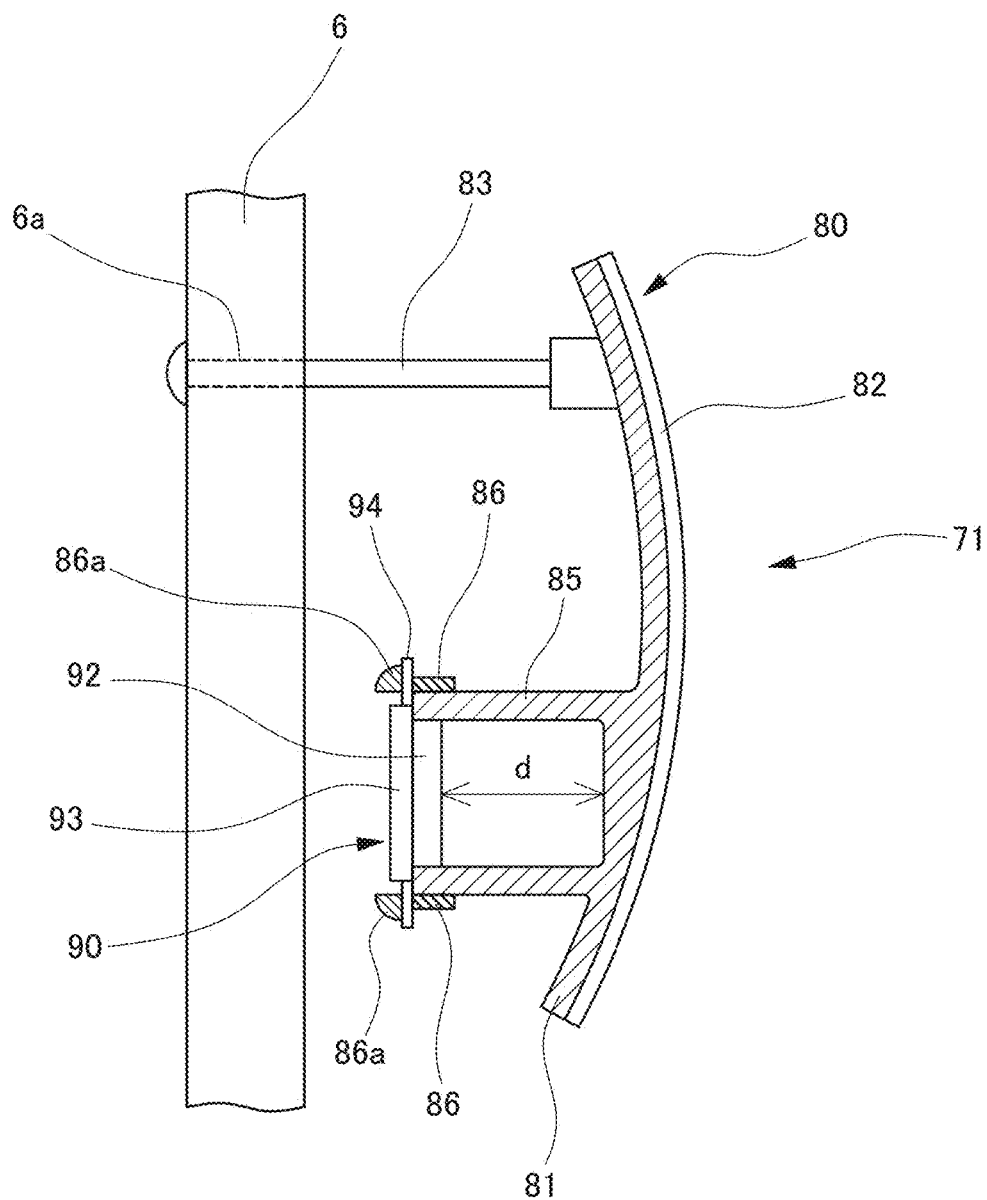
FIG. 39 is a cross-sectional view illustrating a state where the light-emitting part for the vehicle according to the third embodiment is attached to a base member.

Further, when the light source unit 90 is assembled to the ornament unit 80, the engagement hole forming portion 94 contacts the rib 85 so that the light source unit 90 is positioned to the ornament unit 80 as shown in FIG. 39. In addition, since rattling occurs when a gap exists around a contact portion in which the engagement hole forming portion 94 contacts the rib 85, a non-woven fabric or the like may be filled into the gap in order to suppress the rattling.

Then, in a state where the light source unit 90 is assembled, the ornament unit 80 is fixed to the door base 6, and the boss 83 or the engagement protrusion 84 disposed in the ornament unit 80 is fastened to the door base 6. As shown in FIG. 33, a boss 95 and an engagement protrusion 96 to be fastened to the door base 6 are also disposed in the light source unit 90. The boss 95 is fitted to the boss hole 6a formed in the door base 6 and is fixed thereto by screwing, and the engagement protrusion 96 is fitted to the fitting hole formed in the door base 6 and is fitted thereto by snap fitting. In this way, since the boss 95 or the engagement protrusion 96 disposed in the light source unit 90 is fastened to the door base 6, the light source unit 90 can be more stably fixed.

As shown in FIG. 37, the light source unit 90 includes the lamp 91 and the light guide body 92 with the light-emitting surface 92a, and these components are held in the holder 93 in the form of a combined unit. As shown in FIG. 37, the light guide body 92 is a light guiding plate of which the vertical width is gradually widened as it moves from the front end toward the rear end in the longitudinal direction. Further, the light guide body 92 is fitted and held into the holder 93 which is molded in a frame shape to match the outer shape thereof. It is desirable that the holder 93 be colored in white so that the light emitted from the light guiding plate is satisfactorily reflected by the holder. For example, the holder is formed of a material in which white pigment is input to PC resin. Particularly, the holder 93 according to the third embodiment is molded so that the white pigment input amount is set to about twice the input amount necessary when a general white resin molded product is manufactured.

The lamp 91 is, for example, a light source such as an LED lamp, and is attached to the holder 93 to be adjacent to the front end of the light guide body 92. By such a positional relation, the light traveling direction from the lamp 91 matches the light guiding direction of the light guide body 92, and hence a satisfactory light guiding effect can be obtained. Particularly, in the third embodiment, in both ends of the light guide body 92 in the longitudinal direction, the front end attached with the lamp 91 is narrower than the rear end. That is, since the width of the light guiding plate is widened as it moves toward the downstream side in the light traveling direction, the light emitted from the lamp 91 spreading like a fan can be more appropriately guided. Further, when the length of the light guide body 92 in the longitudinal direction is comparatively long, the lamp 91 may be attached to a position beside both ends of the light guide body 92 in the longitudinal direction.

Further, in the third embodiment, the lamp 91 is disposed to be adjacent to the end (the front end) closer to the front side of the vehicle in both ends of the light guide body 92 in the longitudinal direction. In the case of the typical vehicle, since the power supply of the lamp 91 is mounted at the front side of the vehicle, the length of the cable H between the lamp 91 and the power supply is shortened, and hence an increase in manufacturing cost of the light-emitting ornament 71 is suppressed.

Further, as shown in FIG. 37, an opening of a connection port (hereinafter, a jack) 91a of the lamp 91 to be connected to the cable H is formed to be directed downward in the vertical direction. Accordingly, it is possible to suppress a problem in which a connection position between the jack 91a and the cable H gets wet when rainwater or the like unintentionally intrudes into the door.

Modified Example of Ornament Unit According to Third Embodiment

Next, a modified example of the ornament unit according to the third embodiment is described. Further, in the description below, the same configuration as that of the ornament unit 80 according to the above-described embodiments will not be described.

Figure 41:
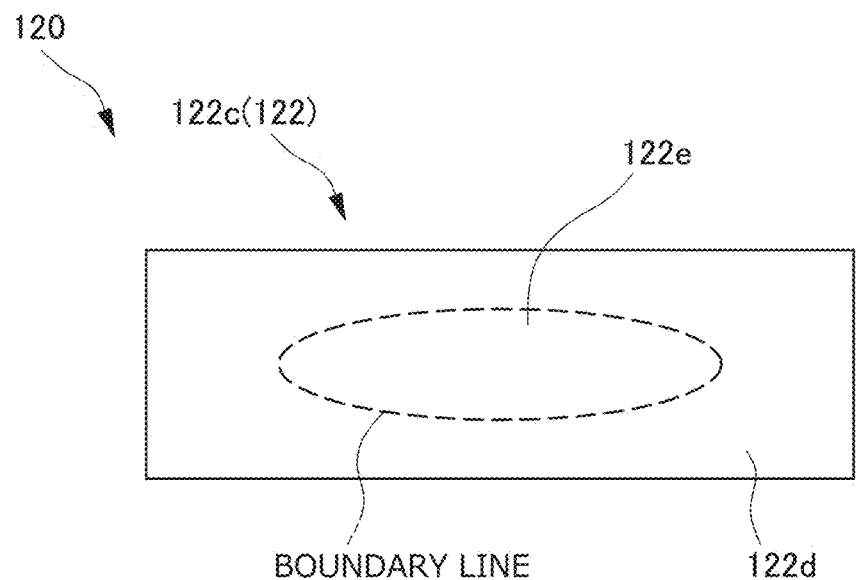
FIG. 41 is a diagram illustrating a front surface of a light shielding layer of the decorative film according to the modified example of the third embodiment.

In an ornament unit 120 according to the modified example, an ornament base 121 is formed as a resin molded product colored in a transmissive white color or similar color to white. Further, as shown in FIG. 41, a light shielding portion 122d of a light shielding layer 122c forming a decorative film 122 is formed by coating the front surface of the ornament base by white ink through printing, and is colored in a white color or similar color to white. Further, the light shielding layer 122c has a configuration in which the light shielding portion 122d, coated by white ink, and a transparent transmissive portion 122e, not coated by white ink, are combined with each other.

Figure 40:
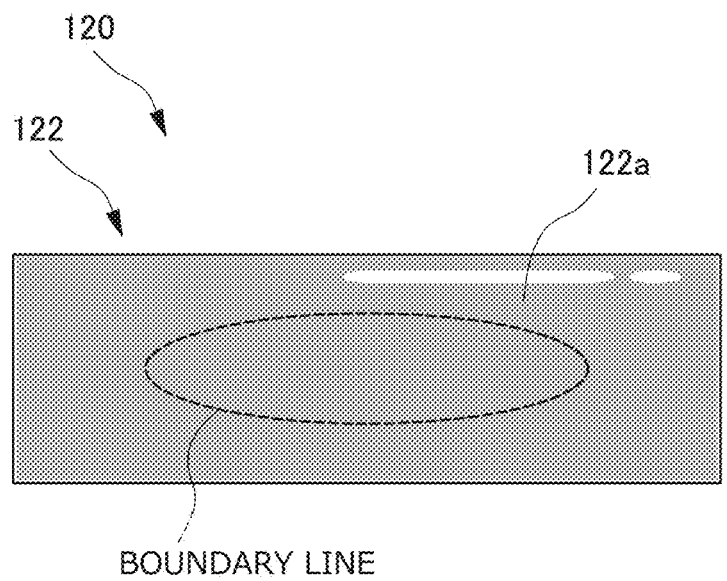
FIG. 40 is a diagram illustrating a front surface of a design layer of a decorative film according to a modified example of the third embodiment.

Then, since the boundary line between the light shielding portion 122d and the transmissive portion 122e is concealed as shown in FIG. 40 or 41 when the ornament unit 120 covered by the decorative film 122 is seen from the vehicle interior side in a state where the light-emitting part is not lit, the texture of the light-emitting region can be improved. Specifically, the light shielding portion 122d is colored in white by printing, and hence the ornament base is formed as a white resin molded product. That is, even in the modified example, the color tone of the light shielding portion 122d is similar to the color tone of the ornament base. As a result, it is possible to conceal the boundary line between the light shielding portion 122d and the ornament base seen through the transparent transmissive portion 122e as shown in FIG. 40 or 41 when the ornament unit 120 is viewed from the vehicle interior side. Further, it is possible to improve the reflectivity in the light shielding portion 122d when colored in white and hence to improve the light-emitting efficiency.

Other Embodiments

In the above-described embodiments, the light-emitting part for the vehicle according to various embodiments has been described. However, the above-described embodiments are merely used to help the understanding of the invention, and do not limit the invention. The invention can be modified and improved, and of course, the equivalent thereof is included in the invention. Further, the materials, the arrangement positions, and the shapes of the above-described components are merely examples for obtaining the effect of the invention, and do not limit the invention.

Further, in the above-described embodiments, a case has been described in which the light source unit including the LED lamp as the light source and the light guide body is used as the irradiation body, but a dot light-emitting body only including the LED lamp may be used as the irradiation body. Further, a surface-shaped light-emitting body including an organic electroluminescent (EL) panel instead of the LED lamp and the light guide body may be used. Hereinafter, a configuration (a fourth embodiment) using the surface-shaped light-emitting body is described with reference to FIG. 42.

Figure 42:
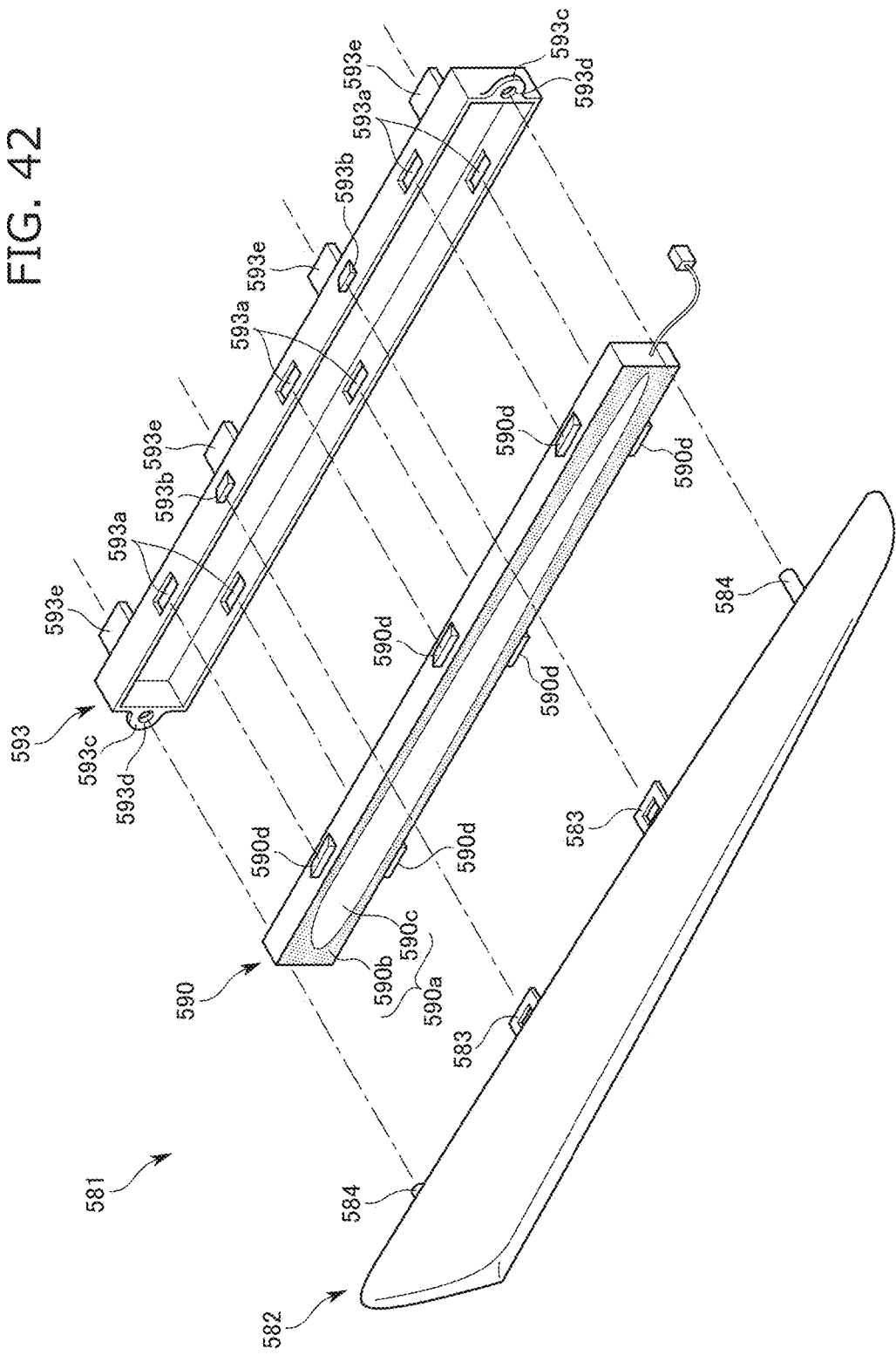
FIG. 42 is an exploded perspective view of a light-emitting ornament according to a fourth embodiment.

As shown in FIG. 42, a light-emitting ornament 581 according to the fourth embodiment includes an ornament base 582, a display 590 including an organic EL panel as a surface-shaped light-emitting body, and a holder 593 holding the display 590. With such a configuration, there is no need to separately provide the light source and the light guide body emitting the light of the light source in a wide range. Thus, the number of the components can be decreased.

The display 590 includes a light-emitting surface 590a as a surface that faces the ornament base 582, and hence a region to be lightened (hereinafter, a lighting region) 590b or luminescent color in the light-emitting surface 590a can be freely set. By using such a feature, in the fourth embodiment, only a portion corresponding to the light-emitting region in the outer surface of the ornament base 582 is lit in the light-emitting surface 590a of the display 590. In other words, in the fourth embodiment, a light-emitting region of the outer surface of the ornament base 582 is disposed at the front position of the lighting region 590b in the light-emitting surface 590a. A non-light-emitting region of the outer surface of the ornament base 582 is disposed at the front position of a region other than the lighting region 590b, that is, a non-lighting region 590c. Accordingly, when the light-emitting ornament 581 emits the light, the light is transmitted only through the light-emitting region so that the light is emitted therefrom.

Figure 43:
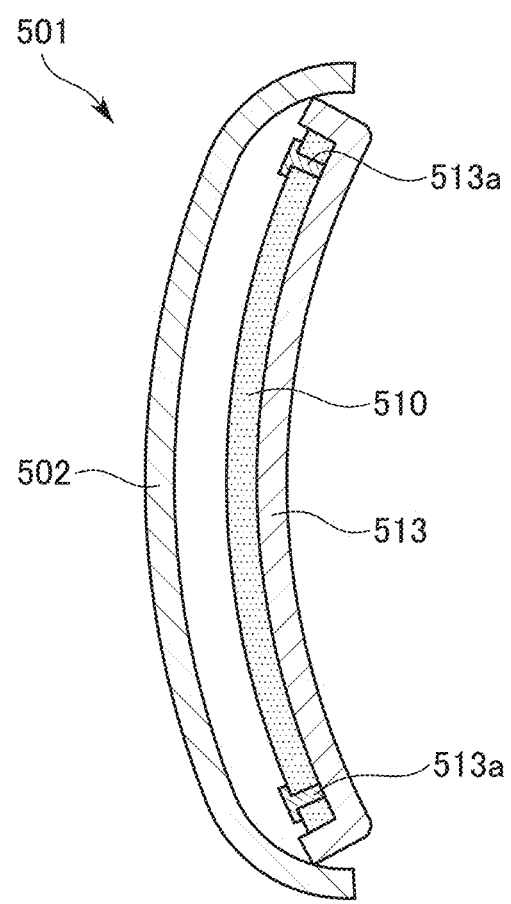
FIG. 43 is a diagram illustrating a modified example of a surface-shaped light-emitting body.

Further, in the light-emitting surface 590a of the display 590, a portion corresponding to the light-emitting region is set as the lighting region 590b, and a portion corresponding to the non-light-emitting region is set as the non-lighting region 590c. Accordingly, the light can be emitted only from a predetermined region of the outer surface of the light-emitting ornament 581 without forming a light shielding portion at the rear side of the decorative film similarly to the second embodiment or the third embodiment. Due to the above-described effect, there is no need to use a material containing the diffusing agent even in the resin material forming the ornament base. Further, the lighting region 590b and the non-lighting region 590c can be freely set in the light-emitting surface 590a. Further, the display 590 is assembled to the holder 593 by a known method such as snap fitting. Specifically, as shown in FIG. 43, a convex portion 590d which protrudes from the outer edge of the display 590 is assembled while engaging with a fitting hole 593a formed in the holder 593.

Further, the ornament base 582 is assembled to the holder 593. Specifically, a claw 583 which extends from the outer edge of the ornament base 582 toward the holder 593 engages with an engagement protrusion 593b formed in the holder 593. Additionally, as shown in FIG. 42, a tongue-shaped protrusion 593c is disposed at both ends of the holder 593 in the longitudinal direction, and bosses 584 formed at both ends of the ornament base 582 in the longitudinal direction are fitted to insertion holes 593d formed in the tongue-shaped protrusions 593c. Then, the boss 584 fitted to the insertion hole 593d is fixed to the door lining body by screwing. That is, in the fourth embodiment, when the light-emitting ornament 581 is attached to the door lining body, the holder 593 and the ornament base 582 assembled thereto are fixed to the door lining body at the same time.

Further, as shown in FIG. 42, an engagement protrusion 593e protrudes from the rear side of the holder 593, and the engagement protrusion 593e engages with an engagement hole (not shown) formed in the door lining body when the light-emitting ornament 581 is attached to the door lining body.

In addition, in the configuration shown in FIG. 42, the display 590 including an organic EL panel as a surface-shaped light-emitting body is used, and the display 590 has a slight thickness in order to ensure the rigidity thereof. However, the surface-shaped light-emitting body is not limited to the display 590. For example, as shown in FIG.

43, the surface-shaped light-emitting body may be a flexible organic EL sheet (hereinafter, a sheet-shaped display) 510.

As for the case shown in FIG. 43, an ornament base 502 of a light-emitting ornament 501 is hollowed out so that the ornament base 502 is curved so that the outer surface becomes a circular-arc surface. As shown in FIG. 43, since the sheet-shaped display 510 is flexible, the sheet-shaped display can be disposed to be curved along the ornament base 502. Accordingly, it is possible to further decrease the thickness of the light-emitting ornament 501. Further, in the case shown in FIG. 43, a holder 513 holding the sheet-shaped display 510 is also curved in a circular-arc shape in order to decrease the thickness of the light-emitting ornament 501. Further, the holder 513 has a boss 513*a* which protrudes from the surface that faces the sheet-shaped display 510. When such a boss 513*a* is inserted into a hole (not shown) formed in the sheet-shaped display 510 and is fixed thereto by welding, the sheet-shaped display 510 is assembled to the holder 513.

Further, in the fourth embodiment, the surface-shaped light-emitting body including the organic EL panel is used. However, the other surface light-emitting bodies, for example, a surface-shaped light-emitting body including an inorganic EL panel or a surface-shaped light-emitting body including a liquid crystal display panel can be also used.

Figure 44:
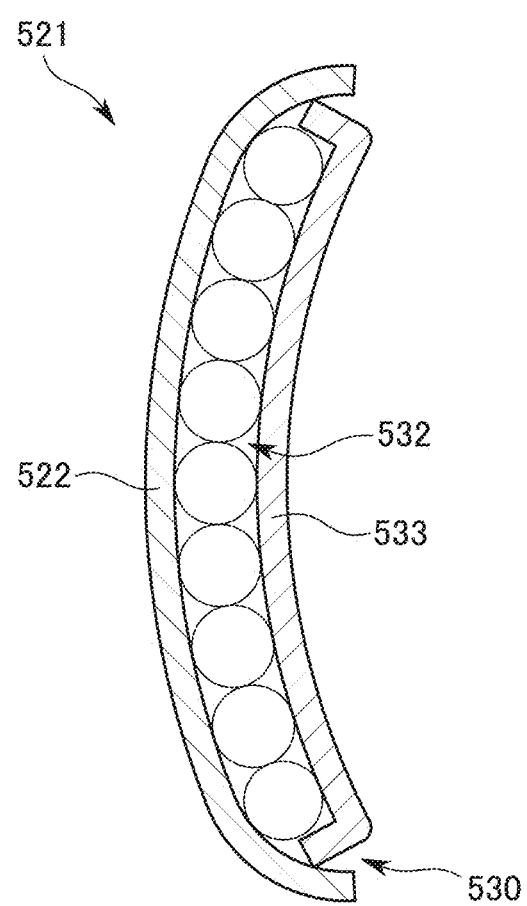
FIG. 44 is a diagram illustrating a configuration of a light-emitting ornament according to a fifth embodiment.
Figure 45:
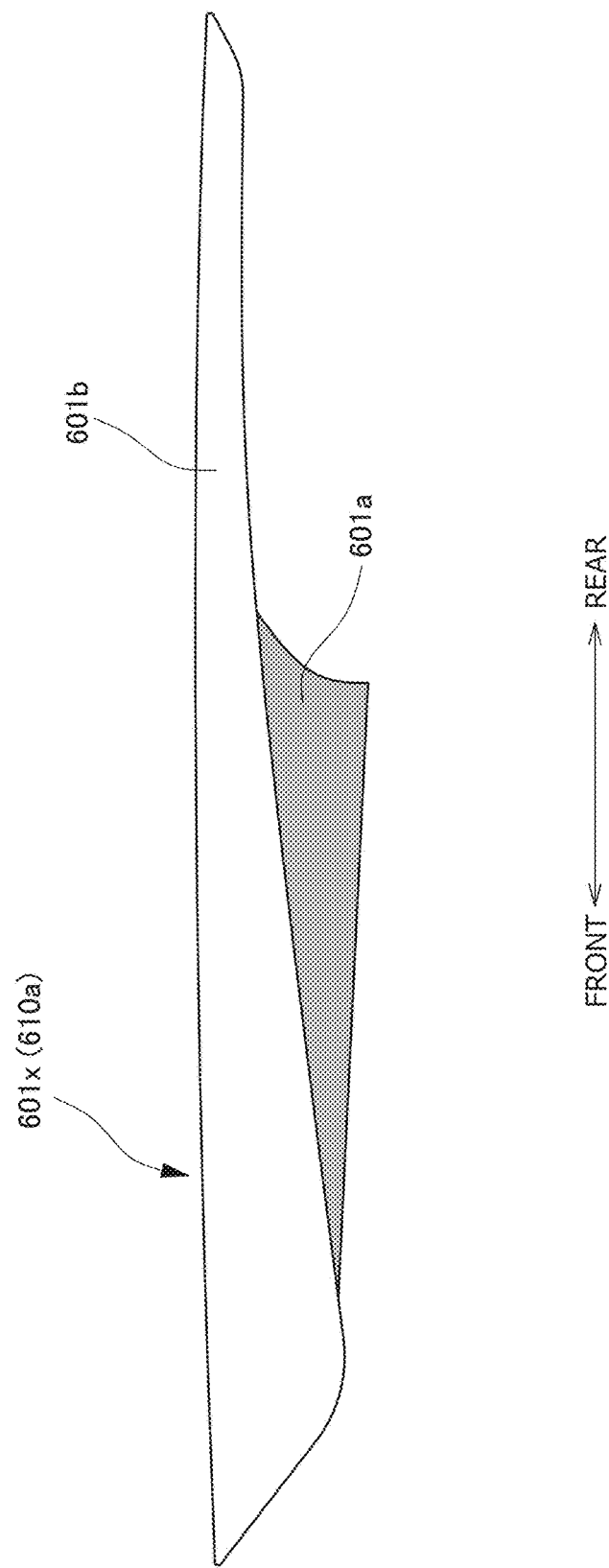
FIG. 45 is an enlarged front view of an exposed portion of a light-emitting part for a vehicle according to a sixth embodiment.

Further, in the above-described embodiments, the light guiding plate having comparatively high rigidity is used in the configuration in which the light emitted from the light source (the lamp) is guided into the inner space. However, the invention is not limited thereto, and other light guide bodies may be used. For example, as shown in FIG. 44, an optical fiber may be used as a light guide body 532. Hereinafter, a configuration (a fifth embodiment) using the optical fiber as the light guide body 532 is described with reference to FIG. 44.

In a light-emitting ornament 521 according to the fifth embodiment, as shown in FIG. 44, the light guide body 532 is formed by a bundle of a plurality of optical fibers, and the plurality of optical fibers is disposed to form a row (hereinafter, a fiber row) in the up and down direction. Since the optical fibers are flexible, the optical fibers can be disposed so that the fiber rows have a free row shape. Accordingly, when the ornament base 522 disposed in the light-emitting ornament 521 is curved by being hollowed out so that the outer surface becomes a circular-arc surface, the fiber rows forming the light guide body 532 can be disposed to be curved in an arch shape along the ornament base 522. As a result, it is possible to further decrease the thickness of the light-emitting ornament 521. Further, in the fifth embodiment, the light guide body 532 is fixed while the optical fibers thereof are fastened to the holder 533 by a known fastening method. Further, in order to decrease the thickness of the light-emitting ornament 521, the holder 533 is curved in an arch shape similarly to the light guide body 532.

Further, in the above-described embodiments, a case has been described in which the light-emitting part for the vehicle (specifically, the light-emitting ornament) is attached from the front surface side (the vehicle interior surface side) of the door lining body. However, the invention is not limited thereto, and the light-emitting part for the vehicle may be attached from the rear surface side (the opposite side to the vehicle interior surface side) of the door lining body. Hereinafter, such a configuration (the sixth embodiment) is described with reference to FIGS. 45 to 50.

Figure 46:
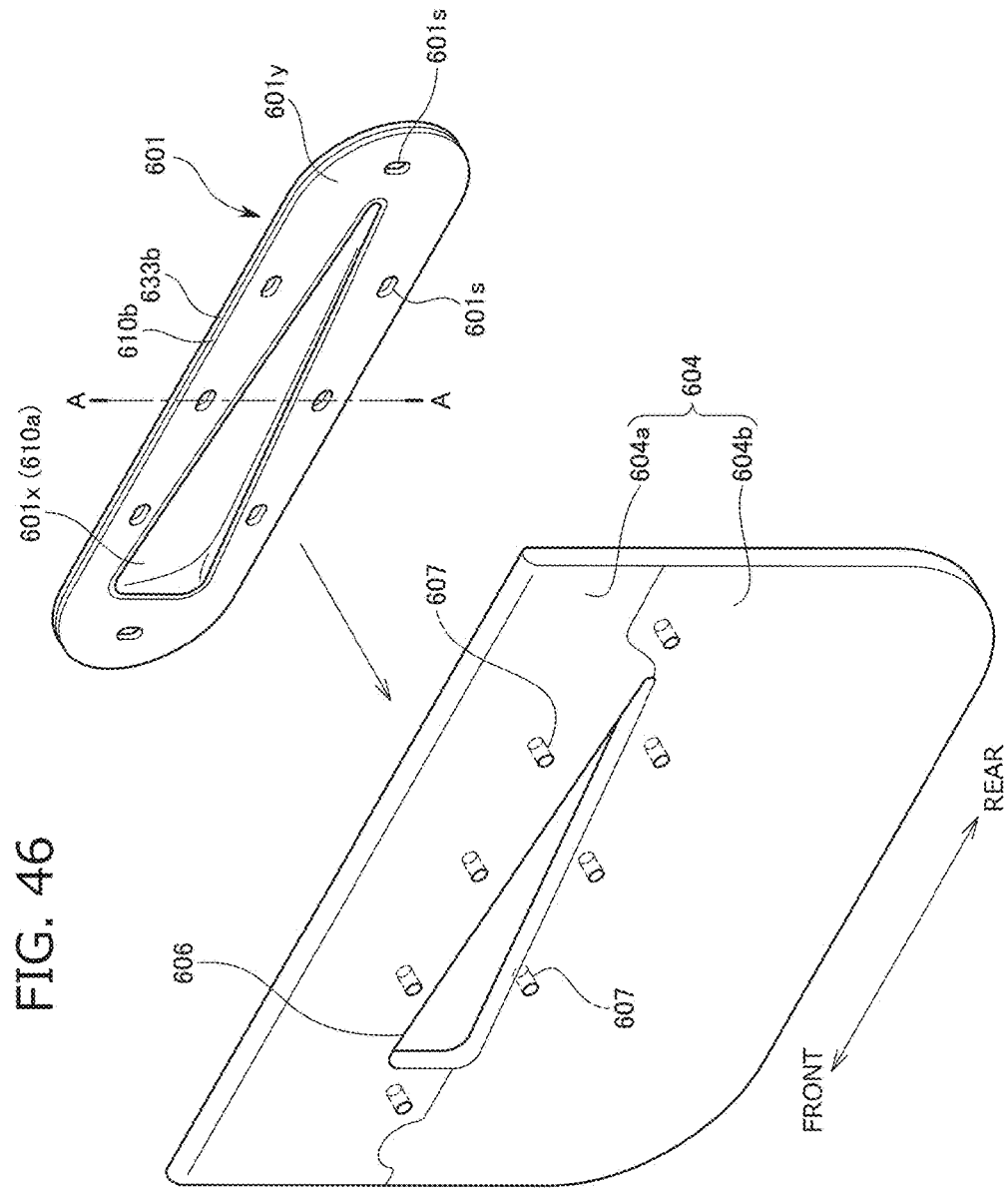
FIG. 46 is a diagram illustrating a state where the light-emitting part for the vehicle according to the sixth embodiment is assembled to a door base.

In the sixth embodiment, as shown in FIG. 46, a door base 604 has an opening 606 which is elongated in the front to back direction. A light-emitting ornament 601 according to the sixth embodiment is assembled from the rear surface (in other words, the outer surface) of the door base 604. At this time, a part of the light-emitting ornament 601 is fitted into the opening 606 so that a part of the light-emitting ornament 601 is exposed to a vehicle interior space. That is, a portion fitted into the opening 606 in the light-emitting ornament 601 corresponds to an exposed portion 601*x* exposed through the opening 606. In addition, the door base 604 is formed by the combination of an upper base 604*a* and a lower base 604*b* in the up and down directions. In the sixth embodiment, each of the upper base 604*a* and the lower base 604*b* is formed as a rigid resin plate.

The exposed portion 601*x* of the light-emitting ornament 601 has an outer shape matching the outer edge of the opening 606. Specifically, the exposed portion 601*x* is formed to have an outer shape as an elongated knife shape in the front to back direction of the vehicle. Then, a light-emitting region 601*a* is formed at a predetermined portion in the exposed portion 601*x*. In the configuration shown in FIG. 45, a region (a portion colored in gray of FIG. 45) extending in a substantially triangular shape from a position slightly behind the front end of the lower end of the exposed portion 601*x* forms the light-emitting region 601*a*, and the other portion forms a non-light-emitting region 601*b*.

Further, in the light-emitting ornament 601 according to the sixth embodiment, as shown in FIG. 46, a flange-shaped flange portion 601*y* is disposed at a portion located in the periphery of the exposed portion 601*x*. The flange portion 601*y* is a portion which is attached to the rear surface of the door base 604 when the light-emitting ornament 601 is fixed to the door lining body. More specifically, the flange portion 601*y* has a plurality of holes 601*s* which are separated from each other at an interval. Then, when a fixed screw Bt (FIG. 47) inserted into each hole 601*s* is fastened to a predetermined portion of the rear surface of the door base 604, the light-emitting ornament 601 is fixed to the door lining body.

In addition, in the sixth embodiment, the fixed screw Bt is used as an example of the fastening tool. More specifically, a tapping screw is used as the fastening tool. However, a different fastening tool, for example, a bolt other than the fixed screw Bt may be used. Further, the fastening tool may be weld-fixed to the flange portion 601*y* after the fastening tool is inserted into the hole 601*s*. Further, in order to fix the light-emitting ornament 601 and the door lining body to each other, a claw-shaped portion (not shown) may be formed of resin and engage with an engagement hole (not shown) instead of screwing or welding.

As described above, the light-emitting ornament 601 according to the sixth embodiment is assembled to the door lining body. Specifically, the light-emitting ornament is assembled from the rear surface side of the door base 604. Accordingly, the flange portion 601*y* is fixed by screwing while the flange portion is locked to an edge portion 604*c* surrounding the opening 606 in the door base 604. Further, in the sixth embodiment, as shown in FIG. 46, the flange portion 601*y* is formed to have a substantially oval outer shape, and the plurality of oval holes 601*s* is formed along the outer edge thereof by a perforating process.

Figure 47:
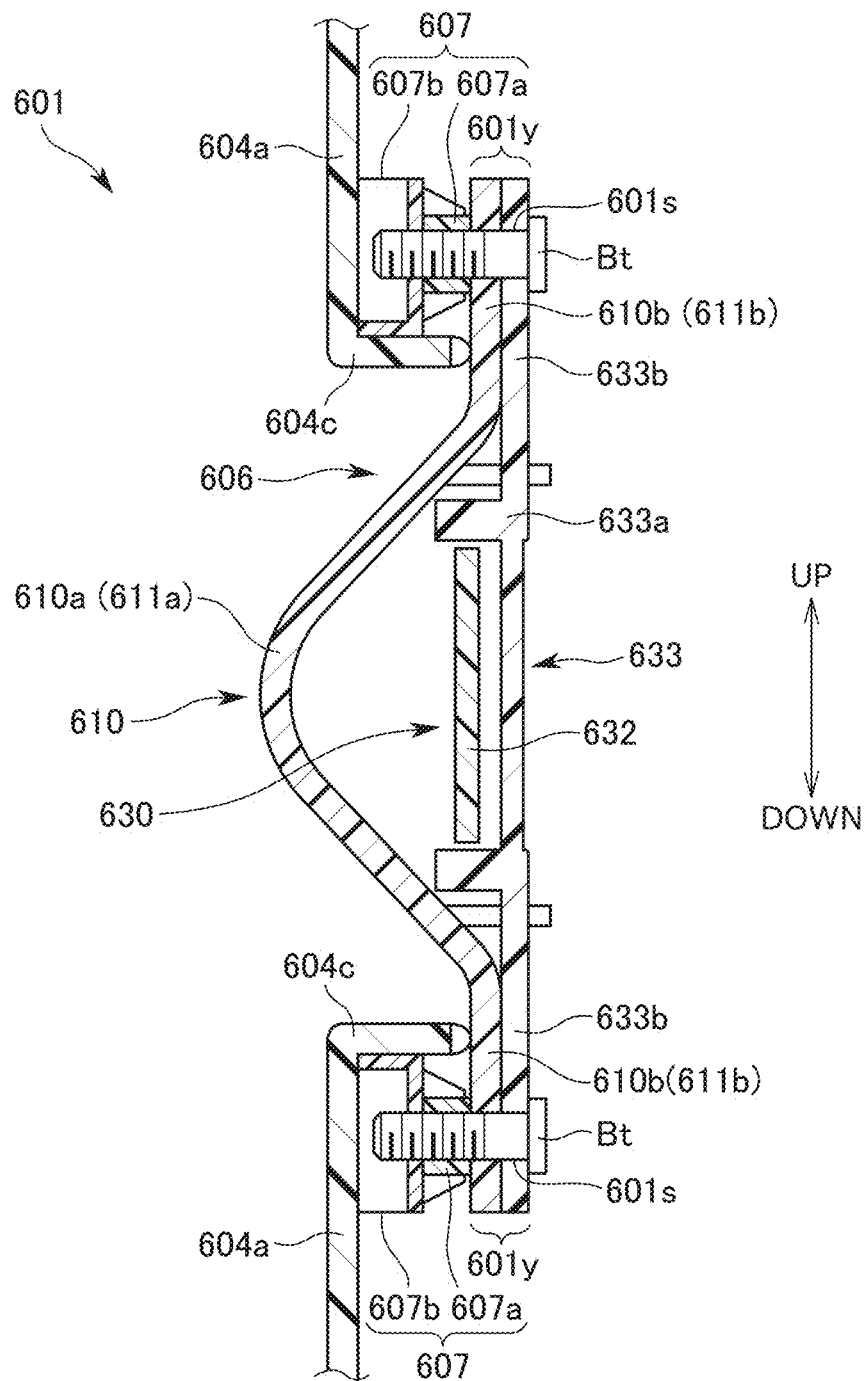
FIG. 47 is a cross-sectional view illustrating a configuration of the light-emitting part for the vehicle according to the sixth embodiment when taken along the line A-A of FIG. 46.

The configuration of the components of the light-emitting ornament 601 according to the sixth embodiment is similar to those of the above-described embodiments. Specifically, as shown in FIG. 47, the light-emitting ornament 601 includes a light source unit 630 which is an irradiation body, a holder 633 which holds the light source unit 630, and an ornament unit 610 through which the light emitted from the light source unit 630 is transmitted. The holder 633 is configured to be slightly larger than the outer shape of the light source unit 630. As shown in FIG. 47, the holder includes a holding portion 633a which holds a lamp or a light guide body 632 as the components of the light source unit 630 and a projection portion 633b which protrudes outward from the holding portion 633a. The projection portion 633b has a substantially oval outer shape, and forms the outer edge portion of the light-emitting ornament 601, that is, the flange portion 601y. Further, the projection portion 633b has a penetration hole as the hole 601s.

The ornament unit 610 includes an ornament base 611 (FIG. 48), which serves as a resin base, and a decorative film 612 (FIG. 48), which is stuck to the front surface of the ornament base 611. The ornament base 611 is hollowed out so that the center portion is slightly elevated inward (toward the vehicle interior side). The center portion of the ornament base 611 that is hollowed out has a portion (hereinafter, an elevated portion 611a) which is elevated to match the outer edge of the opening 606 formed in the door base 604. The elevated portion 611a is curved in an arch shape in the up and down direction, and hence the decorative film 612 is stuck to the surface thereof.

Then, when the light-emitting ornament 601 is fixed to the door lining body, the elevated portion 611a is fitted into the opening 606 of the door base 604 to appear toward the vehicle interior side of the door lining as shown in FIG. 47. That is, the elevated portion 611a having the decorative film 612 stuck thereto forms an exposed portion 610a exposed through the opening 606 in the ornament unit 610, and is fitted to the opening 606 while the light-emitting ornament 601 is fixed to the door lining body.

A non-elevated portion 611b is formed in a portion surrounding the elevated portion 611a in the ornament base 611. The non-elevated portion 611b has a substantially oval outer shape and forms the flange portion 601y of the light-emitting ornament 601 along with the projection portion 633b of the holder 633. Then, the non-elevated portion 11b has a penetration hole as the hole 601s. Further, since the flange portion 601y is locked to the rear surface of the door base 4, the flange portion is not exposed to appear toward the vehicle interior side of the door lining. For this reason, the non-elevated portion 611b in the ornament unit 610 becomes a non-exposed portion 610b.

Figure 48:
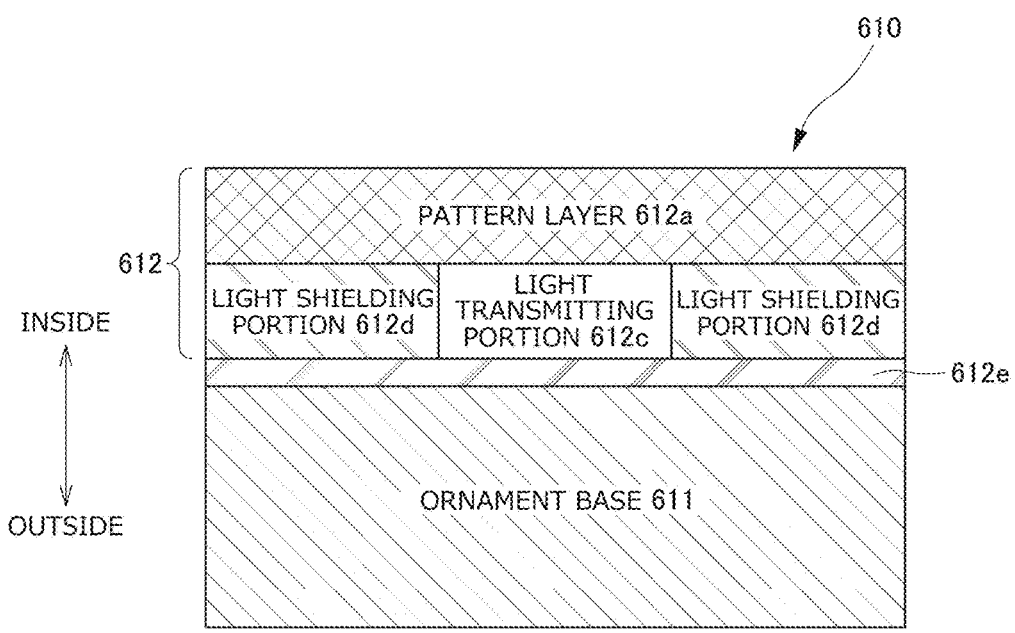
FIG. 48 is a schematic diagram illustrating a lamination structure of a transmissive body according to the sixth embodiment.
Figure 49A:
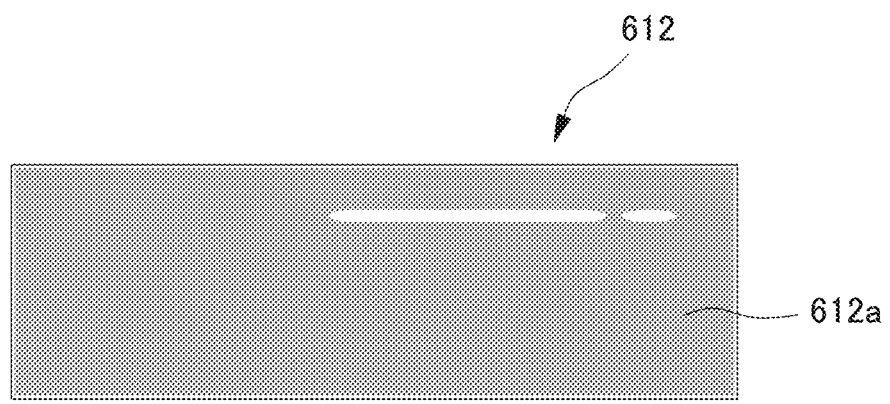
FIG. 49A is a diagram illustrating a front surface of a decorative film and FIG. 49B is a diagram illustrating a rear surface of the decorative film.
Figure 49B:
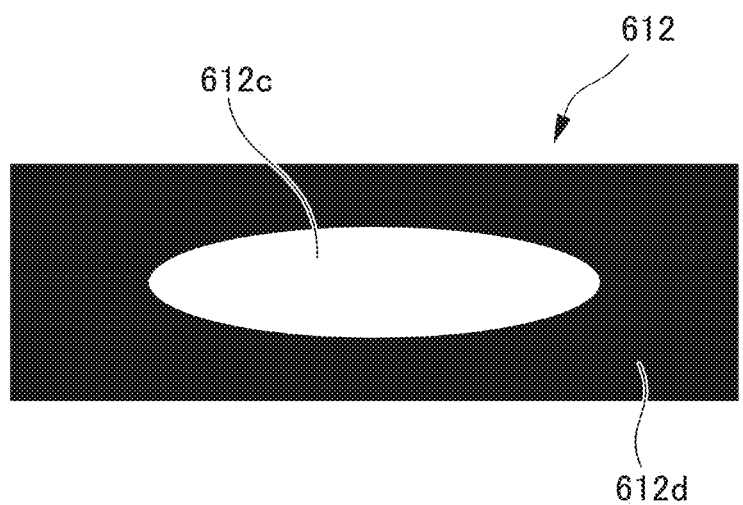

The decorative film 612 has a lamination structure shown in FIG. 48, and is stuck to the front surface of the elevated portion 611a of the ornament base 611 to form the exposed portion 610a. Here, the front surface side (the side exposed to the vehicle interior) of the decorative film 612 is colored with a metallic effect on the whole as shown in FIG. 49A. Accordingly, a pattern layer 612a, which has a metallic effect and a half mirror effect, is formed on the entire front surface of the ornament unit 610. As shown in FIG. 49B, a colorless transparent region and a region having a predetermined pattern printed thereon in black ink are formed on the rear surface of the decorative film 612. Here, the region having a pattern printed thereon in black ink forms a light shielding portion 612d which shields the light transmitted through the ornament base 611. Further, as printing for forming the light shielding portion 612d, gravure printing, silk screen printing, tampography or tampo printing, offset printing, or the like can be used. As another method of obtaining the same effect as these methods, for example, spray coating or water transferring can be used.

Another region (in other words, a region other than the light shielding portion 612d) of which the rear surface side is colorless and transparent in the decorative film 612 forms a light transmitting portion 612c through which the light transmitted through the ornament base 611 is directly transmitted therethrough. Then, a portion having the light transmitting portion 612c disposed therein in the ornament unit 610 forms the light-emitting region 601a of the light-emitting ornament 601. That is, the light transmitting portion 612c corresponds to the light-emitting region 601a, the shape or the size of the light-emitting region 1a is set in response to the shape or the size of the light transmitting portion, and the position of the light-emitting region 1a is set in response to the arrangement position of the decorative film 612.

As described above, since the decorative film 612 including the light transmitting portion 612c and the light shielding portion 612d is stuck to the front surface of the ornament base 611, the light transmitted through the ornament base 611 cannot be transmitted at a portion where the light shielding portion 612d is located. On the contrary, the light transmitted through the ornament base 611 is transmitted through a portion where the light transmitting portion 612c is located. Further, when the decorative film 612 is stuck to the front surface of the ornament base 611, an adhesive layer 612e is formed on the front surface of the ornament base 611 by adhesive as shown in FIG. 48. Since the adhesive layer 12e is formed, the decorative film 612 can be stuck to the front surface of the ornament base 611.

A mechanism disposed at the door lining body side in order to fix the light-emitting ornament 601 according to the sixth embodiment is described with reference to FIGS. 46, 47, and 50. When the light-emitting ornament 601 according to the sixth embodiment is assembled to the door lining body, the light-emitting ornament 601 is set to a predetermined position close to the rear surface of the door base 604, and is fixed to such a position. At this time, the fixed screw Bt is inserted into the hole 601s formed in the flange portion 601y of the light-emitting ornament 601 so that the screw Bt is fastened to the rear surface of the door base 604.

More specifically, a protrusion 607 to be fastened to the fixed screw Bt is disposed in the rear surface of the door base 604 in a protruding manner. The protrusion 607 is molded together with the door base 604, and protrudes toward the flange portion 601y of the light-emitting ornament 601 while the light-emitting ornament 601 is attached to the door lining body. Further, at least the protrusion 607 and the peripheral portion thereof may be molded by resin in the door base 604, and the other portion may be formed of a different material (for example, metal).

Figure 50:
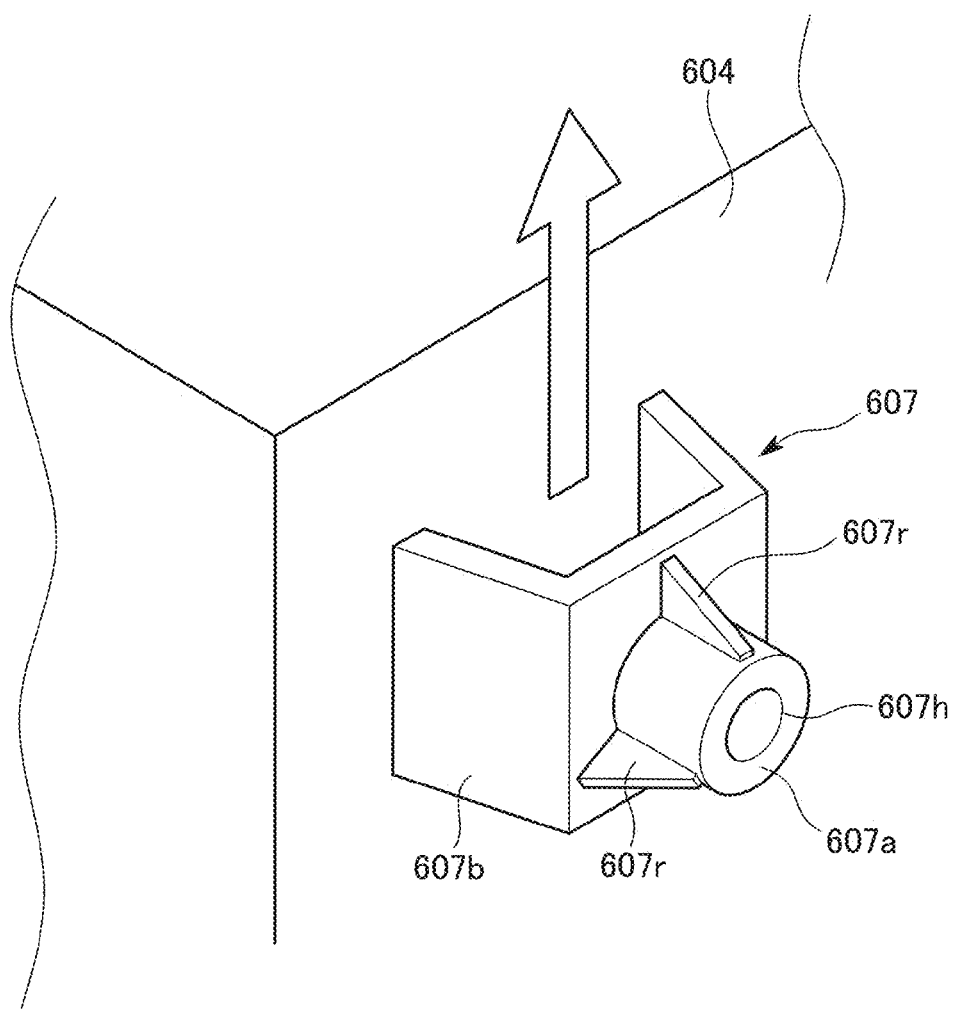
FIG. 50 is an enlarged perspective view of a protrusion disposed in a door base.

Further, as shown in FIG. 50, the front end of the protrusion 607 has a cylindrical fitting hole forming portion 607a having a fitting hole 607h into which the fixed screw Bt is fitted. Then, when the light-emitting ornament 601 is assembled to the door lining body, the light-emitting ornament 601 is assembled to the door lining body so that the fitting hole 607h communicates with the hole 601s formed in the flange portion 601y of the light-emitting ornament 601, and in such a state, the fixed screw Bt is inserted and fitted into two holes 601s and 607h. Further, the initial diameter of the fitting hole 607h (e.g., at the time of molding the door base 604) is slightly smaller than the outer diameter of the fixed screw Bt.

Here, as shown in FIG. 47, the non-elevated portion 611b of the ornament base 611 overlaps the projection portion 633b of the holder 633 in the flange portion 601y of the light-emitting ornament 601. For this reason, the ornament base 611 and the holder 633 are fixed by the common fixed screw Bt (at the same time). Accordingly, it is possible to decrease the number of the fixed screws Bt compared with the case where the ornament base 611 and the holder 633 are separately fixed.

Further, in the sixth embodiment, as shown in FIG. 50, the fitting hole forming portion 607*a* is not directly formed on the rear surface of the door base 604, and is provided through a hollow seat portion 607*b* adjacent to the rear surface of the door base 604. That is, the protrusion 607 used to fasten the fixed screw Bt includes the seat portion 607*b* disposed at the base portion (the portion close to the door base 604 in relation to the fitting hole forming portion 607*a*). The seat portion 607*b* is formed in a bottomed box shape, and the fitting hole forming portion 607*a* is uprightly formed from the top surface that faces the flange portion 601*y* of the light-emitting ornament 601. That is, the top surface of the seat portion 607*b* is slightly wider than the outline of the bottom surface of the fitting hole forming portion 607*a*. Further, in order to ensure the strength of the fitting hole forming portion 607*a*, a plurality of substantially triangular reinforcement ribs 607*r* is uprightly formed around the fitting hole forming portion 607*a* in the top surface of the seat portion 607*b*.

As described above, since the fitting hole forming portion 607*a* is not directly formed on the rear surface of the door base 604 and is provided through the hollow seat portion 607*b*, it is possible to suppress sinking in a portion provided with the protrusion 607 at the rear surface of the door base 604 as the resin molded product. That is, when the fitting hole forming portion 607*a* is directly formed on the rear surface of the door base 604, the thickness of the portion provided with the fitting hole forming portion 607*a* in the door base 604 further increases, and hence sinking more easily occurs. On the contrary, in the sixth embodiment, since the hollow seat portion 607*b* is disposed between the door base 604 and the fitting hole forming portion 607*a*, a local increase in thickness with the formation of the fitting hole forming portion 607*a* is suppressed, and hence sinking can be suppressed. Further, the upper end of the seat portion 607*b* forms an opening end when a mold (not shown) is drawn out in a direction indicated by the arrow of FIG. 50 after the door base 604 is molded by resin.

When the light-emitting ornament 601 is assembled to the door lining body, the elevated portion of the ornament unit 610, that is, the exposed portion 610*a*, is fitted to the opening 606 formed in the door base 604. As shown in FIG. 47, the edge portion 604*c* surrounding the opening 606 in the door base 604 is bent in an L-shape toward the flange portion 601*y* of the light-emitting ornament 601. Then, when the light-emitting ornament 601 is assembled to the door lining body, the front end (a portion closest to the flange portion 601*y*) of the edge portion 604*c* contacts the flange portion 601*y*. Accordingly, the flange portion 601*y* of the light-emitting ornament 601 is locked to the edge portion 604*c* of the door base 604 so that the light-emitting ornament 601 is appropriately positioned.

In addition, as shown in FIG. 47, a front end surface contacting the flange portion 601*y* in the edge portion 604*c* is formed in a semi-spherical surface shape. For this reason, the front end of the edge portion 604*c* comes into line-contact with the flange portion 601*y* when the light-emitting ornament 601 is positioned. With such a configuration, it is possible to reduce a contact load applied to the light-emitting ornament 601 compared with the configuration in which the front end of the edge portion comes into surface-contact with the flange portion 601*y*. At this time, a non-woven fabric may be interposed between the edge portion 604*c* and the flange portion 601*y* in order to further decrease the contact load. Additionally, as shown in FIG. 47, the protrusion 607 to be fastened to the fixed screw Bt is disposed at a position adjacent to a part of the edge portion 604*c* in the rear surface of the door base 604. Here, a portion where the edge portion 604*c* is located in the door base 604, that is, a portion around the opening 606, has comparatively high rigidity. Since the protrusion 607 is disposed at a position adjacent to the high-rigid portion, it is possible to stabilize a state where the fixed screw Bt is fastened to the protrusion 607, and hence to improve the assembling rigidity of the light-emitting ornament 601.

Figure 51:
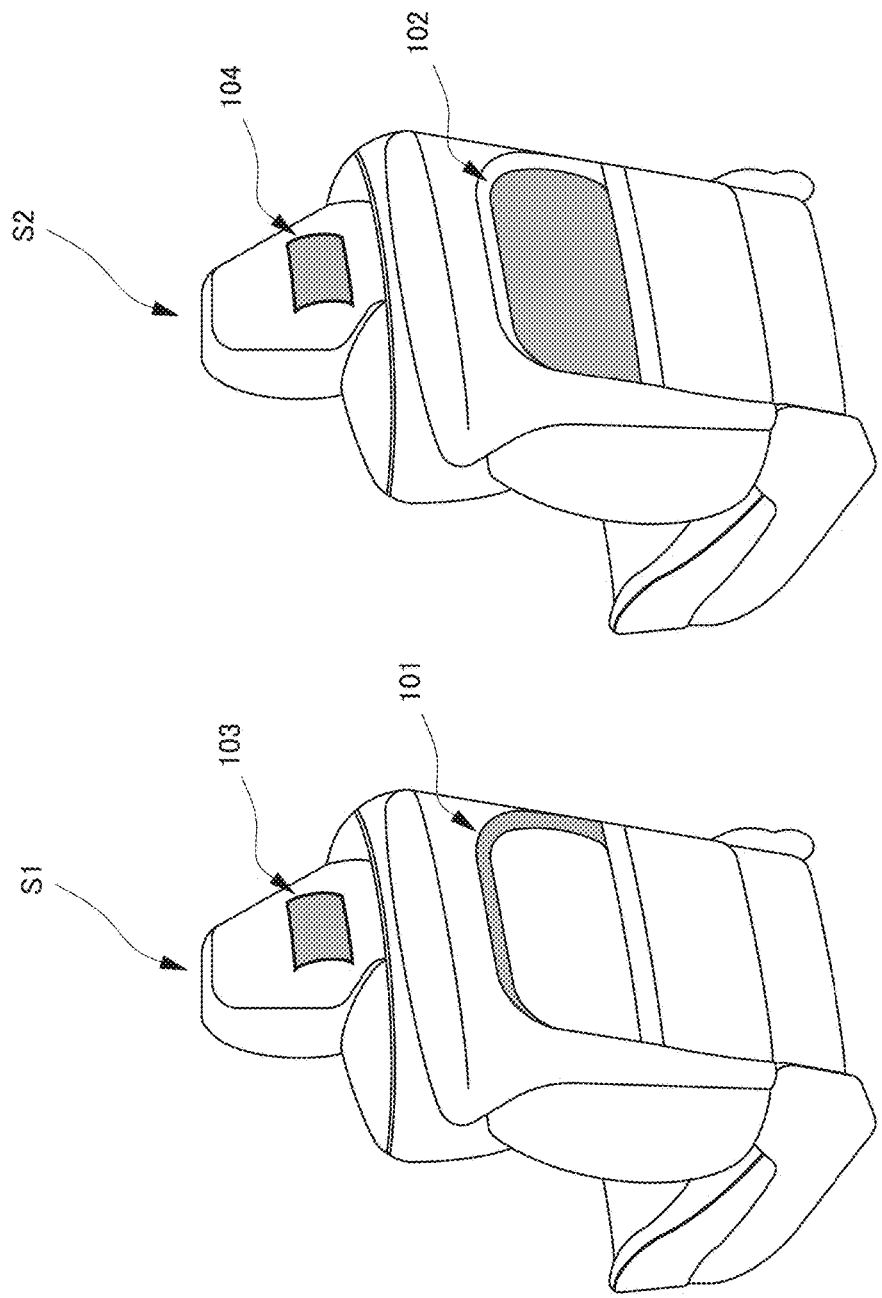
FIG. 51 is a diagram illustrating a second application example of the light-emitting part for the vehicle.

Further, in the above-described embodiments, a case has been described in which the light-emitting part for the vehicle is used as the interior part of the vehicle door (specifically, the vehicle door lining R). However, the invention is not limited to the case where the light-emitting part for the vehicle is used only for the vehicle door lining R. That is, the light-emitting part for the vehicle can be applied to other portions formed of a resin part to exhibit a decorative function. For example, as shown in FIG. 51, the light-emitting part for the vehicle can be used as an interior part for a seat back board attached to the rear surface of a driver seat 51 or an assistant seat S2. That is, light-emitting ornaments 101, 102, 103, and 104 (corresponding to the light-emitting region 10*a* colored in gray of FIG. 51) can be used.

Figure 52:
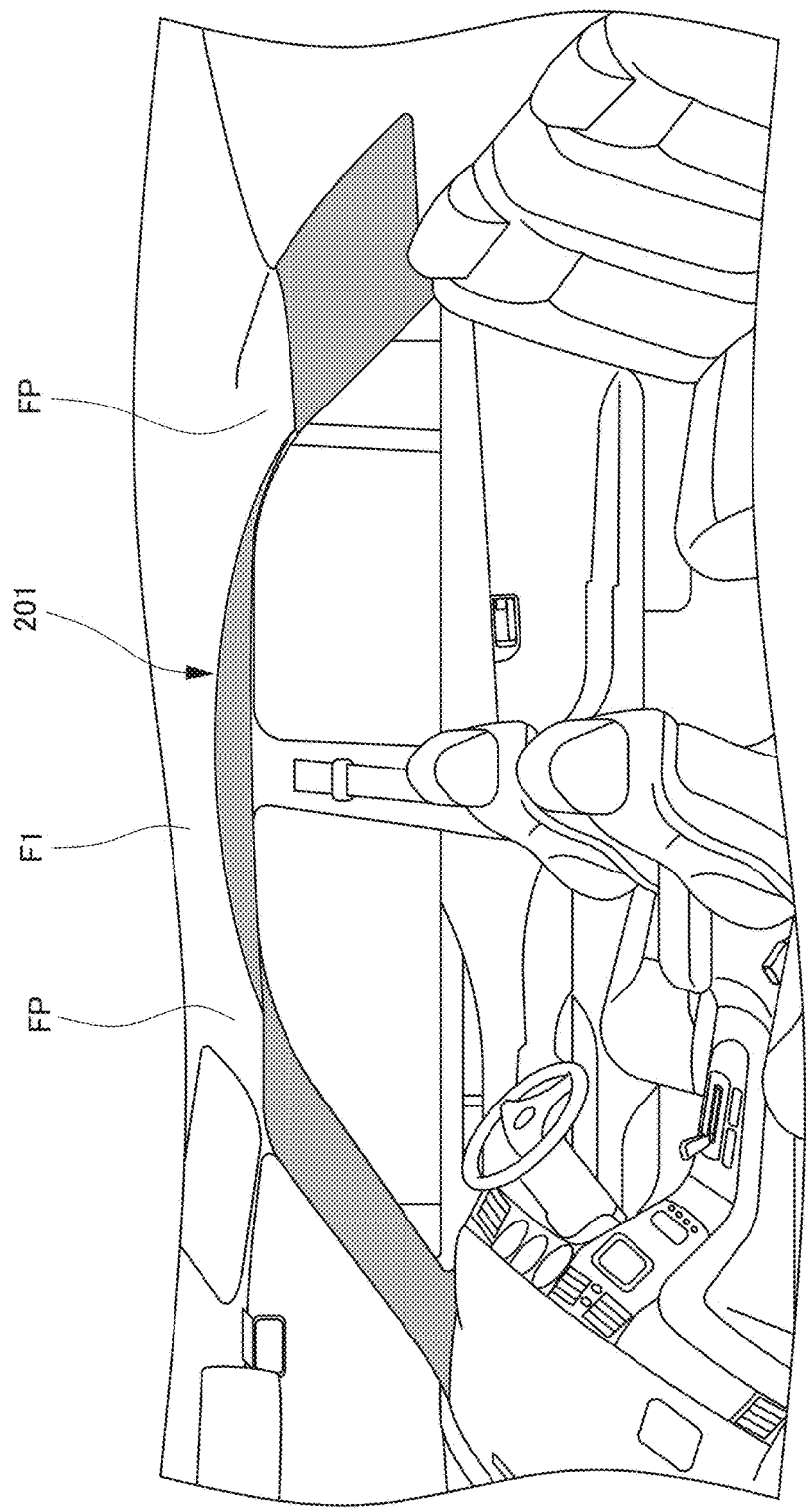
FIG. 52 is a diagram illustrating a third application example of the light-emitting part for the vehicle.
Figure 53:
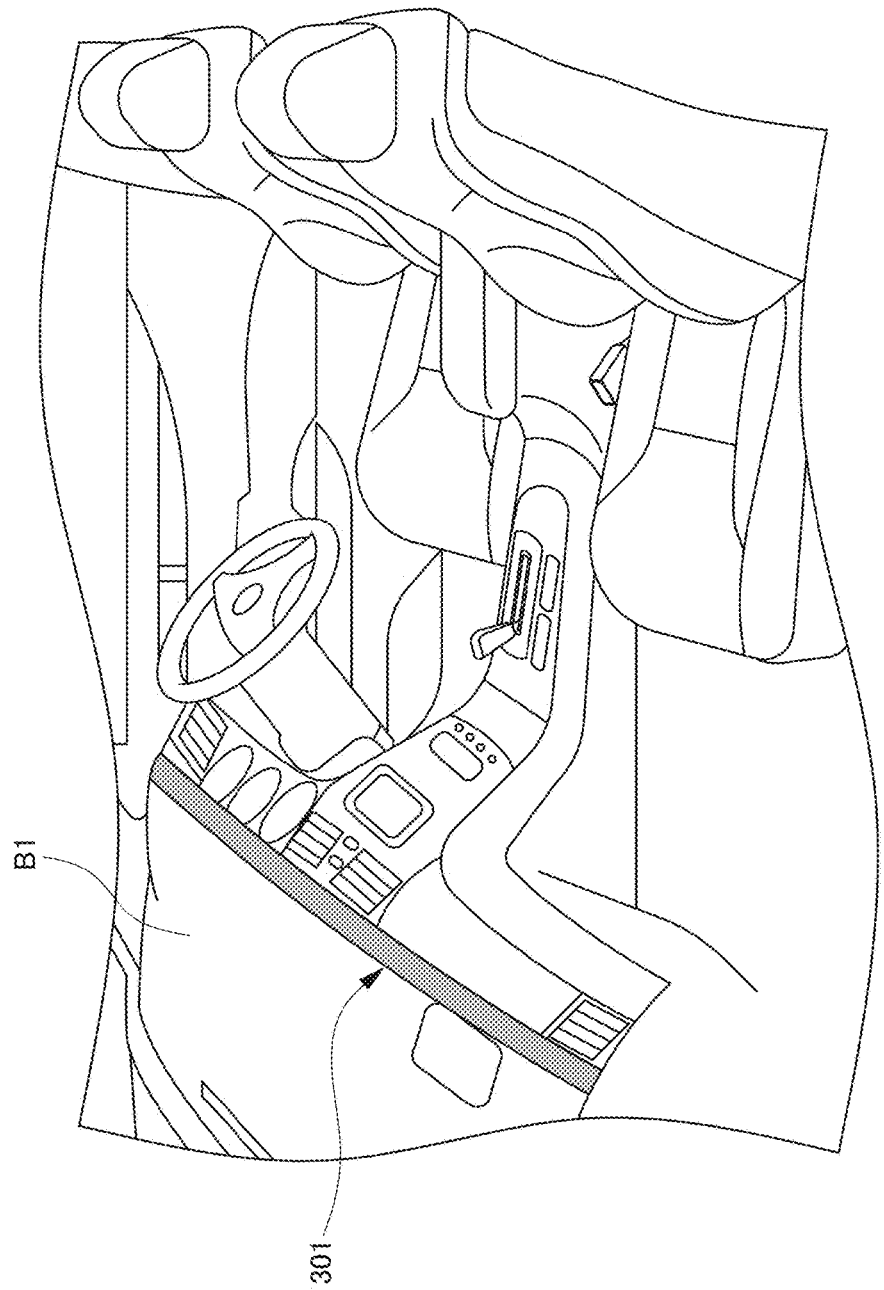
FIG. 53 is a diagram illustrating a fourth application example of the light-emitting part for the vehicle.
Figure 54:
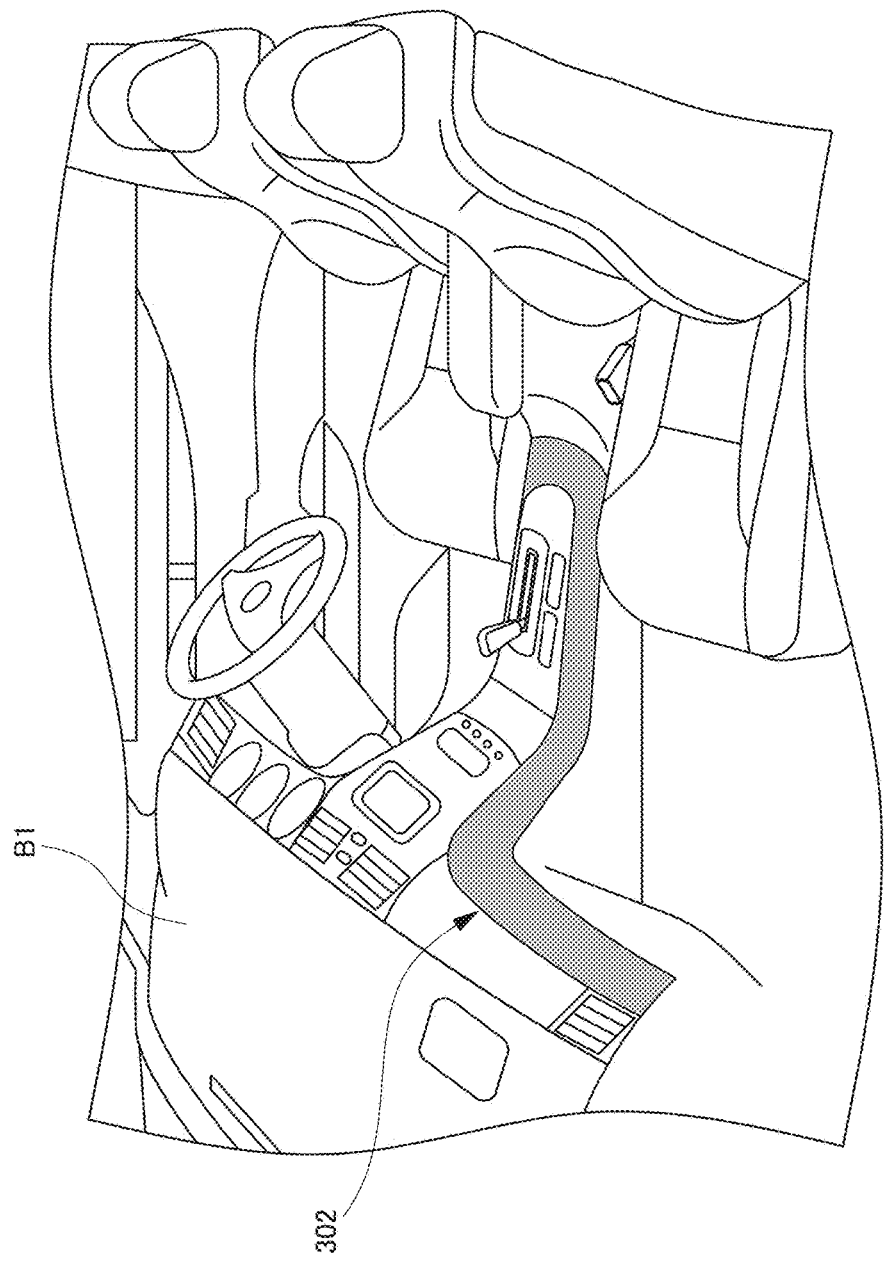
FIG. 54 is a diagram illustrating a fifth application example of the light-emitting part for the vehicle.
Figure 55:
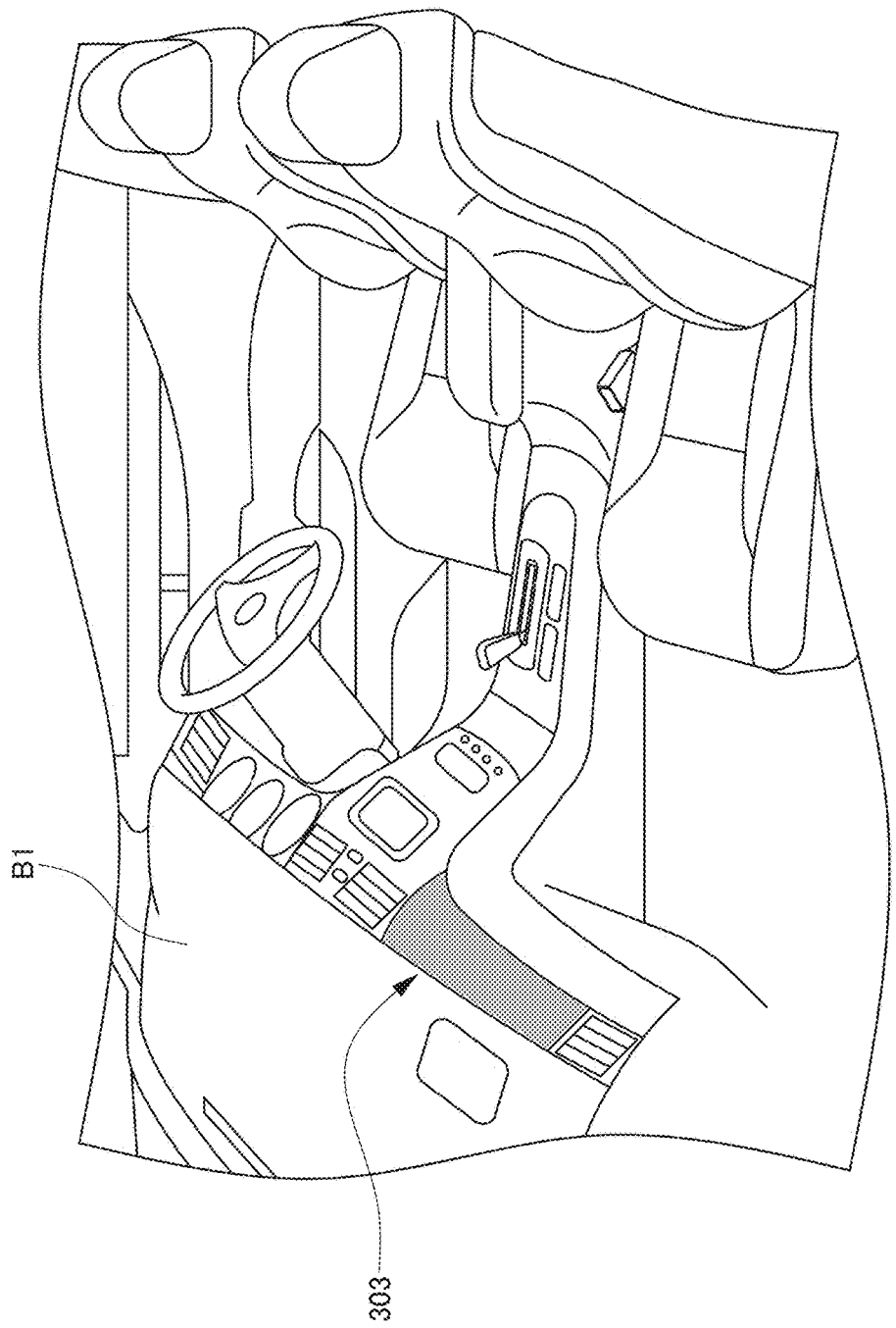
FIG. 55 is a diagram illustrating a sixth application example of the light-emitting part for the vehicle.
Figure 56:
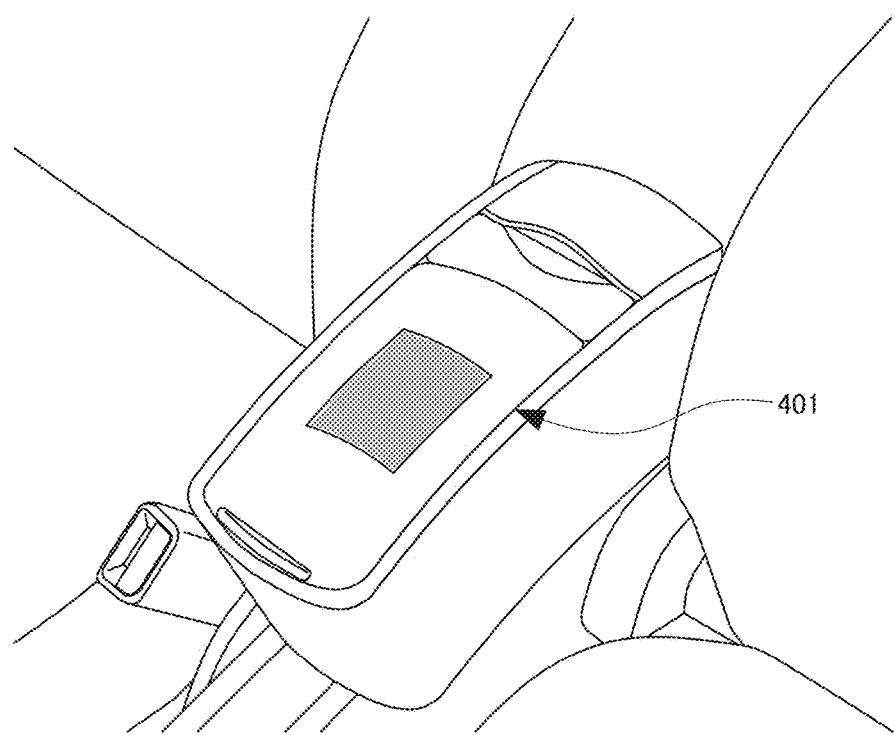
FIG. 56 is a diagram illustrating a seventh application example of the light-emitting part for the vehicle.

Further, as shown in FIG. 52, a light-emitting ornament 201 can be used as an interior part for a roof F1 attached to the right and left side portions of the vehicle or a roof pillar FP supporting the roof F1. In addition, a portion colored in gray of FIG. 52 corresponds to the light-emitting region 10*a*. Additionally, as shown in FIGS. 53 to 55, light-emitting ornaments 301, 302, and 303 can be used as interior parts for a dashboard B1 located at the front side of a driver seat and the peripheral parts thereof. Further, in FIGS. 53 to 55, a portion colored in gray corresponds to the light-emitting region 10*a*. Furthermore, as shown in FIG. 56, a light-emitting ornament 401 can be used as a light-emitting part of a console box disposed between the seats. Further, a portion colored in gray of FIG. 56 corresponds to the light-emitting region 10*a*.

In this way, when the light-emitting ornaments 101, 102, 103, 104, 201, 301, 302, 303, and 401 are used as various interior parts, the light can be more uniformly emitted even when the interior parts are disposed on a curved surface. Further, the position of the light-emitting ornament shown in FIGS. 50 to 55 is merely an example, and the invention is not limited to the portion colored in gray of the drawings.

Table of Reference Numerals 1, 41, 71: light-emitting ornament (light-emitting part for vehicle)
2: door lining body
3: accommodation casing
4: lower base
5: pull handle
6: door base
  6a: boss hole
  6b: fitting hole
7: pocket trim
8: door armrest
10: ornament (transmissive body)
  10a: light-emitting region
  10b: non-light-emitting region
20: light source unit (irradiation body)
21: lamp (light source)
22: light guide body
  22a: light-emitting surface
  22b: protrusion portion Table of Reference Numerals (-continued)

- 22c: convex portion
- 22d, 22e, 22f: prism portion (reflection portion)
- 22g: concave portion (reflection portion)
- 23: holder
- 24a: frame wall
- 24c: positioning hole
- 24d: engagement claw portion
- 24e: bottom wall
- 24i: contact rib
- 25: lamp holding portion
- 41: light-emitting ornament
- 42: door lining body
- 43: accommodation casing
  - 43a: bottom wall
- 44: screw
- 45: protruding claw
- 50: ornament unit
  - 50a: light-emitting region
  - 50b: non-light-emitting region
- 60: light source unit
- 61: lamp
- 62: light guide body
  - 62a: light-emitting surface
- 63: holder
- 64: light guide body holding portion
- 65: lamp holding portion
- 71a: light-emitting region
- 71b: non-light-emitting region
- 80, 120: ornament unit
  - 80a: light-emitting region
- 81, 121: ornament base (resin base, transmissive body)
- 82, 122: decorative film
  - 82a, 122a: design layer
  - 82b: metal layer
  - 82c, 122c: light shielding layer
  - 82d, 122d: light shielding portion
  - 82e, 122e: transmissive portion
  - 82f: adhesive layer
- 83: boss
- 84: engagement protrusion
- 85: rib
- 86: claw portion
  - 86a: hook-shaped portion
  - 86b: surrounding portion
- 90: light source unit
- 91: lamp
- 92: light guide body
  - 92a: light-emitting surface
- 93: holder
- 94: engagement hole forming portion
  - 94a: engagement hole
- 95: boss
- 96: engagement protrusion
- 101, 201, 301, 401: light-emitting ornament (light-emitting part for vehicle)
- 110: ornament
- 150: ornament base (resin base, transmissive body)
- 151: decorative film
  - 151A: transfer layer
  - 151a: adhesive layer
  - 151b: light shielding layer (transmitted light adjusting layer)
  - 151c: patterned/colored layer
  - 151d: metal deposition layer
  - 151e: tint colored layer
  - 151f: hairline pattern layer
  - 151g: top coat layer
  - 151B: release layer
- 501, 521, 581: light-emitting ornament (light-emitting part for vehicle)
- 502, 522, 582: ornament base (resin base)
- 510: sheet-shaped display (irradiation body)
- 513, 533, 593: holder
  - 513a: boss
- 530: light source unit (irradiation body)
- 532: light guide body
- 583: claw
- 584: boss
- 590: display (irradiation body)
- 590a: light-emitting surface
- 590b: lighting region
- 590c: non-lighting region
- 590d: convex portion
- 593a: fitting hole
- 593b: engagement protrusion
- 593c: tongue-shaped protrusion
- 593d: insertion hole
- 593e: engagement protrusion
- 601: light-emitting ornament (light-emitting part for vehicle)
  - 601a: light-emitting region
  - 601b: non-light-emitting region
  - 601s: hole
  - 601x: exposed portion
  - 601y: flange portion
- 604: door base
  - 604a: upper base
  - 604b: lower base
  - 604c: edge portion
- 606: opening
- 607: protrusion
  - 607a: fitting hole forming portion
  - 607b: seat portion
  - 607h: fitting hole
  - 607r: reinforcement rib
- 610: ornament unit (transmissive body)
  - 610a: exposed portion
  - 610b: non-exposed portion
- 611: ornament base
  - 611a: elevated portion
  - 611b: non-elevated portion
- 612: decorative film
  - 612a: pattern layer
  - 612c: light transmitting portion
  - 612d: light shielding portion
  - 612e: adhesive layer
- 630: light source unit (irradiation body)
- 632: light guide body
- 633: holder
  - 633a: holding portion
  - 633b: projection portion
- a: angle
- dx: linear comparison line
- p, pa, pb, pc: pitch
- A, B, C, D, E: region
- B1: dashboard
- Bt: fixed screw
- F1: roof
- FP: roof pillar
- K1: notch portion (transmissive portion)
- K2: light shielding portion (non-transmissive portion)
- R: vehicle door lining
- S1: driver seat
- S2: assistant seat
- T1: first mold
- T2: clamp
- T3: heating element
- T4: second mold
- T5: winding/delivering device
- T6: roller
- T7: detection sensor

The invention claimed is:

1. A light-emitting part for a vehicle comprising a light-emitting region, the light-emitting part comprising:

an irradiation body which i) comprises a dot-shaped light source and a planar plate-shaped light guide body with a light-emitting surface that emits light from the dot-shaped light source and ii) emits the light toward a front side of the light-emitting region; and a curved plate-shaped transmissive body which is disposed at a front position of the irradiation body so that the light emitted from the irradiation body is transmitted through the curved plate-shaped transmissive body as the light-emitting region;

wherein the dot-shaped light source is attached at a position adjacent to an end of the planar plate-shaped light guide body in a longitudinal direction;

wherein the curved plate-shaped transmissive body comprises portions which are separated from the planar plate-shaped light guide body by different gaps while the planar plate-shaped light guide body and the curved plate-shaped transmissive body are attached to the vehicle; and wherein the light-emitting part for the vehicle further comprises a surface brightness adjusting portion which adjusts a brightness of an outer surface of the light-emitting region in response to a size of the gap of the different gaps and a distance from the dot-shaped light source in the longitudinal direction;

wherein the surface brightness adjusting portion comprises an absorbed light adjusting portion which adjusts an amount of absorbed light from the light from the irradiation body; and wherein the absorbed light adjusting portion includes black pigment of the curved plate-shaped transmissive body.

2. A light-emitting part for a vehicle comprising a light-emitting region, the light-emitting part comprising:

an irradiation body which i) comprises a dot-shaped light source and a planar plate-shaped light guide body with a light-emitting surface that emits light from the dot-shaped light source and ii) emits the light toward a front side of the light-emitting region; and a curved plate-shaped transmissive body which is disposed at a front position of the irradiation body so that the light emitted from the irradiation body is transmitted through the curved plate-shaped transmissive body as the light-emitting region;

wherein the dot-shaped light source is attached at a position adjacent to an end of the planar plate-shaped light guide body in a longitudinal direction;

wherein the curved plate-shaped transmissive body comprises portions which are separated from the planar plate-shaped light guide body by different gaps while the planar plate-shaped light guide body and the curved plate-shaped transmissive body are attached to the vehicle; and wherein the light-emitting part for the vehicle further comprises a surface brightness adjusting portion which adjusts a brightness of an outer surface of the light-emitting region in response to a size of the gap of the different gaps and a distance from the dot-shaped light source in the longitudinal direction;

wherein the light-emitting part further comprises a box-shaped frame of a holder which comprises an opening that faces the curved plate-shaped transmissive body and holds the irradiation body so that the planar plate-shaped light guide body is disposed near a position of the opening;

wherein the surface brightness adjusting portion comprises an absorbed light adjusting portion which adjusts an amount of absorbed light from the light from the irradiation body; and wherein the absorbed light adjusting portion adjusts the brightness of the outer surface by changing a degree of light and darkness of color of a portion of the holder surrounding the planar plate-shaped light guide body in response to the size of the gap.

3. A light-emitting part for a vehicle comprising a light-emitting region, the light-emitting part comprising:

an irradiation body which i) comprises a dot-shaped light source and a planar plate-shaped light guide body with a light-emitting surface that emits light from the dot-shaped light source and ii) emits the light toward a front side of the light-emitting region; and a curved plate-shaped transmissive body which is disposed at a front position of the irradiation body so that the light emitted from the irradiation body is transmitted through the curved plate-shaped transmissive body as the light-emitting region;

wherein the dot-shaped light source is attached at a position adjacent to an end of the planar plate-shaped light guide body in a longitudinal direction;

wherein the curved plate-shaped transmissive body comprises portions which are separated from the planar plate-shaped light guide body by different gaps while the planar plate-shaped light guide body and the curved plate-shaped transmissive body are attached to the vehicle; and wherein the light-emitting part for the vehicle further comprises a surface brightness adjusting portion which adjusts a brightness of an outer surface of the light-emitting region in response to a size of the gap of the different gaps and a distance from the dot-shaped light source in the longitudinal direction;

wherein the curved plate-shaped transmissive body is a transmissive resin base having a curved surface portion; and wherein the light-emitting part further comprises a decorative film which is disposed on one surface of the resin base;

wherein the irradiation body irradiates the light to the resin base;

wherein the decorative film comprises at least a transmitted light adjusting layer, with a non-transmissive portion that shields the light from the irradiation body and a transmissive portion that allows the light from the irradiation body to be transmitted therethrough, and a decorative layer laminated on a vehicle interior side of the transmitted light adjusting layer;

wherein the surface brightness adjusting portion is a shielded light adjusting portion which adjusts an amount of shielded light in the decorative film from the light from the irradiation body;

wherein the transmitted light adjusting layer in the decorative film corresponds to the shielded light adjusting portion; and wherein a boundary portion of the decorative film between the non-transmissive portion and the transmissive portion in the transmitted light adjusting layer comprises a gradation portion subjected to a gradation process so that the color and the density are gradually reduced in a direction towards the boundary portion in the non-transmissive portion.

4. The light-emitting part for the vehicle according to claim 3, wherein regions of the boundary portion having different colors and densities are disposed so that the colors and the densities gradually change in the gradation portion, and wherein a region of the regions having a higher tensile expansion modulus is wider than a region of the regions having a lower tensile expansion modulus in the gradation portion.

5. The light-emitting part for the vehicle according to claim 3, wherein the decorative film is stuck to follow the curved surface portion, and wherein the gradation portion is disposed at a position deviated from a portion having a maximal tensile expansion modulus in the decorative film.

6. The light-emitting part for the vehicle according to claim 3, wherein a color tone of the resin base is similar to a color tone of the non-transmissive portion in the transmitted light adjusting layer.

* * * * *